United States Patent
Suwad et al.

(10) Patent No.: US 11,347,843 B2
(45) Date of Patent: May 31, 2022

(54) ASSET-BASED SECURITY SYSTEMS AND METHODS

(71) Applicant: King Fahd University of Petroleum and Minerals, Dhahran (SA)

(72) Inventors: Husam Issa Mohammad Suwad, Dhahran (SA); Farag Ahmed Mohammad Azzedin, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 295 days.

(21) Appl. No.: 16/515,716

(22) Filed: Jul. 18, 2019

(65) Prior Publication Data

US 2021/0089647 A1    Mar. 25, 2021

Related U.S. Application Data

(60) Provisional application No. 62/730,669, filed on Sep. 13, 2018.

(51) Int. Cl.
*G06F 21/55* (2013.01)
*G06F 21/52* (2013.01)
(Continued)

(52) U.S. Cl.
CPC ........ *G06F 21/552* (2013.01); *G06F 9/45558* (2013.01); *G06F 21/52* (2013.01);
(Continued)

(58) Field of Classification Search
CPC ...... G06F 21/522; G06F 21/52; G06F 21/577; G06F 21/566; G06F 9/45558; G06F 2009/45587
See application file for complete search history.

(56) References Cited

U.S. PATENT DOCUMENTS

| 10,650,138 | B2 * | 5/2020 | D'Errico | G06F 16/245 |
| 2007/0067847 | A1 * | 3/2007 | Wiemer | G06F 21/577 726/25 |

(Continued)

OTHER PUBLICATIONS

F. Azzedin, H. Suwad and Z. Alyafeai, "Countermeasureing Zero Day Attacks: Asset-Based Approach," 2017 International Conference on High Performance Computing & Simulation (HPCS), 2017, pp. 854-857.*

(Continued)

*Primary Examiner* — Matthew T Henning
(74) *Attorney, Agent, or Firm* — Oblon, McClelland, Maier & Neustadt, L.L.P.

(57) ABSTRACT

Methods, systems, and computer readable media for asset-based security are described. Some implementations relate to a system for asset-based detection of zero-day attacks or other attacks. The system can monitor critical assets for a violation of one or more security requirements and raise an alarm when a violation of one or more of the critical assets is detected. Further, the system can perform an information collection phase in which (a) information about the critical assets corresponding to the one or more security requirement are captured, and (b) generating a reachability graph representing one or more interrelationships between one or more of the critical assets and one or more other objects in the system.

20 Claims, 46 Drawing Sheets

(51) Int. Cl.
  *G06F 21/57* (2013.01)
  *G06F 9/455* (2018.01)
  *G06F 21/56* (2013.01)

(52) U.S. Cl.
  CPC .......... *G06F 21/566* (2013.01); *G06F 21/577* (2013.01); *G06F 2009/45587* (2013.01)

(56) References Cited

U.S. PATENT DOCUMENTS

2014/0215621 A1  7/2014  Xaypanya et al.
2014/0380488 A1  12/2014  Datta Ray et al.
2018/0103054 A1  4/2018  Cran et al.

OTHER PUBLICATIONS

Raijkumar, et al. ; Defending Zero Day Attacks: Resource-based approach ; International Jorunal of Advance Research, Ideas and Innovations in Technology, vol. 4, Issue 2 ; 2018 ; 6 Pages.
Kalogeraki, et al. ; A Novel Risk Assessment Methodology for SCADA Maritime Logistics Environments ; MDPI applied sciences ; Aug. 28, 2018 ; 32 Pages.
Kapersky ; Advanced Threat Defense and Targeted Attack Risk Mitigation ; The growing risk of advanced threats and targeted attacks ; 2017 ; 16 Pages.

\* cited by examiner

```
[SYSCALL] vCPU:1 CR3:0x4926d000,explorer.exe SessionID:1 ntoskrnl.exe!NtQueryDirectoryFile Arguments: 11
  IN HANDLE FileHandle: 0x3c0 -> '\'
  IN HANDLE Event: 0x0
  IN PIO_APC_ROUTINE ApcRoutine: 0x0
  IN PVOID ApcContext: 0x0
  OUT PIO_STATUS_BLOCK IoStatusBlock: 0x440d8f8
  OUT PVOID FileInformation: 0x440d910
  IN ULONG Length: 0x268
  IN FILE_INFORMATION_CLASS FileInformationClass: 0x3
  IN BOOLEAN ReturnSingleEntry: 0x1
  IN PUNICODE_STRING FileName: 0x440d870 -> 'Users'
  IN BOOLEAN RestartScan: 0x0
[SYSCALL] vCPU:0 CR3:0x88e60000,notepad.exe SessionID:1 ntoskrnl.exe!NtWriteFile Arguments: 9
  IN HANDLE FileHandle: 0x154 -> '\Users\hs7\Desktop\abc.txt'
  IN HANDLE Event: 0x0
  IN PIO_APC_ROUTINE ApcRoutine: 0x0
  IN PVOID ApcContext: 0x0
  OUT PIO_STATUS_BLOCK IoStatusBlock: 0xcec30
  IN PVOID Buffer: 0x2f5ba0
  IN ULONG Length: 0x22
  IN PLARGE_INTEGER ByteOffset: 0x0
  IN PULONG Key: 0x0
[SYSCALL] vCPU:2 CR3:0x875dd000,mspaint.exe SessionID:1 ntoskrnl.exe!NtSetInformationFile Arguments: 5
  IN HANDLE FileHandle: 0x1e8 -> '\Users\hs7\Desktop\test.png'
  OUT PIO_STATUS_BLOCK IoStatusBlock: 0x27d6b0
  IN PVOID FileInformation: 0x27d6f0
  IN ULONG Length: 0x8
  IN FILE_INFORMATION_CLASS FileInformationClass: 0x7fe0000000e
```

FIG. 10

```
Hooking ntdll.dll::NtCreateFile at 0x7c90d0ae
Hooking kernel32.dll::VirtualAlloc at 0x7c809af1
PID = [1048] Name = [NtCreateFile.ex]
NtCreateFileHook.output
■
```

FIG. 19

```
PID = [1148] NAME = [notepad.exe]
\Device\NamedPipe\ShimViewer
PID = [1148] NAME = [notepad.exe]
\Device\NamedPipe\ShimViewer
PID = [1148] NAME = [notepad.exe]
\??\C:\WINDOWS\AppPatch\AcGenral.DLL
PID = [1148] NAME = [notepad.exe]
\Device\NamedPipe\ShimViewer
PID = [1148] NAME = [notepad.exe]
\??\C:\WINDOWS\WindowsShell.Manifest
PID = [1148] NAME = [notepad.exe]
\??\PIPE\lsarpc
PID = [1148] NAME = [notepad.exe]
\??\PIPE\lsarpc
PID = [1148] NAME = [notepad.exe]
\??\C:\WINDOWS\system32/msctfime.ime
PID = [1148] NAME = [notepad.exe]
\??\C:\WINDOWS\system32/msctfime.ime
■
```

FIG. 20

```
typedef struct _OBJECT_ATTRIBUTES {
    ULONG              Length;
    HANDLE             RootDirectory;
    PUNICODE_STRING    ObjectName;
    ULONG              Attributes;
    PVOID              SecurityDescriptor;
    PVOID              SecurityQualityOfService;
} OBJECT_ATTRIBUTES, *POBJECT_ATTRIBUTES;
```

FIG. 21

```
NTSTATUS NtCreateFile(
    _Out_     PHANDLE              FileHandle,
    _In_      ACCESS_MASK          DesiredAccess,
    _In_      POBJECT_ATTRIBUTES   ObjectAttributes,
    _Out_     PIO_STATUS_BLOCK     IoStatusBlock,
    _In_opt_  PLARGE_INTEGER       AllocationSize,
    _In_      ULONG                FileAttriburtes,
    _In_      ULONG                ShareAccess,
    _In_      ULONG                CreateDisposition,
    _In_      ULONG                CreateOptions,
    _In_      PVOID                EaBuffer,
    _In_      ULONG                EaLength
);
```

FIG. 22

2 ,NtQueryDirectoryFile,explorer.exe
2 ,NtQueryAttributesFile,explorer.exe
2 ,NtQueryVolumeInformationFile,explorer.exe
2 ,NtQueryDirectoryFile,notepad.exe
1 ,NtCreateFile,explorer.exe
1 ,NtQueryInformationFile,notepad.exe
1 ,NtFsControlFile,explorer.exe
1 ,NtCreateFile,notepad.exe
1 ,NtQueryInformationFile,explorer.exe
1 ,NtCreateSection,notepad.exe
1 ,NtQueryVolumeInformationFile,notepad.exe

FIG. 25

```
358 ,NtWriteFile,wordpad.exe
253 ,NtSetInformationFile,mspaint.exe
218 ,NtQueryInformationFile,mspaint.exe
111 ,NtQueryInformationFile,wordpad.exe
106 ,NtSetInformationFile,wordpad.exe
100 ,NtReadFile,wordpad.exe
89 ,NtReadFile,mspaint.exe
31 ,NtQueryInformationFile,SearchProtocol
24 ,NtCreateFile,mspaint.exe
21 ,NtQueryAttributesFile,explorer.exe
18 ,NtQueryVolumeInformationFile,explorer.exe
18 ,NtReadFile,SearchProtocol
16 ,NtQueryAttributesFile,mspaint.exe
15 ,NtCreateFile,SearchProtocol
14 ,NtCreateFile,explorer.exe
14 ,NtQueryInformationFile,explorer.exe
12 ,NtFsControlFile,SearchProtocol
12 ,NtQueryAttributesFile,wordpad.exe
10 ,NtFsControlFile,explorer.exe
10 ,NtQueryDirectoryFile,explorer.exe
9 ,NtSetInformationFile,SearchProtocol
6 ,NtQueryDirectoryFile,mspaint.exe
6 ,NtOpenFile,SearchProtocol
6 ,NtCreateSection,mspaint.exe
5 ,NtOpenFile,mspaint.exe
5 ,NtCreateFile,wordpad.exe
5 ,NtQueryVolumeInformationFile,mspaint.exe
3 ,NtQueryDirectoryFile,notepad.exe
3 ,NtQueryDirectoryFile,wordpad.exe
3 ,NtOpenFile,explorer.exe
3 ,NtWriteFile,explorer.exe
2 ,NtWriteFile,mspaint.exe
2 ,NtQueryInformationFile,notepad.exe
2 ,NtQueryFullAttributesFile,wordpad.exe
2 ,NtQueryFullAttributesFile,mspoint.exe
2 ,NtCreateFile,notepad.exe
2 ,NtSetInformationFile,explorer.exe
2 ,NtSetInformationFile,notepad.exe
1 ,NtCreateSection,notepad.exe
1 , NtQueryVolumeInformationFile,notepad.exe
1 ,NtFsControlFile,mspaint.exe
1 ,NtReadFile,explorer.exe
1 ,NtwriteFile,notepad.exe
```

FIG. 27

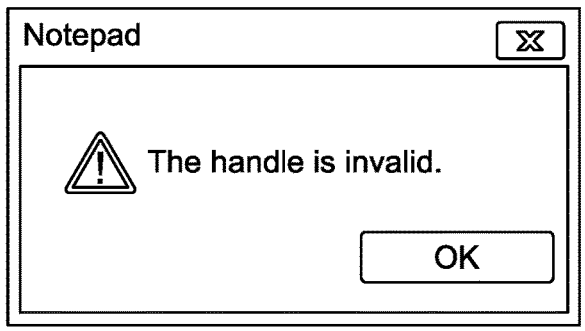
(a) Could not modify abc.txt.
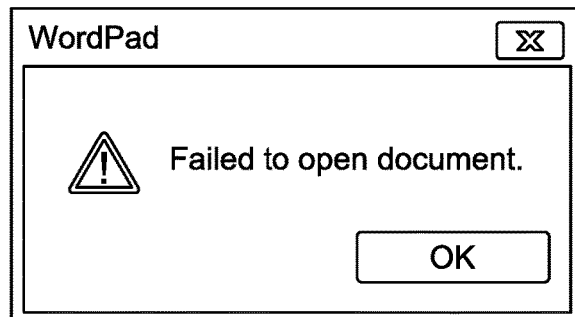
(b) Could not open abc.txt.
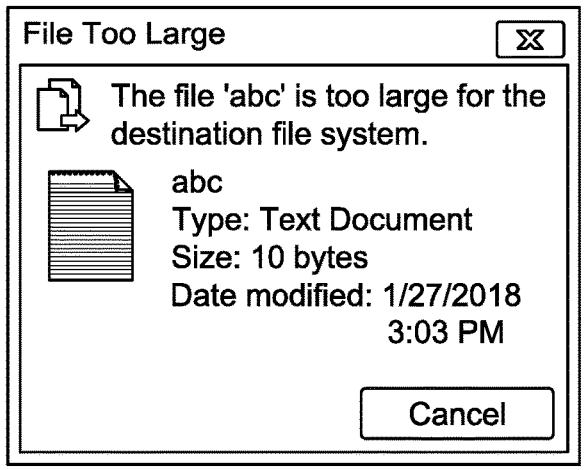
(c) Could not delete abc.txt.
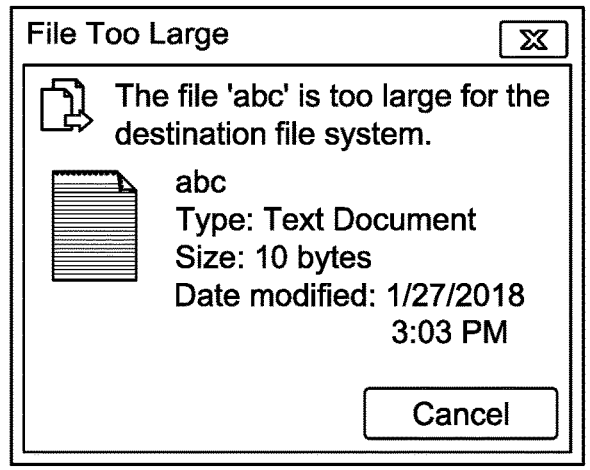
(d) Could not rename abc.txt.
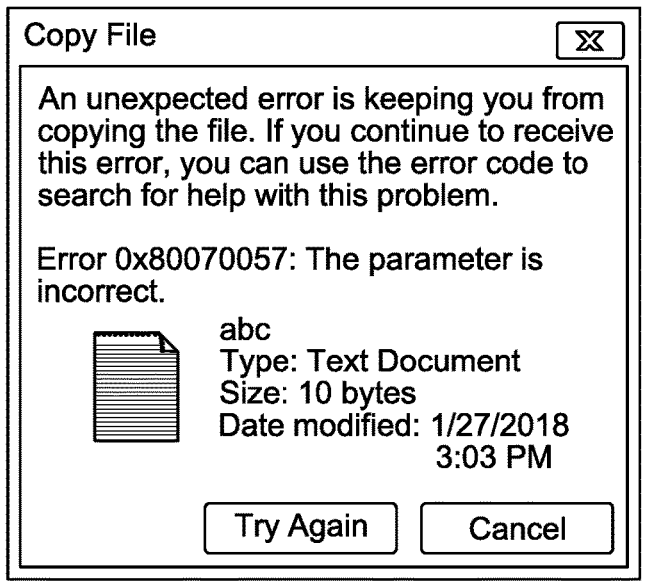
(e) Could not copy abc.txt.
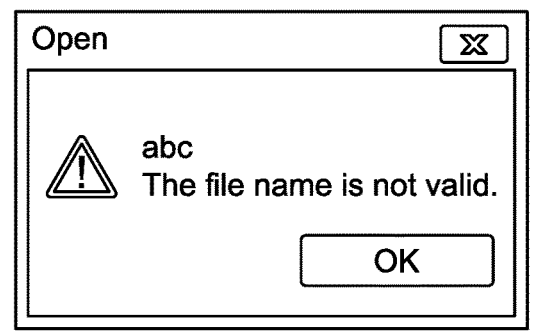
(f) Could not open abc.txt By Wordpad from open menu.
FIG. 29

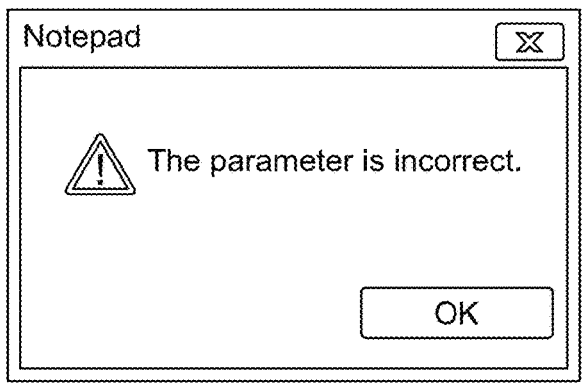
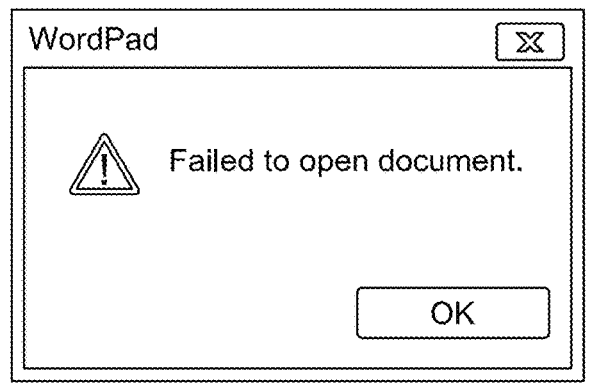
(a) Notepad Could not open abc.txt.
(b) WordPad could not Open abc.txt.
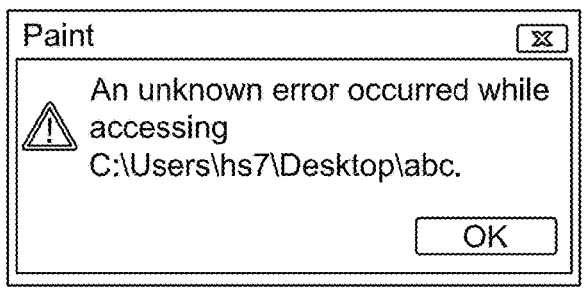
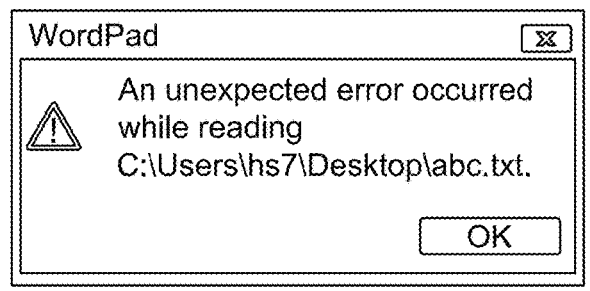
(c) MS Paint Could not Open abc.png
(d) WordPad could not Open abc.txt.
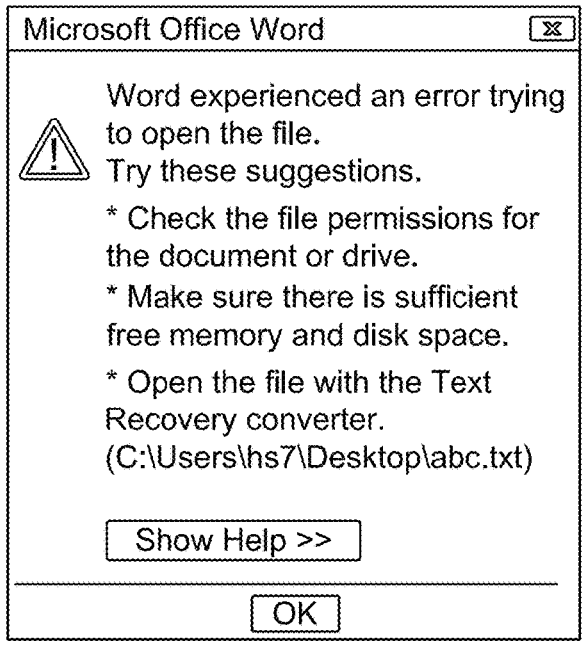
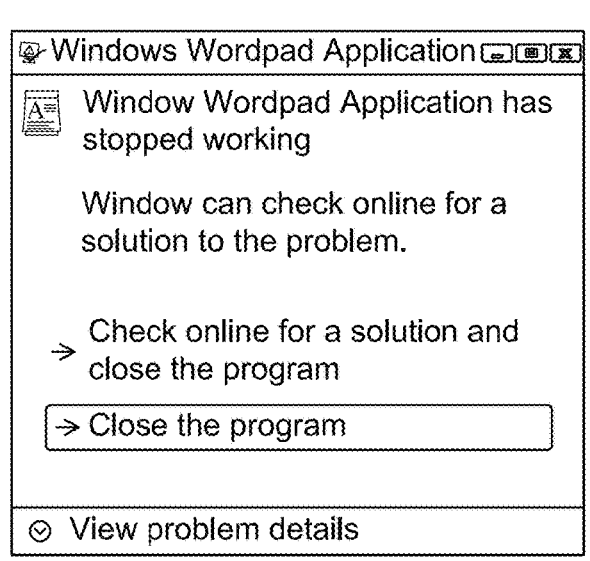
(e) Could not open abc.txt.
(f) WordPad could not Open abc.txt.
FIG. 30

Which folders would you like to protect?

Commonly attacked folders like Documents and Pictures are protected by default. To protect other folders, just click "Add Folder".

Protected folders

| | | |
|---|---|---|
| 📁 | Documents | C:\USERS\IEUSER\Documents |
| 📁 | Documents | C:\USERS\SSHD_SERVER\Documents |
| 📁 | Pictures | C:\USERS\IEUSER\Pictures |
| 📁 | Pictures | C:\USERS\SSHD_SERVER\Pictures |
| 📁 | Desktop | C:\USERS\IEUSER\Desktop |
| 📁 | Desktop | C:\USERS\SSHD_SERVER\Desktop |

ADD FOLDER

Change protected file types

FIG. 32

Which files would you like to protect?

Select which file types to secure in your protected folders.
(Selecting everything may impact your PC's performance.)

- [✓] Archive files
- [✓] Music files
- [✓] Database files
- [✓] Disc files
- [✓] Document files
- [✓] Photo files
- [✓] Video files Custom files e.g.: jpg, txt, doc

FIG. 33

[SYSCALL] vCPU:1 CR3:0x890fa000,notepad.exe SessionID:1 ntoskrnl.exe!NtOpenDirectoryObject Arguments: 3
    OUT PHANDLE DirectoryHandle: 0x77b7a220
    IN ACCESS_MASK DesiredAccess: 0x3
    IN POBJECT_ATTRIBUTES ObjectAttributes: 0x23f4b8

[SYSCALL] vCPU:1 CR3:0x890fa000,notepad.exe SessionID:1 ntoskrnl.exe!NtOpenSymbolicLinkobject Arguments: 3
    OUT PHANDLE LinkHandle: 0x23f4f0
    IN ACCESS_MASK DesiredAccess: 0x1
    IN POBJECT_ATTRIBUTES ObjectAttributes: 0x23f4b8

[SYSCALL] vCPU:2 CR3:0x46c44000,explorer.exe SessionID:1 ntoskrnl.exe!NtClose  Arguments: 1
    IN HANDLE Handle: 0xd6c

[SYSCALL] vCPU:1 CR3:0x890fa000,notepad.exe SessionID:1 ntoskrnl.exe!NtQuerySymbolicLinkobject Arguments: 3
    IN HANDLE LinkHandle: 0xc
    INOUT PUNICODE_STRING LinkTarget: 0x77b72530 ->' '
    OUT PULONG ReturnedLength: 0x23f4b0

[SYSCALL] vCPU:1 CR3:0x890fa000,notepad.exe SessionID:1 ntoskrnl.exe! NtClose Arguments: 1
    IN HANDLE Handle: 0xc

[SYSCALL] vCPU:2 CR3:0x46c44000,explorer.exe SessionID:1 ntoskrnl.exe! NtCreateFile  Arguments: 11
    OUT PHANDLE FileHandle: 0x816a8e8
    IN ACCESS_MASK DesiredAccess: 0x100081
    IN POBJECT_ATTRIBUTES ObjectAttributes: 0x816a938
    OUT PIO_STATUS_BLOCK IoStatusBlock: 0x816a8f8
    IN PLARGE_INTEGER AllocationSize: 0x0
    IN ULONG FileAttributes: 0x0
    IN ULONG ShareAccess: 0x7
    IN ULONG CreateDisposition: 0x7fe00000001
    IN ULONG CreateOptions: 0x4020
    IN PVOID EaBuffer: 0x0
    IN ULONG EaLength: 0x0

[SYSCALL] vCPU:1 CR3:0x890fa000,notepad.exe SessionID:1 ntoskrnl.exe!NtQueryVirtualMemory Arguments: 6
    IN HANDLE ProcessHandle: 0xffffffffffffffff
    IN PVOID BaseAddress: 0x77a585f0

FIG. 39

C:\Program Files\Windows NT\Accessories\wordpad.exe - 20 executions
0.1855
0.1860
0.1863
0.2015
0.1859
0.2022
0.2018
0.2016
0.2016
0.1853
0.2010
0.2015
0.2636
0.2481
0.1859
0.2018
0.2005
0.1852
0.2017
0.1855
C:\Windows\system32\mspaint.exe - 20 executions
1.2002

FIG. 43

ASSET-BASED SECURITY SYSTEMS AND METHODS

CROSS REFERENCE TO RELATED APPLICATIONS

This application claims the benefit of priority from U.S. Provisional Application No. 62/730,669 filed Sep. 13, 2018, which is incorporated herein by reference in its entirety.

INCORPORATION BY REFERENCE

The Ph.D. Thesis of Husam Issa Mohammad Suwad titled "BREAKING THE SECURITY VICIOUS CYCLE: AN ASSET-BASED APPROACH" submitted to the Deanship of Graduate Studies at King Fand University of Petroleum and Minerals, Dharhan Saudi Arabia in partial fulfillment of the requirements for the degree of Doctor of Philosophy on Jul. 20, 2018 is incorporated herein by reference in its entirety.

BACKGROUND

Technical Field

The present disclosure is directed generally to computer security, and, more particularly, to methods, computer readable media, and systems for asset-based security.

Description of Related Art

Valuable information and data need security solutions to stay out of reach of attackers. In spite of continuous security solutions, attackers may still be able to penetrate security systems causing damage to valuable data and affecting economy impact. (See, Q. Chen and R. A. Bridges, "*Automated Behavioral Analysis of Malware A Case Study of WannaCry Ransomware*," arXiv preprint arXiv:1709.08753, 2017; R. Canzanese, S. Mancoridis, and M. Kam, "*System call-based detection of malicious processes*," in Software Quality, Reliability and Security (QRS), 2015 IEEE International Conference on. IEEE, 2015, pp. 119-124; M. Kührer, J. Hoffmann, and T. Holz, "*CloudSylla: Detecting Suspicious System Calls in the Cloud*," in Symposium on Self-Stabilizing Systems, Springer, 2014, pp. 63-77; and I. Burguera, U. Zurutuza, and S. Nadjm Tehrani, "Crowdroid: behavior based malware detection system for android," in Proceedings of the 1$^{st}$ ACM workshop on Security and privacy in smartphones and mobile devices. ACM, 2011, pp. 15-26, each of which is incorporated herein by reference).

Each time security systems are penetrated, a patch is needed to be placed to prevent the attackers from reaching valuable data. (See, e.g., R. Canzanese, S. Mancoridis, and M. Kam, "*System call-based detection of malicious processes*," in Software Quality, Reliability and Security (QRS), 2015 IEEE International Conference on. IEEE, 2015, pp. 119-124, which is incorporated herein by reference).

The penetration-patch cycle is tedious and costly. A solution with a new approach is needed to break this cycle. A first step in building a security solution is to decide what needs to be protected, which is referred to as an asset. Assets can be any valuable resource to the asset owner and can span over employee data, intellectual property, bank accounts, and so forth. It is then up to the asset owner to decide on the security requirements that need to be protected by the security system. As such, security solutions can help meet organization needs.

At a basic level, organizations need to protect their assets. However, this is not enough for the organization as it needs to determine the value or the importance of these assets. The organization should consider scenarios in which these assets are lost, stolen, compromised or corrupted. As such, what is needed is to place a value in terms of time and money on each category identified as valuable.

During the first half of 2012, the on-line resources of HOTMAIL, AZURE, SKYDRIVE, MSN, OFFICE 365 AND TWITTER experienced an outage for few hours and during the second half of 2012, attacks targeted websites of GOGRID, DROPBOX AND SAUDI ARAMCO. (See, S. Gupta and P. Kumar, "Taxonomy of cloud security," International Journal of computer science, engineering and applications, vol. 3, no. 5, p. 47, 2013, which is incorporated herein by reference). Furthermore, a virus, identified later as Stuxnet, sabotaged centrifuges for uranium enrichment plant located in Iran. (See, S. Gupta and P. Kumar, "Taxonomy of cloud security," International Journal of computer science, engineering and applications, vol. 3, no. 5, p. 47, 2013, which is incorporated herein by reference). The attackers first infected five companies by targeting their computers. These companies are believed to be connected to the Iranian nuclear site. The Iranian attack is believed to spread through USB flashes, exploiting four zero-day vulnerabilities. (See, J. Fingas, "Stuxnet worm entered Iran's nuclear facilities through hacked suppliers," 2014. Available at: engadget.com. K. Zetter, "An Unprecedented Look at Stuxnet, the World's First Digital Weapon," 3 Nov. 2014 Available at: wired.com and Wikipedia, "Stuxnet," 5 Sep. 2017. Available at: wikipedia.org, which are each incorporated herein by reference).

Sony's PlayStation network, Epsilon, as well as Stratford were hit by a data breach attack in 2011. (See, e.g., S. Gupta and P. Kumar, "Taxonomy of cloud security," International Journal of computer science, engineering and applications, vol. 3, no. 5, p. 47, 2013, which is incorporated herein by reference). The year 2009 was no exception. BIT BUCKET's server (which resides on the Amazon EC2 Cloud) went down for 19 hours.

Two of the top ten attacks for 2014 compromised Gmail where five million passwords were exposed. An attack also hit eBay compromising 145 million user accounts. Educational institutions are also targets for security attacks. (See, A. Hamilton, "Top 10 security scandals of 2014," 16 Dec. 2014. Available at: itproportal.com, and Z. Whittaker, "These companies lost your data in 2015's biggest hacks, breaches," 2016. Available at: zdnet.com, which are incorporated herein by reference).

Attacks hit Harvard University and Penn State University causing leakage of students and faculty information. (See, S. Kuranda, "The 10 biggest data breaches of 2015 (so far)," 27 Jul. 2015. Available at: crn.com, which is incorporated herein by reference). In 2016, Kaspersky lab was also one victim hit by Duqu 2:0 attack. (See, S. Kuranda, "The 10 biggest data breaches of 2015 (so far)," 27 Jul. 2015. Available at: crn.com, which is incorporated herein by reference). Cellebrite, a company that helped the FBI to break the protection on a terrorist's locked iPhone, was also hacked and its products were publicly distributed. (See, H. Berghel, "On the problem of (cyber) attribution." IEEE Computer, vol. 50, no. 3, pp. 84-89, 2017, which is incorporated herein by reference). At the end of 2016, the Shamoon 2 attack came back with new features since its appearance in 2012. (See, L. Ponemon, "2015 cost of cyber crime study: Global," 9 Oct. 2015. Available at: hp.com, which is incorporated herein by reference). This time, it achieved its maximum damage to the oil sector in the Gulf area by overwriting the master boot records and wiping entire hard disks.

Most of the damages come from zero-day attacks and ransomware malware. A zero-day attack is an undisclosed vulnerability that hackers can exploit to adversely affect computer programs. (See, S. A. Zonouz, R. Berthier, H. Khurana, W. H. Sanders, and T. Yardley, "Seclius: An information flow-based, consequence-centric security metric," IEEE Transactions on Parallel and Distributed Systems, vol. 26, no. 2, pp. 562-573, 2015, which is incorporated herein by reference). A typical zero-day attack can last 10 months on average and can infect huge number of nodes. In a zero-day attack, attackers target one or more security requirements of one or more assets. Attackers change their attack vector in order to hide their behavior and avoid systematic antivirus software. (See, C. Karr, "The IT security vicious cycle of "Assuming Compromise"," 10 Feb. 2015. Available at: itproportal.com, which is incorporated herein by reference). Saudi Aramco was a victim of a zero-day attack in 2012.

These attacks stole usernames and passwords to access user accounts and infect more than 30,000 Aramco workstations. (See, J. Leyden, "Hack on Saudi Aramco hit 30,000 workstations, oil firm admits," 2012. Available at: theregister.co.uk, which is incorporated herein by reference). (See, B. Christopher and T.-R. Eneken, "The Cyber Attack on Saudi Aramco," 1 Apr. 2013. Available at: iiss.org, which is incorporated herein by reference).

Ransom malware is a type of malicious software that blocks access to data or threatens to publish it unless a ransom is paid. (See, A. Young and M. Yung, "Cryptovirology: Extortion-based security threats and countermeasures," in Security and Privacy, 1996. Proceedings., 1996 IEEE Symposium on. IEEE, 1996, pp. 129-140, which is incorporated herein by reference). CryptoLocker, CryptoWall, WannaCry, Jigsaw, TeslaCrypt, Bad Rabbit, and Petya are examples of famous and recent ransom malware. (See, Q. Chen and R. A. Bridges, *Automated Behavioral Analysis of Malware A Case Study of WannaCry Ransomware*," arXiv preprint arXiv:1709.08753, 2017, which is incorporated herein by reference).

A study done by Ponemon Institute shows that business loss due to zeroday attacks continues to climb by 19% and shows the average annual loss to companies worldwide exceed 7:7 million dollars per company. (See, L. Ponemon, "2015 cost of cyber crime study: Global," 9 Oct. 2015. Available at: hp.com, which is incorporated herein by reference). (See, Al Arabiya, "What is the Shamoon virus that has returned to hack Saudi networks?" 24 Jan. 2017. Available at: english.alarabiya.net, which is incorporated herein by reference).

The average data breach costs U.S. organizations approximately 6:5 million dollars. (See, U. Emmnauel and T. Mohammed, "Cyber security, threat intelligence: Defending the digital platform," Journal of International Technology and Information Management, vol. 26, no. 1, pp. 138-160, 2017, which is incorporated herein by reference). Another study conducted in 2013 and is based on a sample of 252 organizations in seven countries, concluded that 87% of small companies and 93% of large companies reported some zero-day breaches. (See, R. Brewer, "Advanced persistent threats: minimizing the damage," Network Security, vol. 2014, no. 4, pp. 5-9, 2014, which is incorporated herein by reference). Furthermore, the UK Government estimated zero-day attacks will cost 27 billion Pounds per year.

One of the most famous and recent computer zero-day ransomware is CryptoLocker which cost 30 million dollars in 100 days with 500,000 victims, with speculation that at least 0.4% of CryptoLocker victims end up paying the ransom. (See a security company, NORTON, "The 8 Most Famous Computer Viruses of All Time," 22 Feb. 2016. Available uk.norton.com, which is incorporated herein by reference). (See, D. Jeffers, "Crime pays very well: Cryptolocker grosses up to $30 million in ransom," 20 Dec. 2013. Available at: pcworld.com, which is incorporated herein by reference).

Another damaging incident is WannaCry spreading in at least 150 countries costing estimated losses that could reach 4 billion dollars. (See, S. Larson, "Massive cyberattack targeting 99 countries causes sweeping havoc," 13 May 2017. Available at: money.cnn.com, which is incorporated herein by reference). (See, J. BERR, "WannaCry ransomware attack losses could reach $4 billion," 16 May 2017. Available at: cbsnews.com, which is incorporated herein by reference).

As technology moves forward towards the ever increasing importance and continuous use of data-age technology, security projects are becoming the primary focus for many practitioners and research groups. A focus research group in Oxford University directs their research to find security solutions to insider threats initiated directly from employees. (See, "Corporate Insider Threat Detection: Cyber Security Inside and Out," 31 Mar. 2015, cybersecurity.ox.ac.uk. Available at: cs.ox.ac.uk, which is incorporated herein by reference).

Software products such as TRITON APX, TRITON AP-EMAIL, TRITON AP-WEB, TRITON AP-DATA and TRITON AP-ENDPOIN are available to end users as content management solutions. (See industrial company, RAYTHEON, "Triton apx suite," 2016. Available at: forcepoint.com, which is incorporated herein by reference).

One of the lead companies in security and anti-virus solutions conducts a yearly cyber security competition to nurture the interest of talented people and to raise users' awareness for cyber security. (See, Kaspersky, "Ideas for the Future: the Best Projects of 'CyberSecurity for the Next Generation—Russia & CIS Round 2014' Chosen in Moscow," February 2014. Available at: kaspersky.com, which is incorporated herein by reference). Security solutions, such as the ones offered by Optilab designed to handle eavesdroppers and other security threats, identify legitimate users by applying screen protection using cameras. (See, "Prevent prying eyes from seeing your critical data," 2015. Available at: optiolabs.com, which is incorporated herein by reference). If the user is not identified, then the screen becomes blurry to protect the information and the intruder photo is captured.

The United States Department of Homeland Security (DHS), targeting to achieve its core mission, is employing more than 240,000 individuals in security related sectors such as border and aviation security, emergency response, chemical facility inspection, and cyber-security analysis. (See, DHS, "CSD Projects," 2016. Available at: dhs.gov, which is incorporated herein by reference). With securing cyberspace, DHS funds a wide variety of cyber-security projects aiming at improving security in federal and global networks. Some of these cyber-security projects are anonymous networks and currencies, critical infrastructure design and adaptive resilient systems, and cyber-security forensics.

Helping victims of ransomware attacks to retrieve their original data by decrypting the files without paying the ransom to cyber criminals, was the main idea behind establishing a website called www.nomoreransom.org. This is an initiative by the national high technology crime unit of the Netherlands' police, Europol's European cybercrime centers, cybersecurity company, KASPERSKY, and security company, MCAFEE. (See, NoMoreRansom, "The No More Ransom Project," 2018. Available at: nomoreransom.org, which is incorporated herein by reference). The established websites offer decryption tools to decrypt victim files hit by any ransomware listed on the websites, which are updated each time a new ransomware is discovered. The list of ransomware include LAMBDALOCKER, NEMUCODAES, MACRANSOM, JAFF, ENCRYPTILE, AMNESIA, AMNESIA2, MOLE, BTCWARE, CRY128, CRY9, and CRYPTON. If a victim was hit by an unknown ransomware, the victim needs to only upload a sample of the encrypted files to the website where these infected files will be scanned to classify the type of ransomware.

Once the ransomware is identified, a solution is provided. Academics and researchers are working to establish more secure environments and reduce the big losses resulting from such attacks. (See, C. Karr, "The IT security vicious cycle of "Assuming Compromise"," 10 Feb. 2015. Available at: itproportal.com, which is incorporated herein by reference). (See, R. Kaur and M. Singh, "A survey on zero-day polymorphic worm detection techniques," IEEE Communications Surveys & Tutorials, vol. 16, no. 3, pp. 1520-1549, 2014, which is incorporated herein by reference). (See, J. H. Jafarian, E. Al-Shaer, and Q. Duan, "Adversary-aware IP address randomization for proactive agility against sophisticated attackers," in Computer Communications (INFOCOM), 2015 IEEE Conference on. IEEE, 2015, pp. 738-746, which is incorporated herein by reference).

Researchers and academics started by surveying the existing attacks and collecting information to know the power of these attacks and what damage they can cause. (See, R. Kaur and M. Singh, "A survey on zero-day polymorphic worm detection techniques," IEEE Communications Surveys & Tutorials, vol. 16, no. 3, pp. 1520-1549, 2014, which is incorporated herein by reference).

Others studied the attack stages to establish patterns of behavior in order to match them to avoid and capture future attacks. (See, L. Bilge and T. Dumitras, "Before we knew it: an empirical study of zeroday attacks in the real world," in Proceedings of the 2012 ACM conference on Computer and communications security. ACM, 2012, pp. 833-844, which is incorporated herein by reference).

As such, models can be established to recognize and predict normal patterns or behavior and therefore capture abnormalities. Conventional attack solutions offered by companies were assessed and innovative strategies were introduced to countermeasure such attacks. (See, J. H. Jafarian, E. Al-Shaer, and Q. Duan, "Adversary-aware IP address randomization for proactive agility against sophisticated attackers," in Computer Communications (INFOCOM), 2015 IEEE Conference on. IEEE, 2015, pp. 738-746, which is incorporated herein by reference). (See, C. Karr, "The IT security vicious cycle of "Assuming Compromise", 10 Feb. 2015. Available at: itproportal.com, which is incorporated herein by reference).

There is no doubt that security-related incidents are increasing. Specifically, securing systems against attacks are surely needed and therefore a security solution must be put in place to ensure that such attacks are prevented and countermeasured. (See, L. Bilge and T. Dumitras, "Before we knew it: an empirical study of zeroday attacks in the real world," in Proceedings of the 2012 ACM conference on Computer and communications security. ACM, 2012, pp. 833-844, which is incorporated herein by reference).

The present disclosure notes that the trend of constantly chasing and changing attack vectors is contributing to the continuity of attackers-led security vicious cycle. Attackers are leading and defenders are learning. The present disclosure describes an asset-based security system where security practitioners build their security systems based on information they own. In one embodiment the invention is self reliant on building security systems and requires nothing from attackers. As a consequence attackers chase defenders which will not just level the security playing field but will give advantage to defenders. An asset-based approach to mitigate zero-day ransomware attacks is disclosed herein. The obtained results indicate that attacks are mitigated based on defender-only supplied information.

Some implementations of the present disclosure were conceived in light of the above mentioned problems and limitations of conventional machine translation techniques, methods and tools.

SUMMARY

Some implementations relate to a system for asset-based detection of zero-day attacks or other attacks. The system can monitor critical assets for a violation of one or more security requirements, and raise an alarm when a violation of one or more of the critical assets is detected. Further, the system can perform an information collection phase in which (a) information about the critical assets corresponding to the one or more security requirement are captured, and (b) generating a reachability graph representing one or more interrelationships between one or more of the critical assets and one or more other objects in the system.

The system can also monitor activity in the system to: (a) gather information about one or more running processes or applications, and (b) use the gathered information about the one or more running processes or applications to detect any asset security requirements violation. Monitoring the activity can include monitoring at an asset-level of the system and can be performed at a hypervisor level. Further, monitoring the activity can be passive so as to be difficult for running processes to detect the monitoring. Monitoring the activity is not tailored to a set of attacks and is not based on attack vectors or attack behaviors, but rather attacks are discovered based on information gathered from a defender during the information collection process.

Some implementations can include a system for asset-based monitoring to detect attacks. The system can be configured to monitor critical assets for a violation of one or more security requirements, and raise an alarm when a violation of one or more of the security requirements corresponding to the critical assets is detected.

In some implementations, the system can be further configured to perform an information collection phase including capturing information about the critical assets corresponding to the one or more security requirements, generating a reachability graph representing one or more interrelationships between one or more of the critical assets and one or more other objects in the system, and generating a scope of control that maps security requirements for the critical assets to system calls that must be prevented in order to preserve the security requirements.

In some implementations, the system can be further configured to monitor activity in the system to gather information about one or more running processes or applications, and use the gathered information about the one or more running processes or applications to detect any asset security requirements violation.

In some implementations, gathering information about one or more running processes can include execution tracing of events within an operating system. In some implementations, monitoring the activity can include monitoring at an asset-level of the system.

In some implementations, monitoring the activity can be performed at a hypervisor level. In some implementations, monitoring the activity can be passive so as to be difficult for running processes to detect the monitoring. In some implementations, monitoring the activity is not tailored to a set of attacks and is not based on attack vectors or attack behaviors, and wherein attacks are discovered based on information gathered from a defending system during the information collection process.

Some implementations can include a non-transitory computer readable medium having instructions stored therein that, when executed by one or more processors, cause the one or more processors to perform a method. The method can include monitoring critical assets for a violation of one or more security requirements, and raising an alarm when a violation of one or more of the security requirements corresponding to the critical assets is detected. In some implementations, the method can also include performing an information collection phase including: capturing information about the critical assets corresponding to the one or more security requirements, generating a reachability graph representing one or more interrelationships between one or more of the critical assets and one or more other objects in the system, and generating a scope of control that maps security requirements for the critical assets to system calls that must be prevented in order to preserve the security requirements.

The method can further include monitoring activity in the system to: gather information about one or more running processes or applications, and use the gathered information about the one or more running processes or applications to detect any asset security requirements violation.

In some implementations, gathering information about one or more running processes includes execution tracing of events within an operating system. In some implementations, monitoring the activity includes monitoring at an asset-level of the system.

In some implementations, monitoring the activity is performed at a hypervisor level. In some implementations, monitoring the activity is passive so as to be difficult for running processes to detect the monitoring.

In some implementations, monitoring the activity is not tailored to a set of attacks and is not based on attack vectors or attack behaviors, and wherein attacks are discovered based on information gathered from a defending system during the information collection process.

Some implementations can include a system comprising one or more processors coupled to a nontransitory computer-readable medium having stored thereon software instructions that, when executed by the one or more processors, cause the one or more processors to perform operations. The operations can include monitoring critical assets for a violation of one or more security requirements, and raising an alarm when a violation of one or more of the security requirements corresponding to the critical assets is detected.

The operations can also include performing an information collection phase including capturing information about the critical assets corresponding to the one or more security requirements, generating a reachability graph representing one or more interrelationships between one or more of the critical assets and one or more other objects in the system, and generating a scope of control that maps security requirements for the critical assets to system calls that must be prevented in order to preserve the security requirements.

The operations can further include monitoring activity in the system to gather information about one or more running processes or applications, and use the gathered information about the one or more running processes or applications to detect any asset security requirements violation. In some implementations, gathering information about one or more running processes includes execution tracing of events within an operating system.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 10 shows an example snapshot from raw system calls in accordance with some implementations.

FIG. 19 shows an example hooking NtCreateFile in accordance with some implementations.

FIG. 20 shows an example monitoring notepad.exe in accordance with some implementations.

FIG. 21 shows an example OBJECT_ATTRIBUTES class in accordance with some implementations.

FIG. 22 shows example NtCreatFiel parameters in accordance with some implementations.

FIG. 25 shows an example of reading a text file by Notepad in accordance with some implementations.

FIG. 27 shows accessing a file by Notepad, WordPad, and MS Paint in accordance with some implementations.

FIG. 29 shows an example file being defended against any access by a process in accordance with some implementations.

FIG. 30 is a diagram showing that no process can access a protected file in accordance with some implementations.

FIG. 32 shows default protection folders in AVG in accordance with some implementations.

FIG. 33 shows customizing files to be secured inside folders in AVG in accordance with some implementations.

FIG. 39 shows a sample of generated system calls in accordance with some implementations.

FIG. 43 shows a sample of an AppTimer generated log file in accordance with some implementations.

DETAILED DESCRIPTION

Figure 1:
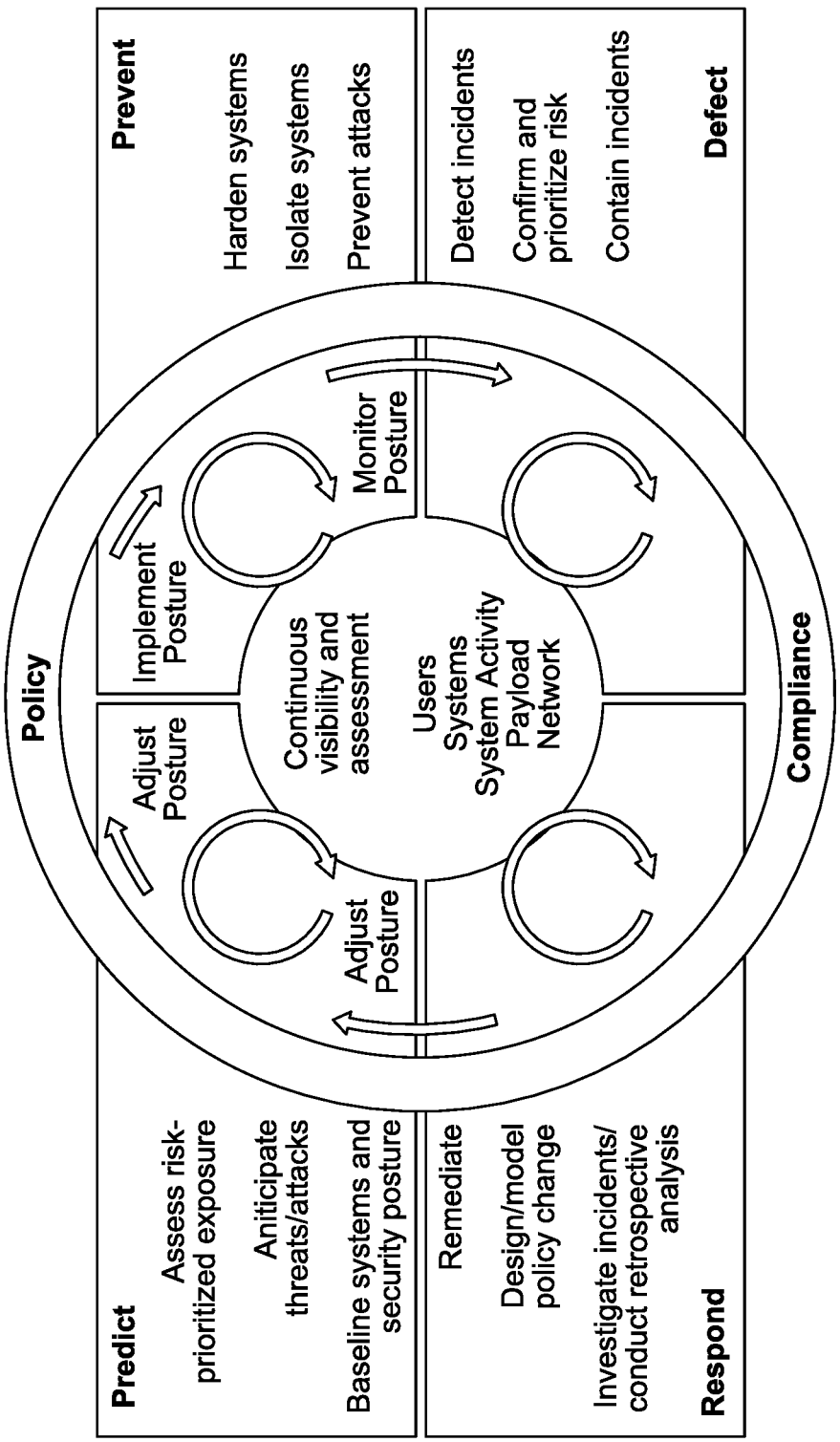
FIG. 1 is a diagram showing stages of an adaptive security in accordance with some implementations.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to methods, systems, and computer readable media for asset-based computer security.

Some implementations can include an asset-based security approach that can be generalized to work against any security attacks not just zero-day attacks. In some implementations, the asset-based security approach includes a scope-of-control component that can be adapted to any operating system, and thus be operating system independent. Some implementations can be integrated with binary analysis system, DRAKVUF, to map system call.

There is no doubt that there is a vicious battle between computer system attackers and defenders. Researchers as well as security practitioners have developed defense systems. These defense systems are built to defend against certain attack(s). To design such defense systems, attack vectors may need to be examined. For example, to design a signature-based defense system, previous attack vectors are collected and signatures developed for these attacks. Similarly, behavior-based security systems need to study the behavior of attack vectors to attempt to predict future attacks.

As such, a vital input parameter to these defense systems is the attack vector. The problem is that the attack vector is designed by the attacker. If the attacker changes the attack vector, then the defense system becomes obsolete. Some implementations include a defense system that has no input parameters from attackers, and thus is less susceptible to changes in attack vectors by attackers.

Adaptive security architectures were recently proposed to illustrate the four stages in any adaptive security technique as illustrated in FIG. 1. (See, R. van der Meulen, "Build Adaptive Security Architecture into Your Organization," 30 Jun. 2017. Available gartner.com, which is incorporated herein by reference). (See, S. G. Salvatore Sinno, Franco Negri, "Designing an Adaptive Security Architecture with Unisys Stealth and LogRhythm," 2017. Available at: logrhythm.com, which is incorporated herein by reference). (See, M. Sajjad, A. A. Abbasi, A. Malik, A. B. Altamimi, and I. M. Alseadoon, "Classification and mapping of adaptive security for mobile computing," IEEE Transactions on Emerging Topics in Computing, 2018, which is incorporated herein by reference).

Benefits of an adaptive approach to security include reducing the overhead in terms of time and resources as well as empowering security teams and engaging them in worthwhile activities that will limit serious damage and protect against advanced threats. Adaptive security architectures suggest four stages to the adaptive security life cycle:

Prevent: In this stage, known attacks are blocked before they create damage.

Defect: In this stage, detection tools will reduce the impact of attacks, propagated from the "Prevent" stage, by limiting the time these attacks have to act on a system.

Respond: This stage investigates any security issues that are discovered in the previous two stages. This will help avoid a recurrence of the same attack.

Predict: In this stage, technology will be used to anticipate potential threats.

Protective measures may involve one or a combination of deterrence, avoidance, prevention, detection, recovery, and correction that should form part of the enterprise's security approach. (See, R. Kissel, "Glossary of key information security terms," NIST Interagency Reports NIST IR, vol. 7298, no. 3, 2013, which is incorporated herein by reference),In addition, the term security has been defined by many researchers. Security can be defined as "A condition that results from the establishment and maintenance of protective measures that enable an enterprise to perform its mission or critical functions despite risks posed by threats to its use of information systems". (See, R. Kissel, "Glossary of key information security terms," NIST Interagency Reports NIST IR, vol. 7298, no. 3, 2013, which is incorporated herein by reference).

Security can also be defined as "A discipline concerned with protecting networks and computer systems against threats such as hacking exploits, malware, data leakage, spam and Denial of Service (DoS) attacks, as well as ensuring trusted access through mechanisms such as IPsec or SSL." (See, D. Schneider, "The state of network security," Network Security, vol. 2012, no. 2, pp. 14-20, 2012, which is incorporated herein by reference). Furthermore, resiliency is the ability to quickly adapt and recover from any known or unknown changes to the environment through holistic implementation of risk management, contingency, and continuity planning. Similar definition for resiliency states that it is stated in the ability to continue to: (a) operate under adverse conditions or stress, even if in a degraded or debilitated state, while maintaining essential operational capabilities; and (b) recover to an effective operational posture in a time frame consistent with mission needs.

From the definitions of security and resiliency, there are threats, assets, and protection systems. Threats can cause possible harm and therefore they are dangerous if they can penetrate to assets through exploiting a vulnerability.

The role of the protection system is either: deterrence, avoidance, prevention, detection, recovery, or correction, which can be defined as follows:

Deterrence is reducing an intelligent threat by discouraging action, such as by fear or doubt.

Avoidance is reducing a risk by either reducing the value of the potential loss or reducing the probability that the loss will occur.

Prevention is impeding or thwarting a potential security violation by deploying a countermeasure.

Detection is determining that a security violation is impending, is in progress, or has recently occurred, and thus make it possible to reduce the potential loss.

Recovery is restoring a normal state of system operation by compensating for a security violation, possibly by eliminating or repairing its effects.

Correction is changing a security architecture to eliminate or reduce the risk of re-occurrence of a security violation or threat consequence, such as by eliminating a vulnerability. (See, R. Kissel, "Glossary of key information security terms," NIST Interagency Reports NIST IR, vol. 7298, no. 3, 2013, which is incorporated herein by reference). (See, R. W. Shirey, "Internet security glossary, version 2," 2007. Available at: tools.ietf.org, which is incorporated herein by reference).

From the above definitions, one can see that resiliency deals with recovery and correction. That is, resiliency comes into existence after detecting an attack. Resiliency is launched after a security breach is detected. Some sub-areas of resiliency include positive network control, threat mitigation and incident handling and forensics. (See, CISCO, "Cybersecurity: Build Trust, Visibility and Resilience," 2011. Available at: cisco.com, which is incorporated herein by reference).

Some authors classify some resilience techniques as proactive and reactive. (See, H. Goldman, R. McQuaid, and J. Picciotto, "Cyber resilience for mission assurance," in Technologies for Homeland Security (HST), 2011 IEEE International Conference on. IEEE, 2011, pp. 236-241, which is incorporated herein by reference).Some of proactive techniques are segmentation, isolation, randomness, and distribution. While reactive techniques include deception, dynamic reconfiguration and dynamic composition.

As a summary of the subsection, see Table 1. This Table maps protective measures to the adaptive security life cycle.

TABLE 1

Mapping protective measures to the adaptive security life cycle.

| Security Protective Measure | Adaptive Security Life Cycle Stages | | | |
| --- | --- | --- | --- | --- |
| | Prevent | Defect | Respond | Predict |
| Deterrence | ✓ | | | |
| Avoidance | ✓ | | | |
| Prevention | ✓ | | | |
| Detection | | ✓ | | |
| Recovery | | | ✓ | |
| Correction | | | | ✓ |

Undoubtedly, the growing rate of security incidents and cost show that current security solutions cannot stop the sophistication and complexity of attacks. (See, S. A. Zonouz, R. Berthier, H. Khurana, W. H. Sanders, and T. Yardley, "Seclius: An information flow-based, consequence-centric security metric," IEEE Transactions on Parallel and Distributed Systems, vol. 26, no. 2, pp. 562-573, 2015, which is incorporated herein by reference). (See, L. Bilge and T. Dumitras, "Before we knew it: an empirical study of zeroday attacks in the real world," in Proceedings of the 2012 ACM conference on Computer and communications security. ACM, 2012, pp. 833-844, which is incorporated herein by reference).

This is evidenced by the fact that virus scan programs may always need to be updated. Widely used devices can be a source of complex and sophisticated attacks. For example, mobile devices can be used as an attack source, as an attack target or part of an attack. (See, J. Rouse, "Mobile devices— the most hostile environment for security?" Network Security, vol. 2012, no. 3, pp. 11-13, 2012, which is incorporated herein by reference). Furthermore, there is a vicious cycle between attackers and defenders, which is evident by the fact that virus scan programs always need to be current. This security phobia is the drive behind the efforts put forwards by academics and researchers to deal with security attacks to achieve more secure environments, and indirectly reduce big losses resulting from such attacks. (See, C. Tankard, "Advanced persistent threats and how to monitor and deter them," Network security, vol. 2011, no. 8, pp. 16-19, 2011, which is incorporated herein by reference). (See, R. van der Meulen, "Build Adaptive Security Architecture into Your Organization," 30 Jun. 2017. Available at: gartner.com, which is incorporated herein by reference). (See, S. G. Salvatore Sinno, Franco Negri, "Designing an Adaptive Security Architecture with Unisys Stealth and LogRhythm," 2017. Available: logrhythm.com, which is incorporated herein by reference). (See, M. Sajjad, A. A. Abbasi, A. Malik, A. B. Altamimi, and I. M. Alseadoon, "Classification and mapping of adaptive security for mobile computing," IEEE Transactions on Emerging Topics in Computing, 2018, which is incorporated herein by reference).

Traditional security solutions are detection-oriented and rely on information coming from the attacker. Traditional prevention and detection methodologies, like deploying antivirus software, IDS/IPS and firewalls, have become less effective.

These detection systems rely on history to catch attacks, but the more history an organization has enabled, the more performance degradation. Furthermore, detection systems are seen as offering a temporary solution because we cannot defend against all attacks. (See, C. Karr, "The IT security vicious cycle of "Assuming Compromise"," 10 Feb. 2015. Available at: itproportal.com, which is incorporated herein by reference). That is, if a new attack comes, history-matching will fail and behavior monitoring success will depend on how close the new attack's behavior is to the old attacks' behavior. As a result, the giant Symantec Corporation has announced that anti-virus is dead.

In order to stay ahead of attacks, organizations must keep away from predictive and reactive approaches. Attack-based taxonomies classify existing attacks to inform us of possible attacks one can expect. On the other hand, defense-based taxonomies determine suitable defense solutions for specific attacks. What is needed is a passive and proactive approach that provides protection against known and unknown attacks without the need for constant patches.

In attack-centric taxonomies, the analysis is done based on the attacker perspective. For instance, those taxonomies use the attack vector which considers the goal of the attack. If the attacker targets file integrity, which is not achieved but the attacker managed to harm the availability of the system, this is not considered from the attacker point of view. (See, S. A. Zonouz, R. Berthier, H. Khurana, W. H. Sanders, and T. Yardley, "Seclius: An information flow-based, consequence-centric security metric," IEEE Transactions on Parallel and Distributed Systems, vol. 26, no. 2, pp. 562-573, 2015, which is incorporated herein by reference). To countermeasure such an attack, a defender does not really know which security requirements nor which assets were the target of the attacker.

All of the above motivated us to study security from an asset perspective resulting in defense mechanisms with the following characteristics (a) asset owner view point, (b) proactive approach, and (c) defending assets.

Furthermore, an asset-based approach will clearly draw the boundaries between the various security spaces. As it is, security is spread across a spectrum of security prefixes coining security terms that include "physical security", "information security", "data security", "cyber security", and other additional terms of security. Currently, there are various definitions and interpretations to these terms that are either used interchangeably, overlapping, conflicting, or vague. Cyber security can be defined as "measures taken to protect a computer or computer system (as on the Internet) against unauthorized access or attack", while information security can be defined as "the protection of information and information systems from unauthorized access, use, disclosure, disruption, modification, or destruction in order to provide confidentiality, integrity, and availability". These two definitions are similar and as a result authors use information security and cyber security interchangeably. (See, S. A. Zonouz, R. Berthier, H. Khurana, W. H. Sanders, and T. Yardley, "Seclius: An information flow-based, consequence-centric security metric," IEEE Transactions on Parallel and Distributed Systems, vol. 26, no. 2, pp. 562-573, 2015, which is incorporated herein by reference). (See, R. Kissel, "Glossary of key information security terms," NIST Interagency Reports NIST IR, vol. 7298, no. 3, 2013, which is incorporated herein by reference).

Cyber security can be defined as "The protection of cyberspace itself, the electronic information, the information communication technology (ICT) that support cyberspace, and the users of cyberspace in their personal, societal and national capacity, including any of their interests, either tangible or intangible, that are vulnerable to attacks originating in cyberspace". (See, D. Schneider, "The state of network security," Network Security, vol. 2012, no. 2, pp. 14-20, 2012, which is incorporated herein by reference).

Furthermore, terms such as "data security" and "information security" are used almost interchangeably. Data security can be defined as "Protection of data from unauthorized (accidental or intentional) modification, destruction, or disclosure".

This definition is very similar to information security making the whole security spectrum vague in definition with no clear boundaries.

The failure of current security solutions may be the result of the attacker leading the security game. Defenders are followers and defense systems are built by defenders based on solicited input from the attacker. After the defender collects the input and builds its defense system, the attacker changes its attack vector and new defense system needs to be rebuilt and the vicious cycle continues. As such, current security solutions have several drawbacks: (a) provide solutions incapable of detecting unknown attacks, and (b) provide solutions that use predictive or reactive strategies.

Some implementations change the security paradigm such that the game will be led by defenders. This is a natural approach because the defender knows its assets, knows its security requirements, and knows the consequences of violating these security requirements. Therefore, the defender can build a defense system based on information it owns not solicited nor given by the attacker.

Some implementations have the following characteristics (a) relies only on information from the defender, (b) defending assets rather than defending against attacks, (c) proactive and (d) passive. The proposed security system relies on information supplied by the assets' owner. Therefore, the system discovers attacks based on information solicited by the defender. As such, the monitoring is not done to discover nor prevent attacks based on attack vectors nor attack behaviors. Since the proposed approach defends assets, it is generic and is not tailored to a set of attacks. Furthermore, the proposed approach is proactive that involves anticipating violations in advance of their actual occurrence and making appropriate organizational shifts in its response. Finally, the approach is passive since it works at the hypervisor-level. More importantly, it is transparent to the guest operating systems making it difficult for running processes to detect if they are being monitored.

Some implementations of the asset-based approach can include the following features:

1. Clear boundaries between the various security spaces.
2. Enables asset defense solutions.
3. Enables proactive defense solutions.
4. Enables passive defense solutions.

There is no doubt that security issues are on the rise and defense mechanisms are becoming one of the leading subjects for academic and industry experts. Some implementations include a focus on the security domain and provide a new approach to the security life cycle. Also described herein are a problem statement and a proposed solution to the problem.

In any security domain there exists assets, security requirements, attackers and defenders. Attackers exploit vulnerabilities and target one or more security requirements of one or more assets. These attacks are mitigated by safeguards and defenses. (See, "Resilience and Cyber Security of Technology in the Built Environment," 2013. Available at: cpni.gov.uk, which is incorporated herein by reference). Below are defined threats, vulnerabilities, and assets. Some sub-sections herein describe the various security spaces, security requirements, and link security requirements to security spaces.

External or internal malicious actions usually target a quality or state that is exposed. The nature of being exposed renders a system state to be defenseless. A goal of malicious actions can be to harm assets and can be achieved by penetrating through system weaknesses. Three important components of any security system include: targets or assets, aggressive actions or threats against the target, and weaknesses or vulnerabilities.

Assets can be defined as "a system resource that is (a) required to be protected by an information system's security policy, (b) intended to be protected by a countermeasure, or (c) required for a system's mission". See, R. W. Shirey, "Internet security glossary, version 2," 2007. Available at: tools.ietf.org, which is incorporated herein by reference). In the content of information security, computer security and network security, an asset can be defined as "any data, device, or other component of the environment that supports information-related activities. Assets generally include hardware (e.g. servers and switches), software (e.g. mission critical applications and support systems), and confidential information." (See, International Organization for Standardization, "ISO/IEC 13335-1:2004,". Available at: iso.org, which is incorporated herein by reference).

Assets should be protected from illicit access, use, disclosure, alteration, destruction, and/or theft, resulting in loss to the organization.

Therefore, assets are necessary for systems to achieve their functionality and there must be a security system to protect these assets. Vulnerabilities on the other hand, are defined as "the intersection of a system susceptibility or flaw, attacker access to the flaw, and attacker capability to exploit the flaw." To exploit a vulnerability, an attacker must use applicable tool or technique that can utilize a system weakness. Therefore, vulnerabilities are also known as the attack surface. Vulnerability can be defined as "A flaw or weakness in a system's design, implementation, or operation and management that could be exploited to violate the system's security policy". The vulnerability in a system can be in design, specification, in implementation, or in operation and management. (See, R. W. Shirey, "Internet security glossary, version 2," 2007. Available at: tools.ietf.org, which is incorporated herein by reference).

Finally, threats can be defined as "any circumstance or event with the potential to adversely impact organizational operations (including mission, functions, image, or reputation), organizational assets, or individuals through an information system via unauthorized access, destruction, disclosure, modification of information, and/or denial of service. Also, the potential for a threat-source to successfully exploit a particular information system vulnerability." (See, Information Technology Laboratory, "NIST Glossary of Information Security Terms CSRC," 2018. Available at: csrc.nist.gov, which is incorporated herein by reference).

One of the most essential and prominent security spaces is physical security space. Physical security can be defined as "the protection of personnel, hardware, programs, networks, and data from physical circumstances and events that could cause serious losses or damage to an enterprise, agency, or institution. This includes protection from fire, natural disasters, burglary, theft, vandalism, and terrorism". (See, "Physical security, From Wikipedia, the free encyclopedia." Available at: en.wikipedia.org, which is incorporated herein by reference). Also, physical security can be defined as "The protection afforded to an automated information system in order to attain the applicable objectives of preserving the integrity, availability, and confidentiality of information system resources (includes hardware, software, firmware, information, data, and telecommunications)". See, S. William, Computer Security: Principles And Practice. Pearson Education India, 2008, which is incorporated herein by reference).

Another definition of physical security can include "That part of security concerned with physical measures designed to safeguard personnel; to prevent unauthorized access to equipment, installations, material, and documents; and to safeguard against espionage, sabotage, damage, and theft".

From these definitions, it is noted that despite the target, if there is a physical contact then the whole attack fits in the physical security space. An example is given in where a program called "Private Eye" was designed to handle eavesdroppers and physical security threats by applying screen protection to identify legitimate users. (See, "Prevent prying eyes from seeing your critical data," 2015. Available at: optiolabs.com, which is incorporated herein by reference). If the user is not identified, then the monitor gets blurry to protect data and the intruder photo is captured. Other examples representing physical attacks are the cases of losing laptops and the other physical devices. (See, S. William, Computer Security: Principles And Practice. Pearson Education India, 2008, which is incorporated herein by reference).

Table 2 shows the threats, vulnerabilities, and assets involved in the physical space. Threats are various and can be cutting network cables or stealing a laptop. Vulnerabilities must be physical. Examples of such vulnerabilities are malfunctioning monitoring system or bypassing security guards. Finally, the goal of a physical attack is to target a physical entity that can be a human, building, or a device.

TABLE 2

| Security space | Physical Security Space | | |
| --- | --- | --- | --- |
| | Component | | |
| | Threats | Vulnerabilities | Assets |
| Physical | Various | Physical circumstances | Physical entity |

Before defining information and communication technology security space, information and information technology are differentiated. Information can be defined as "information can take on many forms. It can be printed or written on paper, stored electronically, transmitted by post or electronic means, shown on films, conveyed in conversation, and so forth". (See, J. Pike, "GlobalSecurity.Org Physical-Security Challenges." Available at: globalsecurity.org, which is incorporated herein by reference). It seems that there are two parts of information namely, electronic and non-electronic. Electronic information is referred to herein as e-information, and t-information is used to refer to non-electronic information or traditional information.

E-information must be stored, transmitted, and processed by technology, and is called information communication technology (e-ICT). (See, R. Von Solms and J. Van Niekerk, "From information security to cyber security," computers & security, vol. 38, pp. 97-102, 2013, which is incorporated herein by reference). On the other hand, storing or transmitting t-information, traditional technology or non-electronic technology must be used, which will refer to as t-information communication technology (t-ICT). So, whenever ICT security space is used it refers to the space in general and when there is a need to distinguish between them either e-ICT or t-ICT are used.

ICT is defined as "all aspects relating to defining, achieving and maintaining the confidentiality, integrity, availability, non-repudiation, accountability, authenticity, and reliability of information resources." It should be noted that the protection of information can be extended to the underlying information resources which is ICT, and that information security depends mostly on ICT security. An example of ICT security space attack includes, when a virus sabotaged 30,000 workstations and destroyed hard disks. Another example of ICT security space attack includes when an attacker gains access to a system because of insufficient authentication, insufficient validation, or insufficient password strength. The attacker here can take control of the system or initiate another attack vector.

Table 3 shows both e-ICT and t-ICT security spaces and draws the difference between these two security spaces using threats, vulnerabilities and assets. Assets are the targets need to be protected from various threats exploiting vulnerabilities.

TABLE 3

| Security space | ICT security space. | | |
|---|---|---|---|
| | Component | | |
| | Threats | Vulnerabilities | Assets |
| t-ICT | Various | t-ICT | t-ICT |
| e-ICT | Various | e-ICT | e-ICT |

Information is composed of two parts e-information and t-information with their own vulnerabilities. E-information vulnerability come from e-ICT, and similarly t-information vulnerability comes from t-ICT. Table 4 shows the threats, vulnerabilities, and assets of the information security space.

TABLE 4

| Security space | Information security space. | | |
|---|---|---|---|
| | Component | | |
| | Threats | Vulnerabilities | Assets |
| Information | Various | t-ICT, e-ICT | Information |

Information security space is ensuring safety and protection of information from illegal access. Some authors have defined information security as "the protection of information and its critical elements, including the systems and hardware that use, store, and transmit that information". It is obvious that systems and infrastructures play an important role in the information security process. May 13th 2011 is the date of the 2nd largest online data breach in the US. This breach is an information security space attack where attackers exploited computer systems through vulnerabilities such as misconfiguration, kernel flaws, design flaws or buffer overflow. (See, e.g., S. Gupta and P. Kumar, "Taxonomy of cloud security," International Journal of computer science, engineering and applications, vol. 3, no. 5, p. 47, 2013, which is incorporated herein by reference). (See, C. Simmons, C. Ellis, S. Shiva, D. Dasgupta, and Q. Wu, "AVOIDIT: A cyber attack taxonomy," 2009, which is incorporated herein by reference). (See, A. Abbas, A. El Saddik, and A. Miri, "A comprehensive approach to designing internet security taxonomy," in Electrical and Computer Engineering, 2006. CCECE'06. Canadian Conference on. IEEE, 2006, pp. 1316-1319, which is incorporated herein by reference).

As mentioned previously users misuse the term of cyber security and use it interchangeably with information security. Cyber security can be defined as "the protection of cyberspace itself, the electronic information, the ICTs that support cyberspace, and the users of cyberspace in their personal, societal and national capacity, including any of their interests, either tangible or intangible, that are vulnerable to attacks originating in cyberspace". (See, R. Von Solms and J. Van Niekerk, "From information security to cyber security," computers & security, vol. 38, pp. 97-102, 2013, which is incorporated herein by reference).

Another definition of cyber security can be "prevention of damage to, protection of, and restoration of computers, electronic communications systems, electronic communication services, wire communication, and electronic communication, including information contained therein, to ensure its availability, integrity, authentication, confidentiality, and nonrepudiation". (See, G. Hagan, "Glossary of defense acquisition acronyms & terms," Defense Acquisition University, 2009, which is incorporated herein by reference).

Examples of cyber security attacks include hacking Dropbox facility in July 2012. (See, e.g., S. Gupta and P. Kumar, "Taxonomy of cloud security," International Journal of computer science, engineering and applications, vol. 3, no. 5, p. 47, 2013, which is incorporated herein by reference) Usernames and passwords were stolen and used to access the Dropbox accounts. As a result, attackers start bullying Dropbox users causing what is known as cyber terrorism, cybercrime, or cyber espionage. (See, M. Uma and G. Padmavathi, "A Survey on Various Cyber Attacks and their Classification," Network Security, vol. 15, no. 5, pp. 390-396, 2013, which is incorporated herein by reference). Cyber security space is considered a complex space because it intersects with many other security spaces such as ICT and information. Table 5 shows components of a cyber security attack.

TABLE 5

| Security space | Cyber security space. | | |
|---|---|---|---|
| | Component | | |
| | Threats | Vulnerabilities | Assets |
| Cyber | Various | e-information, e-ICT | Human |

After clarifying the boundaries of the different security spaces, one can see that penetrating the physical security space can lead to all other security spaces enabling the attacker to skip some countermeasures in other security spaces. The attacker later can start a new attack vector in new security space. As such, the first step always comes from physical or ICT security spaces.

Table 6 summarizes security spaces. From the table, assets and their vulnerabilities must be considered in order to fit an attack to a security space. Assets alone or vulnerabilities alone cannot correctly classify attacks according to their security space. This shows us that classifying attacks from defenders point of view is impossible since vulnerabilities are not known to defenders. As such, defense systems are seriously hindered by the lack of information about attacks. (See, J. Mirkovic and P. Reiher, "A taxonomy of DDoS attack and DDoS defense mechanisms," ACM SIGCOMM Computer Communication Review, vol. 34, no. 2, pp. 39-53, 2004, which is incorporated herein by reference). This also shows us the importance of assets in mitigating attacks.

TABLE 6

Security Spaces

| Space | Threats | Vulnerabilities | Assets |
| --- | --- | --- | --- |
| Physical Security | Various | Physical circumstances | Physical entity |
| e-ICT Security | Various | e-ICT | e-ICT |
| t-ICT Security | Various | t-ICT | t-ICT |
| Information Security | Various | e-ICT, t-ICT | Information |
| Cyber Security | Various | e-ICT, e-information | Humans |

Security policies and priorities have become complicated, often ambiguous, and even inconsistent; not because of immediate threats but rather the unpredictable, uncertain, and blurring requirements of the security arena. (See, N. Rjaibi and L. B. A. Rabai, "Developing a Novel Holistic Taxonomy of Security Requirements," Procedia Computer Science, vol. 62, pp. 213-220, 2015, which is incorporated herein by reference). Furthermore, it is becoming an intricate puzzle for security engineers and architects to develop meaningful and realistic secure environments. Many taxonomies are introduced to deal with a single attack, and most of them fail to handle blended attacks. (See, T. Christian, "Security requirements reusability and the SQUARE methodology," CARNEGIE-MELLON UNIV PITTSBURGH Pa. SOFTWARE ENGINEERING INST, Tech. Rep., 2010, which is incorporated herein by reference).

A proposed taxonomy, known as AVOIDIT, managed to classify blended attacks. (See, C. Simmons, C. Ellis, S. Shiva, D. Dasgupta, and Q. Wu, "AVOIDIT: A cyber attack taxonomy," 2009, which is incorporated herein by reference). A holistic security requirement taxonomy was proposed were authors surveyed many security requirement papers and classified them in basic categories. (See, N. Rjaibi and L. B. A. Rabai, "Developing a Novel Holistic Taxonomy of Security Requirements," Procedia Computer Science, vol. 62, pp. 213-220, 2015, which is incorporated herein by reference).

Confidentiality can be defined in information security as "is the property, that information is not made available or disclosed to unauthorized individuals, entities, or processes." (See, K. Beckers, M. Heisel, and D. Hatebur, Pattern and Security Requirements. Springer, 2016, which is incorporated herein by reference). Confidentiality might seem similar to "privacy" but in fact the two terms are different. Rather, confidentially is a component of privacy that implements to protect data from unauthorized viewers. Examples of confidentiality of electronic data being compromised include laptop theft, password theft, or sensitive emails being sent to the incorrect individuals. (See, J. Andress, The basics of information security: understanding the fundamentals of Infuse in theory and practice. Syngress, 2014, which is incorporated herein by reference).

Therefore, confidentiality is basically a set of rules that limits access to information. Formally, confidentiality can be defined as "the prevention of unauthorized disclosure of information". (See, P. Savolainen, E. Niemela, and R. Savola, "A taxonomy of information security for service-centric systems," in Software Engineering and Advanced Applications, 2007. 33rd EUROMICRO Conference on. IEEE, 2007, pp. 5-12, which is incorporated herein by reference). Another definition can include "the assurance that information is not disclosed to unauthorized persons, processes or device". (See, W. V. Maconachy, C. D. Schou, D. Ragsdale, and D. Welch, "A model for information assurance: An integrated approach," in Proceedings of the 2001 IEEE Workshop on Information Assurance and Security, vol. 310. United States Military Academy, West Point. IEEE, 2001, which is incorporated herein by reference).

Integrity can be defined as "the prevention of unauthorized modification of information". (See, P. Savolainen, E. Niemela, and R. Savola, "A taxonomy of information security for service-centric systems," in Software Engineering and Advanced Applications, 2007. 33rd EUROMICRO Conference on. IEEE, 2007, pp. 5-12, which is incorporated herein by reference). Some authors define integrity as "the quality of an information system reflecting logical correctness and reliability of an operating system; the logical completeness of the hardware and software implementing the protection mechanisms; and the consistency of the data structures and occurrence of the stored data". (See, W. V. Maconachy, C. D. Schou, D. Ragsdale, and D. Welch, "A model for information assurance: An integrated approach," in Proceedings of the 2001 IEEE Workshop on Information Assurance and Security, vol. 310. United States Military Academy, West Point. IEEE, 2001, which is incorporated herein by reference). Another definition of integrity states "quality of an information system reflecting the logical correctness and reliability of the operating system, the logical completeness of the hardware and software implementing the protection mechanisms, and the consistency of the data structures and occurrence of the stored data". (See, "Glossary of Security Terms, Definitions, and Acronyms," Available at: cdse.edu, which is incorporated herein by reference). Yet another definition of data integrity is "the state that exists when computerized data is the same as that in the source documents and has not been exposed to accidental or malicious alteration or destruction. The property that data has not been exposed to accidental or malicious alteration or destruction."

Availability means expecting to find the entity when the user needs it. Availability can be defined as "the property of a system or a system resource being accessible, or usable or operational upon demand, by an authorized system entity, according to performance specifications for the system; i.e., a system is available if it provides services according to the system design whenever users request them, sure this property is a different than reliability". (See, R. W. Shirey, "Internet security glossary, version 2," 2007. Available at: tools.ietf.org, which is incorporated herein by reference). Another definition of availability includes "the prevention of unauthorized withholding of information". (See, P. Savolainen, E. Niemela, and R. Savola, "A taxonomy of information security for service-centric systems," in Software Engineering and Advanced Applications, 2007. 33rd EUROMICRO Conference on. IEEE, 2007, pp. 5-12, which is incorporated herein by reference). Yet another definition if availability includes "the timely, reliable access to data and information services for authorized user". (See, W. V. Maconachy, C. D. Schou, D. Ragsdale, and D. Welch, "A model for information assurance: An integrated approach," in Proceedings of the 2001 IEEE Workshop on Information Assurance and Security, vol. 310. United States Military Academy, West Point. IEEE, 2001, which is incorporated herein by reference).

Access control is a vital step in forcing security. Access control can be defined as "protection of system resources against unauthorized access". (See, R. W. Shirey, "Internet security glossary, version 2," 2007. Available at: tools.ietf.org, which is incorporated herein by reference). The same paper gave another definition to access control as "a process by which use of system resources is regulated according to a security policy and is permitted only by authorized entities (users, programs, processes, or other systems) according to that policy".

A third definition provided includes "limitations on interactions between subjects and objects in an information system". (See, N. Rjaibi and L. B. A. Rabai, "Developing a Novel Holistic Taxonomy of Security Requirements," Procedia Computer Science, vol. 62, pp. 213-220, 2015, which is incorporated herein by reference). Some authors divided access control into identification, authentication, and authorization.

Other researchers define authentication as composing of two steps namely identification and verification. (See, R. W. Shirey, "Internet security glossary, version 2," 2007. Available at: tools.ietf.org, which is incorporated herein by reference). Authentication is defined as "the process of verifying a claim that a system entity or system resource has a certain attribute value." Another definition of authentication includes "security service designed to establish the validity of a transmission, message, or originator, or a means of verifying an individual's authorizations to receive specific categories of information." (See, W. V. Maconachy, C. D. Schou, D. Ragsdale, and D. Welch, "A model for information assurance: An integrated approach," in Proceedings of the 2001 IEEE Workshop on Information Assurance and Security, vol. 310. United States Military Academy, West Point. IEEE, 2001, which is incorporated herein by reference).

Identification means to recognize a user by the system. Identification can be defined as "an act or process that presents an identifier to a system so that the system can recognize a system entity and distinguish it from other entities". (See, R. W. Shirey, "Internet security glossary, version 2," 2007. Available at: tools.ietf.org, which is incorporated herein by reference).

Verification can be defined as "the process of examining information to establish the truth of a claimed fact or value". Verification can also defined as "the process of comparing two levels of system specification for proper correspondence, such as comparing a security model with a top-level specification, a top-level specification with source code, or source code with object code". As such, verification is presenting authentication information that acts as evidence.

This evidence proves the binding between the attribute and that for which it is claimed. Authorization is giving permission or privilege to users after being authenticated. Basically, authorization is an approval granted to an entity to access resource.

Non-repudiation can be defined as "a security service that provide protection against false denial of involvement in an association (especially a communication association that transfers data)". For example, two separate types of denial are possible. An entity can deny that it sent a data object, or it can deny that it received a data object. Therefore, two separate types of non-repudiation service are possible. Non-repudiation is also defined in as "the assurance the sender of the data is provided with proof of delivery and the recipient is provided with proof of the sender's identity, so neither can later deny having processed the data". (See, W. V. Maconachy, C. D. Schou, D. Ragsdale, and D. Welch, "A model for information assurance: An integrated approach," in Proceedings of the 2001 IEEE Workshop on Information Assurance and Security, vol. 310. United States Military Academy, West Point. IEEE, 2001, which is incorporated herein by reference).

Some researchers define non-repudiation as "prevention of attacks done by one of the two parties in the communication, the sender or the receiver, one of them later may deny that he has sent or received the message. Like when a bank customer asking his bank to send some money to a third party but later denying he has made such request". (See, B. A. Forouzan and D. Mukhopadhyay, Cryptography And Network Security (Sie). McGraw-Hill Education, 2011, which is incorporated herein by reference).

Accountability means the responsibility of one's actions. Accountability can be defined as "assignment of a document control number, including copy number, which is used to establish individual responsibility for the document and permits traceability and disposition of the document". (See, "Glossary of Security Terms, Definitions, and Acronyms," 8 Mar. 2016. Available at: cdse.edu, which is incorporated herein by reference). Accountability can also be defined as "the property of a system or system resource that ensures that the actions of system entity may be traced uniquely to that entity, which can then be held responsible for its actions". (See, R. W. Shirey, "Internet security glossary, version 2," 2007. Available at: tools.ietf.org, which is incorporated herein by reference). Therefore, to offer accountability, a system should positively associate users' identities with the method and time access. That way, detection and subsequent security investigation can be done. Users are held accountable for their actions after being notified of their behavior for abusing the system. Proper consequences should be associated (with such abuse) and enforced.

The term "anonymous message" typically means the sender and/or the receiver of the message are not revealed. In many countries, anonymous messages are protected by law and must be delivered as regular messages. Being unknown is the goal when achieving anonymity. Anonymity can be defined as "the condition of an identity being unknown or concealed". To achieve this definition and to maintain the service at the same time, a third party must hide user information.

Table 7 answers the following question: in which security spaces is a certain security requirement is achievable. The answer to this question helps inform which security spaces should be considered to provide a holistic security solution.

For example, if a security system needs to provide a holistic availability solution for a certain asset, in which security spaces should availability be provided. In Table 7, if the security requirement is achievable in the corresponding security space, the table entry is marked Y. Otherwise, the table entry is marked N.

To elaborate on Table 7, an explanation for each row in the table by picking each security requirement and illustrate its mapping to the different security spaces is provided.

Access Control: In the physical security space, access control security requirement is achievable by physical barriers such as doors, walls, or security gates.

TABLE 7

Mapping security requirements to security spaces.

| Security requirements | Spaces | | | |
|---|---|---|---|---|
| | Physical security | Information security | e-ICT security | t-ICT sec security |
| Access Control | Y | Y | Y | Y |
| Availability | Y | Y | Y | Y |
| Integrity | N | Y | Y | Y |
| Confidentiality | N | Y | N | N |
| Anonymity | N | Y | N | N |
| Non-Repudiation | N | N | Y | Y |
| Accountability | N | N | Y | Y |

Security gates can be used to achieve physical access control. Furthermore, in the information security space, passwords are used on the file level (i.e., information level) and this can help achieve information access control. (See, Hitachi, "Physical security solution," 2015. Available at: hitachi.com, which is incorporated herein by reference). (See, Hitachi, "Physical security solution," 2015. Available at: hitachi.com, which is incorporated herein by reference).

Users can also easily set passwords on their web pages and these web pages are considered files. Considering e-ICT security space, access control can be achieved on different e-ICT resources such as wireless networks, PCs, and Servers. Again, this e-ICT access control can be achieved simply through using passwords. e-ICT access control can be applied to computers or networks. Finally, t-ICT controls access to information using traditional techniques such as single-factor authentication by using secure keywords.

Availability: Availability in physical security space is applicable. To achieve availability in physical space, a solution can be applied to insure physical availability for physical entities such as network cables for instance. Video surveillance systems can be introduced to maintain availability. (See, Hitachi, "Physical security solution," 2015. Available at: hitachi.com, which is incorporated herein by reference). This can be considered as a combination of both e-ICT and physical security spaces. Physical security guards, instead of cameras, can be used to achieve availability at the physical security space. Some implementations can also achieve availability by performing backups and redundancy. (See, J.-H. Hwang, Y. Xing, U. Cetintemel, and S. Zdonik, "A cooperative, self-configuring high-availability solution for stream processing," in Data Engineering, 2007. ICDE 2007. IEEE 23rd International Conference on. IEEE, 2007, pp. 176-185, which is incorporated herein by reference). Some authors introduced high availability systems for steam processing. Top companies also provide products such as "IBM DB2 HADR" (High Availability Disaster Recovery), "Oracle Data Guard" and "Microsoft SQL Server 2005 Database Mirroring". Replication can also be used to achieve availability, where HADOOP is introduced to achieve high availability through metadata replication. (See, F. Wang, J. Qiu, J. Yang, B. Dong, X. Li, and Y. Li, "Hadoop high availability through metadata replication," in Proceedings of the first international workshop on Cloud data management. ACM, 2009, pp. 37-44, which is incorporated herein by reference). E-ICT availability solutions can be achieved by: (a) producing reliable e-ICT to persist attacks and maintain availability, (b) having reliable servers, or (c) constructing reliable networks immune to disturbances from attacks. (See, A. Juels and A. Oprea, "New approaches to security and availability for cloud data," Communications of the ACM, vol. 56, no. 2, pp. 64-73, 2013, which is incorporated herein by reference). For t-ICT security space, availability is achievable by manufacturing and designing technology which can maintain availability for stored information. This technology can be, for example, producing papers which can survive and maintain information for long periods of time.

Integrity: Integrity is achievable in information, e-ICT, and t-ICT security spaces, but not in physical security spaces. In information security space, this can be provided by creating backups on information level, hashing algorithms such as MD5, HMAC, or SHA1 to calculate hashes to verify integrity. (See, J.-H. Hwang, Y. Xing, U. Cetintemel, and S. Zdonik, "A cooperative, self-configuring high-availability solution for stream processing," in Data Engineering, 2007. ICDE 2007. IEEE 23rd International Conference on. IEEE, 2007, pp. 176-185, which is incorporated herein by reference). (See, D. R. Gibson, "Confidentiality, Integrity, Availability—Security Triad," 2015. Available at: blogs.getcertifiedgetahead.com, which is incorporated herein by reference). (See, D. Gibson, CompTIA Security+: Get Certified Get Ahead SYO-201 Study Guide. BookSurge Publishing, 2009, which is incorporated herein by reference).

For e-ICT security space, integrity can be achieved by fault tolerance algorithms either hardware or software. (See, G. K. Saha, "A single-version algorithmic approach to fault tolerant computing using static redundancy," CLEI Electronic Journal, vol. 9, no. 2, 2006, which is incorporated herein by reference). An approach was introduced to tolerate various malicious code modifications and transient-faults during run time of a computing application system. Furthermore a security solution for data integrity in wireless bio sensor networks was introduced. (See, V. B. Balasubramanyn, G. Thamilarasu, and R. Sridhar, "Security Solution For Data Integrity In Wireless BioSensor Networks," in Distributed Computing Systems Workshops, 2007. ICDCSW'07. 27th International Conference on. IEEE, 2007, pp. 79-79, which is incorporated herein by reference). For t-ICT security space, handwriting analysis and recognition techniques can be used to achieve integrity.

Confidentiality: There is no solution to apply confidentiality at the e-ICT, nor the t-ICT, nor the physical security spaces. Confidentiality is achievable in the information security space and techniques such as steganography and encryption can be used to achieve confidentiality at the information security space. Steganography can be used to conceal the fact that a secret is sent inside a message. (see, M. Hussain and M. Hussain, "A survey of image steganography techniques," 2013, which is incorporated herein by reference). Traditional methods like using invisible ink in communication is another way to achieve confidentiality. Finally, encryption also can achieve confidentiality by protecting message contents. (See, B. A. Forouzan and D. Mukhopadhyay, Cryptography And Network Security (Sie). McGraw-Hill Education, 2011, which is incorporated herein by reference).

Anonymity: a holistic anonymity security requirement solution can include an information security space such as an anonymous routing protocol to wireless network, that is similar to the onion routing concept used in wired networks, also VPN can provide a solution to an anonymity security requirement. (See, A. Boukerche, K. El-Khatib, L. Xu, and L. Korba, "A Novel Solution for Achieving Anonymity in Wireless Ad hoc Networks," in Proceedings of the 1st ACM international workshop on Performance evaluation of wireless ad hoc, sensor, and ubiquitous networks. ACM, 2004, pp. 30-38, which is incorporated herein by reference).

Another solution is to have a third party for exchanging information, aliasing also can achieve this solution by using identified number instead of name, a financial institution may assign account numbers, so transactions can remain relatively anonymous with the transactions accepted as legitimate. (See, R. W. Shirey, "Internet security glossary, version 2," 2007. Available at: tools.ietf.org, which is incorporated herein by reference). (See, B. A. Forouzan and D. Mukhopadhyay, Cryptography And Network Security (Sie). McGraw-Hill Education, 2011, which is incorporated herein by reference). There is no solution to apply anonymity security requirement at the e-ICT, t-ICT, and physical security spaces.

Non-Repudiation: to have an information non-repudiation security solution in a t-ICT security space registered mail used as a solution, which evolved to become digital signature in e-ICT security space, experts found that even digital signature is not enough so they invent capturing unique biometric information and other data about the sender, another solution can include a fair non-repudiation protocol that requires a trusted third party. (See, M. Rouse, "Nonrepudiation Definition,". Available at: searchsecurity.techtarget.com, which is incorporated herein by reference). (See, J. Zhou and D. Gollman, "A fair non-repudiation protocol," in Security and Privacy, 1996. Proceedings., 1996 IEEE Symposium on. IEEE, 1996, pp. 55-61, which is incorporated herein by reference). There is no solution to apply non-repudiation security requirement at the information security space or at physical security space.

Accountability: to have a holistic accountability security requirement solution in e-ICT security space, specifying transactions for which you want more than one approval, and authorize different levels of account access to achieve accountability in online business, for t-ICT security space, can include providing users with different contradicting information to reveal the spoke man. (See, "Citi business online," 2016. Available at: businessaccess.citibank.citigroup.com, which is incorporated herein by reference). There is no solution to apply accountability security requirement at the physical security space nor at information security space.

Security requirements can be classified based on attack type and attack target as shown in Table 8. Some have classified attack types to either active or passive. (See, B. A. Forouzan and D. Mukhopadhyay, Cryptography And Network Security (Sie). McGraw-Hill Education, 2011, which is incorporated herein by reference). They described an active attack as an attack that may change the data or harm the system as such attacks threatening integrity or availability as active attacks. They also mentioned that in passive attacks, the attacker's goal is just to obtain information and therefore, the attacker does not modify data or harm the system. The system continues its normal operation.

However, the attack may harm the sender or the receiver. From this classification, the attack target was added. For example, if the assets are the target, then the attackers need to use the assets to achieve their goal. That is, active attacks such as "Availability" target assets is an attack on the availability of an asset. On the other hand, passive attacks such as "Anonymity" target either the sender or the receiver and not the asset. For example, "anonymity" is applied to either the sender or the receiver. Unlinkability of sender and receiver also is a way of implementing "Anonymity" which means that though the sender and receiver can each be identified as participating in some communication, they cannot be identified as communicating with each other.

TABLE 8

Classification of security requirements.

| Security Requirements | Attack Attributes | |
|---|---|---|
| | Type | Target |
| Access control | Active | Asset |
| Availability | Active | Asset |
| Integrity | Active | Asset |
| Confidentiality | Passive | Asset |
| Anonymity | Passive | Sender/Receiver |
| Non-repudiation | Passive | Sender/Receiver |
| Accountability | Passive | Sender-Receiver |

Damage can be done by either internal or external events and these events are basically threats. Threats exploit weakness to perform unauthorized actions within a system. Threats target to damage assets and the damage intensity is correlated with how critical the asset is. These three components (threats, vulnerabilities, assets) are played by different actors in different security spaces as explained in this chapter. Observing this, one can draw the following remarks:

- To classify attacks, one needs to consider assets and vulnerabilities. This consideration is impossible since vulnerabilities are not known to the defender. Therefore, defenders always have incomplete information to establish a defense system.
- For threats and vulnerabilities, attackers have the upper hand since they themselves decide on the attack vector and on the vulnerability to gain access to the system in order to deliver a malicious outcome (i.e., damaging the asset).
- The goal of the attack is to inflict harm or compromise the security requirements of the targeted asset. As such, the attacker needs to learn the critical assets. But since the defender owns these assets, the defender controls this learning phase. That is why zero-day ransomware attacks encrypt all files hoping that a subset of these encrypted files are important for the owner. If zero-day ransomware attacks know the critical files, they will not waste time and effort on other non-critical files.
- Focusing on assets will prevent an attacker from achieving the attack goal.
- This is evident from Table 8. Protecting assets will render attacks useless since this will prevent all attacks violating the CIA triad of confidentiality, integrity, and availability known as the heart of information security Researches started introducing requirements-based taxonomies to gain knowledge of the needs to achieve secure systems and continued to understand and analyze the existing attacks to gain knowledge of the behavior and the damage caused by such attacks. Finally, researchers shifted to defense-based taxonomies to countermeasure a specific attack with an effective defense mechanism. (See, C. Calderon and E. Marta, "A taxonomy of software security requirements," Revista Avances en Sistemas e Informatica, vol. 4, no. 3, 2007, which is incorporated herein by reference). (See, J. D. Howard and T. A. Longstaff, "A common language for computer security incidents," Sandia National Laboratories, vol. 10, p. 751004, 1998, which is incorporated herein by reference). (See, R. P. van Heerden, B. Irwin, and I. Burke, "Classifying network attack scenarios using an Ontology," in Proceedings of the 7th International Conference on Information-Warfare & Security (ICIW 2012), 2012, pp. 311-324, which is incorporated herein by reference). (See, G. Loukas, D. Gan, and T. Vuong, "A taxonomy of cyber attack and defense mechanisms for emergency management networks," in Pervasive Computing and Communications Workshops (PERCOM Workshops), 2013 IEEE International Conference on. IEEE, 2013, pp. 534-539, which is incorporated herein by reference). (See, K. S. Killourhy, R. A. Maxion, and K. M. Tan, "A defense-centric taxonomy based on attack manifestations," in Dependable Systems and Networks, 2004 International Conference on. IEEE, 2004, pp. 102-111, which is incorporated herein by reference). (See, A. Shameli-Sendi, H. Louafi, W. He, and M. Cheriet, "A defense-centric model for multi-step attack damage cost evaluation," in Future Internet of Things and Cloud (Fi-Cloud), 2015 3rd International Conference on. IEEE, 2015, pp. 145-149, which is incorporated herein by reference). (See, A. Shameli-Sendi, M. Cheriet, and A. Hamou-Lhadj, "Taxonomy of intrusion risk assessment and response system," Computers & Security, vol. 45, pp. 1-16, 2014, which is incorporated herein by reference). (See, A. Shameli-Sendi, R. Aghababaei-Barzegar, and M. Cheriet, "Taxonomy of information security risk assessment (ISRA)," Computers & Security, vol. 57, pp. 14-30, 2016, which is incorporated herein by reference).

The attack-based taxonomies are widely researched whereas the defense-based taxonomies are hindered by several serious facts, lack of detailed information about attack information, lack of benchmarks, and difficulty of large-scale testing in defense systems. (See, J. Mirkovic and P. Reiher, "A taxonomy of DDoS attack and DDoS defense mechanisms," ACM SIGCOMM Computer Communication Review, vol. 34, no. 2, pp. 39-53, 2004, which is incorporated herein by reference).

In a nutshell, attack-based taxonomies illustrate the process of classifying attacks and enables administrators to gain common security knowledge to become alert in defending when attacks are detected. (See, C. Simmons, C. Ellis, S. Shiva, D. Dasgupta, and Q. Wu, "AVOIDIT: A cyber attack taxonomy," 2009, which is incorporated herein by reference). On the other hand, defense-based taxonomies help in determining the suitable defense mechanism.

One of the well-known requirements-based taxonomies is referred to as Confidentiality-Integrity-Availability (CIA) triad model. (See, C. Perrin, "The CIA triad," Dostopno na: techrepublic.com, 2008, which is incorporated herein by reference). (See, G. Stoneburner, C. Hayden, and A. Feringa, "Engineering principles for information technology security (a baseline for achieving security)," BOOZALLEN AND HAMILTON INC MCLEAN Va., Tech. Rep., 2001, which is incorporated herein by reference). CIA is referred to as at the heart of information security. Later, other taxonomies added more security requirements to CIA, arguing that CIA is not sufficient.

Some authors reintroduced a model known as "Parkerian hexad" which was introduced in 2002 by Donn B. Parker. This model is a set of 6 information security requirements. Adding possession, authenticity and utility to the CIA triad model. (See, G. Pender-Bey, "The parkerian hexad." Available at: cs.lewisu.edu, which is incorporated herein by reference).

Some authors introduced Access Control, Authentication, and Accounting (AAA) triad model. AAA is the cornerstone of any systematic discipline of security. (See, M. Chapple, D. Littlejohn Shinder, and E. Tittel, "TICSA Certification: Information Security Basics," Pearson IT Certification, 2002, which is incorporated herein by reference). Other researchers have introduced security requirements for software systems representing the basic security policy needed in order to protect software system. (See, M. Alam, "Software Security Requirements Checklist," International Journal of Software Engineering, USE, vol. 3, no. 1, pp. 53-62, 2010, which is incorporated herein by reference). (See, J. Jürjens, Secure systems development with UML. Springer Science & Business Media, 2005, which is incorporated herein by reference). It has 8 security requirements namely, fair exchange, freshness, secure information flow, guarded access, role base access control, authenticity, secrecy and integrity, and non-repudiation.

A detailed quality model for safety, security, and survivability engineering was introduced. (See, D. G. Firesmith, "A taxonomy of security-related requirements," in International Workshop on High Assurance Systems (RHAS'05), 2005, pp. 29-30, which is incorporated herein by reference). This model describes relationships between concepts that contribute to systemic qualities and decomposed some of the security requirements such as access control to (identification, authentication, authorization), integrity to (data integrity, hardware integrity, personnel integrity, software integrity), and privacy to (anonymity, confidentiality).

An Accelerated Requirements Method (ARM) groups security requirements and utilizes a structured categorization technique to group and name security requirements. (See, N. R. Mead and T. Stehney, Security quality requirements engineering (SQUARE) methodology. ACM, 2005, vol. 30, no. 4, which is incorporated herein by reference). In this paper, authors defined six groups, each contains one to four security requirements, namely they are confidentiality, access control, data integrity, manageability, usability, and authentication.

A taxonomy of software security requirements proposed two levels of security requirements. (See, C. Calderón and E. Marta, "A taxonomy of software security requirements," Revista Avances en Sistemas e Informatica, vol. 4, no. 3, 2007, which is incorporated herein by reference). The first level includes integrity, availability, confidentiality and non-repudiation. The second level redefines each of the first level security requirements into more specific terms. For example, availability is refined as (response time requirements, expiration requirements, and resource allocation requirements).

One taxonomy includes classifying security requirements as confidentiality, integrity, availability, accountability, and conformance. (See, T. Christian, "Security requirements reusability and the SQUARE methodology," CARNEGIE-MELLON UNIV PITTSBURGH Pa. SOFTWARE ENGINEERING INST, Tech. Rep., 2010, which is incorporated herein by reference). Each of these requirements branches into sub-categories. A holistic taxonomy of security requirements has been proposed. (See, N. Rjaibi and L. B. A. Rabai, "Developing a Novel Holistic Taxonomy of Security Requirements," Procedia Computer Science, vol. 62, pp. 213-220, 2015, which is incorporated herein by reference). Authors examined similarities and differences between all previously published security requirements classifying them all into two levels, namely basic and cofactor levels. In this paper, security requirements were classified into 13 basic requirements. Each one of these basic 13 security requirements has from 1 to 8 cofactors. For example, privacy is one of the basic requirements and it has 8 cofactors listed as trace, cardinality, content and notification, attribution, aggregation, encryption, confidentiality and anonymity.

Continuing the efforts of classifying and defining security requirements, research efforts are also channeled towards classifying and understanding attacks. Researchers have provided an incident taxonomy based on the attack classification by events. (See, J. D. Howard and T. A. Longstaff, "A common language for computer security incidents,"

Sandia National Laboratories, vol. 10, p. 751004, 1998, which is incorporated herein by reference). These attacks are analyzed to have the following steps: target, vulnerability, action, tools and unauthorized result. These steps basically determine the attacks directed at a specific target of the attacker. In order for the attacker to reach the target, a specific vulnerability must be utilized resulting in a changed state. This gives a whole picture of all the steps involved in an attack and how an attack grows.

A comprehensive taxonomy of attacks targeting availability has been developed. (See, J. Mirkovic and P. Reiher, "A taxonomy of DDoS attack and DDoS defense mechanisms," ACM SIGCOMM Computer Communication Review, vol. 34, no. 2, pp. 39-53, 2004, which is incorporated herein by reference). The aim was to classify attack strategies and list attributes of attack strategies that are essential in developing countermeasures classified by possibility of characterization, attack rate dynamics, degree of automation, source address validity, exploited weakness, victim type, persistent agent set, and impact on victim. A list of attacks were mapped to specific countermeasure and security requirement. (See, A. Abbas, A. El Saddik, and A. Miri, "A comprehensive approach to designing internet security taxonomy," in Electrical and Computer Engineering, 2006. CCECE'06. Canadian Conference on. IEEE, 2006, pp. 1316-1319, which is incorporated herein by reference).

A group of academics at Memphis University introduced "AVOIDIT", a cyber-attack taxonomy describing the nature of an attack using 5 major classification: attack vector, defense, operational impact, informational impact, and attack target. (See, C. Simmons, C. Ellis, S. Shiva, D. Dasgupta, and Q. Wu, "AVOIDIT: A cyber attack taxonomy," 2009, which is incorporated herein by reference). Classification by the defense mechanism to provide information to the system administrator concerning attack remediation or mitigation policies.

Mitigation includes action such as removing from network, whitelisting, or referencing advertisements. Remediation includes system patching and code correction. Attack targets might be the OS, the network, a process, or data. This taxonomy lacks defense strategies and cannot deal with physical attacks such as the ones initiated by USB drives. AVOIDIT is able to efficiently categorize mixed attacks.

An extensive taxonomy for computer network attacks was explored. (See, R. P. van Heerden, B. Irwin, and I. Burke, "Classifying network attack scenarios using an Ontology," in Proceedings of the 7th International Conference on Information-Warfare & Security (ICIW 2012), 2012, pp. 311-324, which is incorporated herein by reference). This taxonomy introduced 4 hierarchical levels and succeeded to include attackers and defenders. A taxonomy for security threats in emergency management has been developed. (See, G. Loukas, D. Gan, and T. Vuong, "A taxonomy of cyber attack and defense mechanisms for emergency management networks," in Pervasive Computing and Communications Workshops (PERCOM Workshops), 2013 IEEE International Conference on. IEEE, 2013, pp. 534-539, which is incorporated herein by reference).

Authors classified attacks by three types: network type, function affected, and attack factor. They examined SMS flooding attacks cellular network, public safety mobile network issue, GPS spoofing attacks in satellite systems, and cyber threats in wired networks. Authors also examined five affected functions, which are: detection of emergencies, planning of operation, transportation, medical service and communication with the public. From the attack vector point of view, authors examined at network misuse (vulnerability of nodes, masquerading, flooding), and software misuse (executed remotely and locally).

Some researchers introduced attack countermeasures used for security analysis. (See, A. Roy, D. S. Kim, and K. S. Trivedi, "Attack countermeasure trees (ACT): towards unifying the constructs of attack and defense trees," Security and Communication Networks, vol. 5, no. 8, pp. 929-943, 2012, which is incorporated herein by reference). These attack countermeasures become a vital factor when analyzing the system from the security perspective.

A defense taxonomy of mechanisms for Distributed Denial of Services (DDoS) was introduced. (See, J. Mirkovic and P. Reiher, "A taxonomy of DDoS attack and DDoS defense mechanisms," ACM SIGCOMM Computer Communication Review, vol. 34, no. 2, pp. 39-53, 2004, which is incorporated herein by reference). Three attributes were taken into consideration to classify defense strategies. These attributes are cooperation degree (autonomous, cooperative or interdependent), activity level (preventive or reactive), and deployment location (victim network, intermediate network or source network).

A defense-centric taxonomy was introduced. (See, K. S. Killourhy, R. A. Maxion, and K. M. Tan, "A defense-centric taxonomy based on attack manifestations," in Dependable Systems and Networks, 2004 International Conference on. IEEE, 2004, pp. 102-111, which is incorporated herein by reference). This taxonomy is based on attack manifestations. The manifestations depend on comprising sequences of system calls. This sequence is generated from the activity or presence of an attack.

Four classes were introduced in the taxonomy: manifestation by foreign symbol, manifestation by minimal foreign sequence, manifestation by dormant sequences and manifestation by being anomalous.

A security threats taxonomy was introduced. (See, G. Loukas, D. Gan, and T. Vuong, "A taxonomy of cyber attack and defense mechanisms for emergency management networks," in Pervasive Computing and Communications Workshops (PERCOM Workshops), 2013 IEEE International Conference on. IEEE, 2013, pp. 534-539, which is incorporated herein by reference). This classification contains three categories: defense type, degree of distribution and organizational element. Organizational element is further branched to system, process and human, while by defense type is divided to preventive (authentication, resilience and self-awareness) and reactive (detection and response).

A reliable defense framework was proposed. (See, A. Shameli-Sendi, H. Louafi, W. He, and M. Cheriet, "A defense-centric model for multi-step attack damage cost evaluation," in Future Internet of Things and Cloud (FiCloud), 2015 3rd International Conference on. IEEE, 2015, pp. 145-149, which is incorporated herein by reference). In this framework, authors used countermeasures as well as attacks to recommend an efficient and reliable defense mechanism. Authors assess multi-step attack damages to identify corresponding defense countermeasures in order to mitigate service downtime.

Exploring intrusion detection systems to reduce infiltration done by attackers, researchers introduced a taxonomy for intrusion response system and intrusion detection system classifying defenses by: response cost, level of automation, response time, adjustment ability. (See, A. Shameli-Sendi, M. Cheriet, and A. Hamou-Lhadj, "Taxonomy of intrusion risk assessment and response system," Computers & Security, vol. 45, pp. 1-16, 2014, which is incorporated herein by reference). The same group of researchers introduced a security risk assessment taxonomy adding to their previous work risk assessment as a defense classification attribute. (See, A. Shameli-Sendi, R. Aghababaei-Barzegar, and M. Cheriet, "Taxonomy of information security risk assessment (ISRA)," Computers & Security, vol. 57, pp. 14-30, 2016, which is incorporated herein by reference).

Some have explored a defense-centric attack metric, neglecting the effect of ambiguous vulnerability and uncovered attacks, to evaluate the damage done to critical assets by ranking intrusion detection system (IDS) alerts in an automatic manner. (See, S. A. Zonouz, R. Berthier, H. Khurana, W. H. Sanders, and T. Yardley, "Seclius: An information flow-based, consequence-centric security metric," IEEE Transactions on Parallel and Distributed Systems, vol. 26, no. 2, pp. 562-573, 2015, which is incorporated herein by reference). This evaluation process depends on a graph connecting assets to consequences for each of the system requirements.

Some authors have employed several data mining techniques to detect and classify zeroday malware based on the frequency of windows API calls using supervised learning algorithms. (See, M. Alazab, S. Venkatraman, P. Watters, and M. Alazab, "Zero-day malware detection based on supervised learning algorithms of API call signatures," in Proceedings of the Ninth Australasian Data Mining Conference-Volume 121. Australian Computer Society, Inc., 2011, pp. 171-182, which is incorporated herein by reference). Various classifiers were trained through analyzing the behavior of large database with and without malicious codes. This system depends mostly on features extracted from previous attacks.

A behavior-based scheme was proposed to spot zero-day android malware. (See, M. Grace, Y. Zhou, Q. Zhang, S. Zou, and X. Jiang, "Riskranker: scalable and accurate zero-day android malware detection," in Proceedings of the 10th international conference on Mobile systems, applications, and services. ACM, 2012, pp. 281-294, which is incorporated herein by reference). Before releasing android applications into the public domain, a developed system can automatically monitors dangerous behaviors of such applications to warn the users of zero-day attacks such as launching roots exploit or sending background SMS messages.

A machine learning framework has been proposed to detect known and newly emerging network attacks using layer three and four data flow characteristics. (See, P. M. Comar, L. Liu, S. Saha, P.-N. Tan, and A. Nucci, "Combining supervised and unsupervised learning for zero-day malware detection," in INFOCOM, 2013 Proceedings IEEE. IEEE, 2013, pp. 2022-2030, which is incorporated herein by reference). The framework depends on a supervised classification in detecting known classes and adapts the unsupervised learning phase to detect new classes.

Some detection techniques survey three signatures detection techniques, namely content-based, semantic-based, and vulnerability-driven. In addition to the signature detection techniques, some authors use statistical-based and behavior-based detection techniques.

Some researchers have introduced a metric to rank safety from zero-day attacks by counting how many such vulnerabilities would be required before compromising network assets. (See, L. Wang, S. Jajodia, A. Singhal, P. Cheng, and S. Noel, "k-zero day safety: A network security metric for measuring the risk of unknown vulnerabilities," IEEE Transactions on Dependable and Secure Computing, vol. 11, no. 1, pp. 30-44, 2014, which is incorporated herein by reference). The algorithm used assumes insider attackers and gives the same weight to all zero-day vulnerabilities. The recent zero-day ransomware attacks also earned the attention of the research arena. Some authors introduced R-Locker to countermeasure zero-day ransomware attacks. (See, J. Gómez-Hernandez, L. Álvarez-González, and P. García-Teodoro, "RLocker: Thwarting ransomware action through a honeyfile-based approach," Computers & Security, vol. 73, pp. 389-398, 2018, which is incorporated herein by reference). A honeyfile is created and acts as a trap to elude and minimize the damage done to real assets. Various links are added to the honeyfile to divert the malware and learn its tools, tactics, and motives. Countermeasures will then be initiated to eradicate the damage, if any, done by the ransomware.

The zero-day ransomware anomaly detection approach where I/O operations are analyzed and a sequence of I/O requests is obtained. (See, A. Kharraz, S. Arshad, C. Mulliner, W. K. Robertson, and E. Kirda, "UNVEIL: A Large-Scale, Automated Approach to Detecting Ransomware," in USENIX Security Symposium, 2016, pp. 757-772, which is incorporated herein by reference). (See, B. A. S. Al-rimy, M. A. Maarof, and S. Z. M. Shaid, "Ransomware threat success factors, taxonomy, and countermeasures: a survey and research directions," Computers & Security, 2018, which is incorporated herein by reference).

If the obtained sequence matches a known ransomware sequence, then an alarm is raised. A known ransomware sequence looks like (a) read the file, (b) encrypt the file, and (c) replace the original data by the encrypted data. The authors went even further and compared screen shots to detect screen locker ransomware and also extracted some words from the screen shots to be analyzed and examined.

A survey has been conducted to pinpoint ransomware success factors. This survey found that reasons behind the spreading of ransomware attacks and their success are not the techniques used by the ransomware itself or unknown-nature of zero-day ransomware attacks. Rather the available technology and applications played a vital role in enabling the adversary to hide their payment transaction with the ability to reach as many victims as possible in short time. Due to inefficiency and the static-nature of antivirus programs, some authors developed a behavior-based compromise system. (See, K. Ganame, M. A. Allaire, G. Zagdene, and O. Boudar, "Network Behavioral Analysis for Zero-Day Malware Detection—A Case Study," in International Conference on Intelligent, Secure, and Dependable Systems in Distributed and Cloud Environments. Springer, 2017, pp. 169-181, which is incorporated herein by reference). This system detects data breach using machine learning techniques by analyzing network traffic to identify zero-day ransomware. Authors targeted WannaCry ransomware in particular.

Android ransomware attacks were the focus of a study. (See, J. Chen, C. Wang, Z. Zhao, K. Chen, R. Du, and G.-J. Ahn, "Uncovering the face of android ransomware: Characterization and real-time detection," IEEE Transactions on Information Forensics and Security, 2017, which is incorporated herein by reference). A large-scale of 2,721 Android ransomware samples were collected and characterized to insure the majority of existing Android malware are covered and reflected in the sample. The paper proposed Ransom-Prober, a real-time behavior-based ransomware detection system. Evaluation experiments were conducted to compare the overall detection accuracy analysis tools, anti-virus solutions, and RansomProber. RansomProber outperformed two state-of-the-art malware analysis tools and a number of commercial solutions with a detection accuracy of 99%.

Some authors focus in specific kind of ransomware which is related to Android ransomware they collect 2,721 samples of them, they notice that existing anti-virus are useless, so they propose RansomProber which is real-time detection system. They study and analyze the ransomware according to some feature which are: (1) lock screen (2) encrypt file (3) permission uses (4) payment method (5) threatening message. They focus on encrypting ransomware with assumption that ransomware does not elevate privileges, also it is easy to defeat any real-time protection system, and due to malware scanners can detect root exploits, ransomware authors avoid retrieving root privileges which is easy to be done by some root-kit tools. Finally, they assume that the early alarm can reduce the number of encrypted file. RansomProber can detect if the users initiate the file encryption operations by analyzing if there is encryption done to any file, then they check whether the encryption is normal or abnormal operation by doing foreground analysis, then they check user interface widgets which doesn't exist in ransomware sample like: (1) file list to be encrypted which is selected and partial in benign application while in ransomware case it is random and full (2) hint text must shown when you deal with sensitive behavior as encryption, this hint text doesn't exist in ransomware case (3) button which enable the user to interact with encryption process in benign application and it is not used in ransomware case.

From all mentioned RansomProber considered to be behavioral based. Ransom-Prober shown to have high accuracy and acceptable runtime performance when detecting encryption done by ransomware through experimental results. A group of academics has introduced a moving target defense (MTD). (See, J. H. Jafarian, E. Al-Shaer, and Q. Duan, "An effective address mutation approach for disrupting reconnaissance attacks," IEEE Transactions on Information Forensics and Security, vol. 10, no. 12, pp. 2562-2577, 2015, which is incorporated herein by reference). The MTD is the concept of morphing the target, making it unfamiliar to the attacker. Therefore, the attacker is forced to learn the target repeatedly. Consequently, this will (a) reduce the attacker's window of success and (b) increase the costs of their probing and efforts of their attack.] (See, X. Feng, Z. Zheng, D. Cansever, A. Swami, and P. Mohapatra, "A signaling game model for moving target defense," in INFOCOM 2017-IEEE Conference on Computer Communications, IEEE. IEEE, 2017, pp. 1-9, which is incorporated herein by reference). (See, A. G. Bardas, S. C. Sundaramurthy, X. Ou, and S. A. DeLoach, "MTD CBITS: Moving Target Defense for Cloud-Based IT Systems," in European Symposium on Research in Computer Security. Springer, 2017, pp. 167-186, which is incorporated herein by reference). (See, M. Albanese, S. Jajodia, and S. Venkatesan, "Defending from stealthy botnets using moving target defenses," IEEE Security & Privacy, vol. 16, no. 1, pp. 92-97, 2018, which is incorporated herein by reference). (See, J. Tian, R. Tan, X. Guan, and T. Liu, "Enhanced Hidden Moving Target Defense in Smart Grids," IEEE Transactions on Smart Grid, 2018, which is incorporated herein by reference).

Since declaring MTD, many researchers have adopted it in many fields. (See, M. Albanese, S. Jajodia, and S. Venkatesan, "Defending from stealthy botnets using moving target defenses," IEEE Security & Privacy, vol. 16, no. 1, pp. 92-97, 2018, which is incorporated herein by reference). MTD can be tuned to deal with stealthy botnets, and MTD is needed due to information gained by stealthy botnets by knowing the target network's topology then discovering the location of detectors and avoiding them by selecting path free detectors. An MTD approach can include periodically changing the placement of detectors, making it harder for attacker to compromise hosts and used it as proxies. Experiments done to show that the new approach can effectively reduce the stealthiness of botnets. by comparing traffic flow from MTD points containing data exfiltration by botnets with benign users to detect suspicious flows. Deploying MTD costs the defender, some increase in overhead, this overhead can be controlled by configuring MTD. For example the higher frequency of reconfiguration resulting in increased cost with better security.

Another deployment of MTD comes in smart grids, where a hidden MTD approach was proposed to avoid being detected by the attackers while maintain power flows of the grid. (See, J. Tian, R. Tan, X. Guan, and T. Liu, "Enhanced Hidden Moving Target Defense in Smart Grids," IEEE Transactions on Smart Grid, 2018, which is incorporated herein by reference).

Due to that passive defense approach usually let the attacker has more knowledge about the defender a solution using MTD placed in protecting a critical resource in a network, so that the information asymmetry is reversed, by proposing "Bayesian Stackelberg" to model this game between the leader who is the defender and the follower who is the attacker. (See, X. Feng, Z. Zheng, D. Cansever, A. Swami, and P. Mohapatra, "A signaling game model for moving target defense," in INFOCOM 2017-IEEE Conference on Computer Communications, IEEE. IEEE, 2017, pp. 1-9, which is incorporated herein by reference). The defender adopts a MTD scheme to thwart attacker strategy. The strategic attacker can watch the defender's movements and then act in a rational way. In addition to attacker and defender there is a critical resource and a fully connected network. The two-player game begins between defender and attacker with the attacker goal is to maximize its payoff by reaching the resource, while the defender goal is to protect the resource with minimal cost.

IT systems using clouds also can share from MTD by applying MTD to cloud-Based IT knowing that the MTD core idea is to make a proactive defending system to eliminate the asymmetric advantage of attacker time. (See, A. G. Bardas, S. C. Sundaramurthy, X. Ou, and S. A. DeLoach, "MTD CBITS: Moving Target Defense for Cloud-Based IT Systems," in European Symposium on Research in Computer Security. Springer, 2017, pp. 167-186, which is incorporated herein by reference). The challenge was to adapt MTD to as system with complexity and number of dependencies within components in IT system without impacting the system performance severely or breaking it.

The realization of assets importance in security systems is gaining popularity. In one of the largest cyber security summits and particularly during the European Information Security Summit 2016, Will Brandon, Chief Information Security Officer (CISO) at the Bank of England, stressed on the identification of critical processes and the understanding of assets. (See, Will Brandon, "European Information Security Summit," 2016. Available at: biztechevents.co.uk, which is incorporated herein by reference). The CISO stated that organizations should know their critical assets and critical processes. Furthermore, the CISO stressed that organizations should have a way of understanding their assets and score them against the financial impact, against the reputational and operational impact.

Table 9 differentiates between security taxonomies based on some attributes.

Attack-based taxonomies are generated from attackers view point. The strategy behind building attack-based taxonomies is to predict the attack behavior in order to detect the attack and become more familiar with it. As such, the goal for attack-based security taxonomies is to classify attacks. Defense-based taxonomies are used to defend against attacks and therefore they react to attacks in order to identify attacks and deal with them. The goal of defense-based taxonomies is to guide security practitioners of how to defend against specific attacks.

Requirements-based taxonomies are used by security experts as knowledge base. They are established by security experts and their goal is to establish standards and spread security knowledge. This knowledge is used by security experts to provide security solutions or to establish new security taxonomies. What is missing is a security taxonomy that is built based on owner or stakeholder of the attack target (i.e., the asset).

In some implementations, an asset-based taxonomy is centered on the asset owner. A security solution is established and its goal is to defend asset and not defend against attacks. Therefore, the defense strategy is being proactive as opposed to predict or wait and react.

TABLE 9

Comparison of security taxonomies.

| Security Taxonomy Based On | View Point | Strategy | Goal |
| --- | --- | --- | --- |
| Attacks | Attacker | Predictive | Classify Attacks |
| Defenses | Defender | Reactive | Defend Against Attacks |
| Requirements | Security Expert | None | Knowledge Base |
| Assets | Owner | Proactive | Defends Assets |

Figure 2:
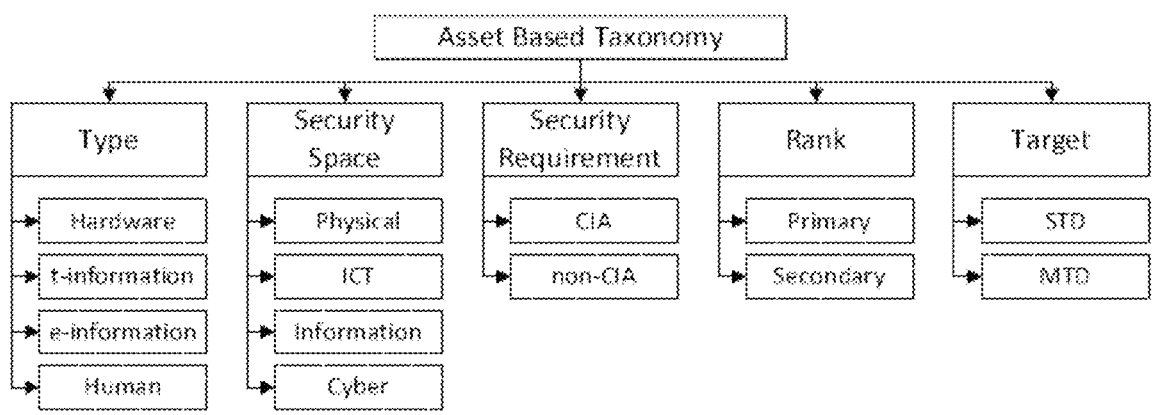
FIG. 2 is a diagram of an example asset-base taxonomy in accordance with some implementations.

The asset-based taxonomy builds a comprehensive organization system for asset-based security solutions. After analyzing the assets in each system and the security requirements for it, a taxonomy is introduced that depends on both, this taxonomy can be viewed in FIG. 2.

In this taxonomy the asset will be classified to categories, the asset will be classified under each category by choice/s. This classification clarifies what the asset owner needs, and later will be helpful in making the defense holistic and complete. The categories are (1) Type of the asset which can be hardware containing valuable containment, a t-information revealing secrets communicated or stored using traditional ways, an e-information contained in a file or any electronic form. (2) Security Space: the asset can be reached through one of the spaces, or it may intersect with that space. For example, if it is in physical security space so countermeasures in that space should be looked for, it is the same case with ICT, information or cyber security space. (3) Security Requirement: classify the asset regarding its security requirement which lead to better secure environment and better performance, so the security requirement can be one of CIA (Confidentiality, Integrity, and Availability), or one of the other non CIA security requirement like anonymity, access control, accountability, etc. (4) Rank of the asset: which can be primary asset which is the asset itself or secondary asset which leads directly to the primary asset. (5) Target: the asset as target can be Stationary Target Defense (STD) or Moving Target Defense (MTD). If the asset could be shifted to MTD, that would improve the security but may affect the performance, otherwise it is considered STD.

Figure 3:
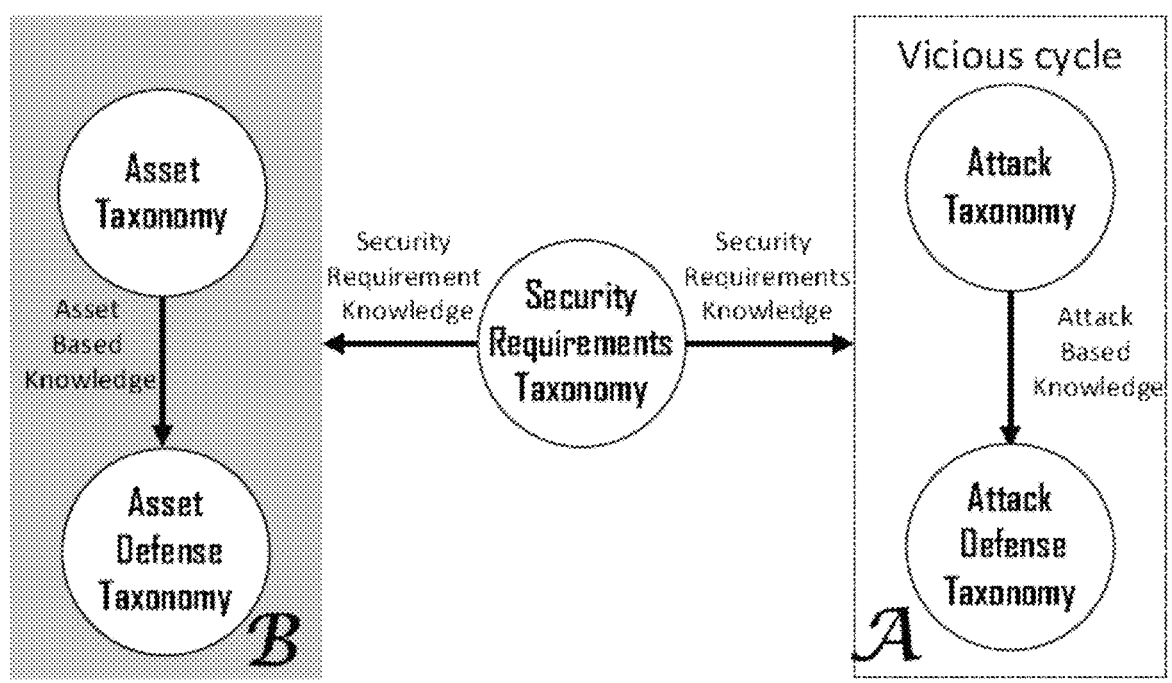
FIGS. 3A and 3B are diagrams showing security life cycles in accordance with some implementations.

The goal of the proposed security system, shown in FIG. 3, is to develop defense mechanisms based on complete information. Currently, defense mechanisms are built based on incomplete information, which is dictated by attackers. In a sense, some implementations are changing the game from an attacker-led to a defender-led game.

Current antivirus programs achieve their goal, which is detecting viruses, by scanning files. The common way to do this is to use on-access scanning. When opening a program, the antivirus software checks the program first, comparing it to known viruses, worms, and other types of malware. The antivirus software relies on virus definitions or signatures to achieve its goal.

Disclosed here is an approach that reaches the same goal as antivirus programs goal but not relying on third-party information (e.g., third-party virus definitions or signatures). As shown in FIG. 3 (A), attacks are classified based on attack vectors including attack type, exploited weakness, and victim impact. These attack vectors are established by defenders to come up with suitable defenses. As such, these defenses are defending against attacks. FIG. 3 (B) uses an asset taxonomy to build an asset-based knowledge which contains information owned by the asset owner as compared to the attack-based knowledge containing information dictated by attackers.

Figure 4:
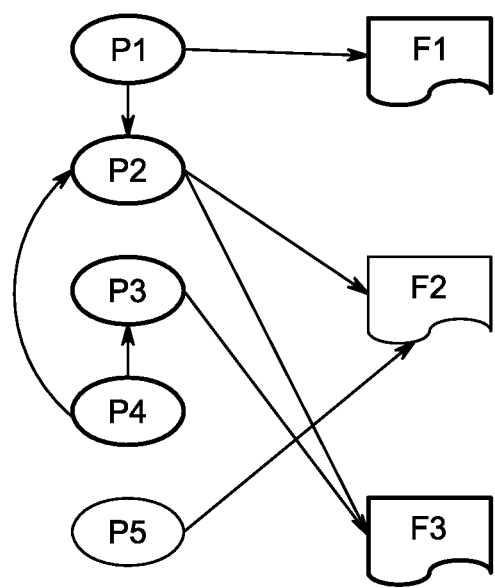
FIG. 4 is a diagram of an example asset relationship in accordance with some implementations.

First, a system can start by identifying the assets and the security requirements needed to protect the asset. For each of the security requirements, for example integrity, the system can construct a graph as shown in FIG. 4, where assets are represented as nodes.

These assets might be files, sockets, or processes. The flows between the nodes are reflected in the creation or update of edges between nodes that model the respectively involved nodes. All relevant communication directly or indirectly, imply a data flow between two nodes. During the information identification phase, files F1 and F3 are identified as critical assets with integrity as the security requirement for both files. The reachability graph is generated capturing all processes that can modify these two files. The reachability graph as illustrated in FIG. 4 shows direct dependency as: (a) P1 can modify F1 (b) P2 and P3 can modify F3, and the indirect dependency as: (a) P1 can modify P2 and P2 modify F3 (b) P4 can modify P2 and P2 modify F3 (c) P4 can modify P3 and P3 modify F3. All of this can be generated during the monitoring phase. Now, later on, if P5 tries to access F1, then this is considered a violation and a flag is passed to the decision phase.

Weights on these edges can be obtained by accumulating the data flows of the between nodes. It should be noted that weights can be assigned to the edges of the reachability graph. These weights can represent the access frequency, access time, access period, along with other parameters. Using the assigned weights, the system can determine the probability of violating the integrity to F3 if P2 is compromised.

Figure 5:
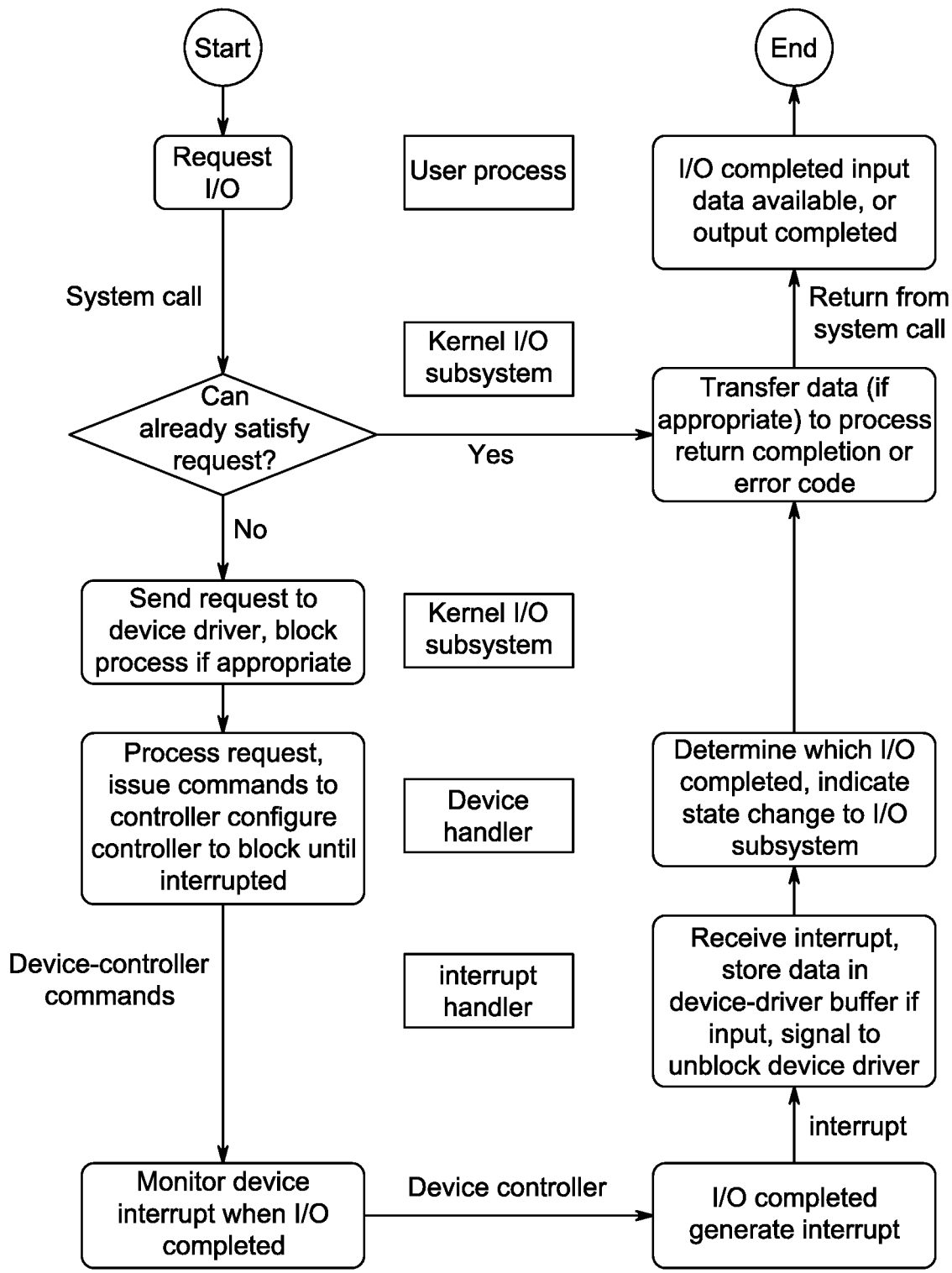
FIG. 5 is a diagram of an example life cycle of system calls in accordance with some implementations.

The data flow or the relationship between files or processes mentioned previously can be caught by monitoring system calls. The cycle of systems is explained and shown in FIG. 5. The steps are shown from the system call initiation to its completeness. Let us consider that an I/O request is initiated by a user process to read some data. The following are the steps needed to execute the I/O request.
  a) The system call code is executed in the kernel to check the parameters correctness if the block of the data needed to be read is available in the buffer cache.

b) If the data is ready, the block will be returned to the process and that I/O considered to be completed.
c) If the block is not available, then a physical I/O request must be sent to the device driver mostly by in-kernel message or subroutine call.
d) The device controller receives the data in kernel buffer space, by sending a command to the device controller. The device controller writes into the device control register, then the device controller will transfer the data by operate the device hardware.
e) The driver will check for transfer completion by polling the data status or by receiving an interrupt from Direct Memory Access (DMA) controller if the driver has assigned a DMA transfer by kernel memory
f) The device driver signaled by the interrupt handler.
g) The device driver signal the kernel I/O with a request has been completed to proceed on with that I/O request.
h) The kernel transfer data from its memory space to the user processor space.
i) The second step can be executed and the I/O is completed.

Figure 6:
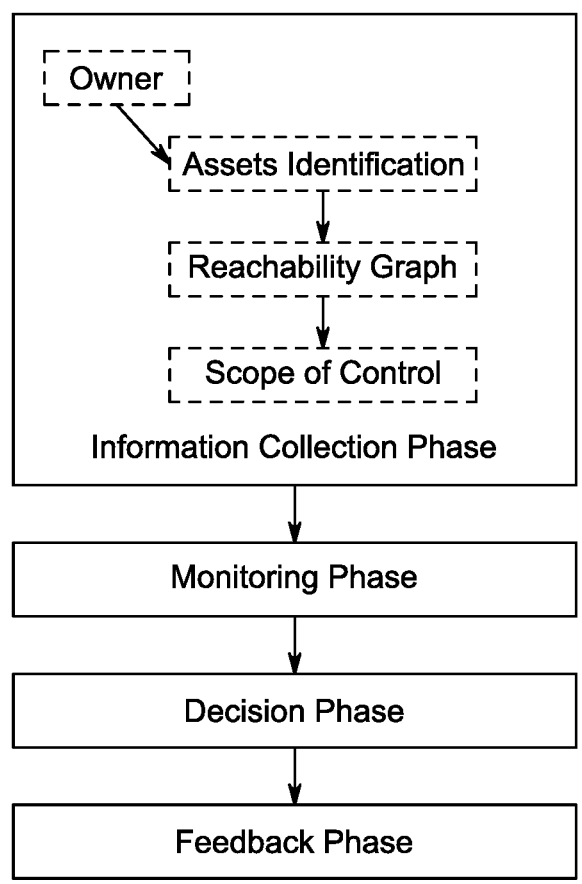
FIG. 6 is a diagram of an example asset based model in accordance with some implementations.

As shown in FIG. 6, some implementations can include four phases, namely information collection, monitoring, decision, and feedback. In the information collection phase, the system can identify critical assets and their security requirements, while the monitoring phase captures system calls that need to be investigated by the decision phase. The decision phase assures that critical assets security requirements are not violated. If there is an attempt of violation, a decision is needed to deal with this attempt and alert the security system. Finally, the need for feedback phase comes into play to strengthen and improve the security system.

For example, a prevention decision, it means that there are unusual events and therefore the security system takes these events into consideration. This phase involves collecting information about the guest operating system, the critical assets, and the security requirements of these critical assets. Critical assets are assumed to be objects (e.g., files, processes, sockets) that are created and managed by the guest virtual machine. Therefore, the paths of these objects are collected along with their security requirements. In addition, information related to the guest operating system is also collected such as operating system type, system calls and how these system calls map to security requirements. It should be noted that critical assets are always associated with security requirements.

One objective is to identify critical assets along with their security requirements. The asset owner provides this information to the security practitioner. After the critical assets are identified, the security requirement for each asset must be also specified by the asset owner. For example, in a University environment, the Registrar database might be identified as the critical asset. This identification is done by the University Board. The University Board might require only "integrity" of the Registrar database because as long as "integrity" is preserved, the University still can issue transcripts and degree certificates. To the University Board, "availability" and "confidentiality" might not be as important as "integrity" for the University Registrar database. The security practitioner needs to identify the system files representing the University Registrar database which is referred as r. In addition, the application(s) used to access the critical asset, let us say it is process p1, needs also to be identified by the security practitioner. This means that the Registrar database identified as a critical asset can be accessed only by p1. Hence, p1 is the only authorized process to modify the Registrar database.

Therefore, the Information Collection Phase will generate critical assets that can be provided as a simple list, a prioritized list, or a more complex representation. For the purpose of simplicity and clarity, the critical assets might be represented by C which is a set of 2-tuple elements containing critical asset and policy. Each critical asset has a policy composing of the critical asset's security requirement and the set of processes authorized to access the critical asset.

Equations 4.1 and 4.2 represent C and pr respectively.

$$C=\{(r,P_r)\} \tag{4.1}$$

$$P_r=\{\text{integrity},\{p_1\}\} \tag{4.2}$$

As shown in Equation 4.1, C has one direct critical asset r while Equation 4.2 defines the policy of r (Pr) as only process p1 is authorized to modify r. Automatically capturing the low-level details, during which the interactions between files and processes are tracked in order to identify direct or indirect dependencies among all the system assets. For instance, in a database server, the administrator only needs to list the sensitive database files, and the security system later marks the process "mysqld" as critical because it is in charge of reading and modifying the databases. Such a design greatly reduces the resources and time spent by administrators in deploying the security system.

The reachability graph captures the low-level interrelationships between the critical assets identified by the user and any other objects in the system. In a nutshell, the reachability graph tells which processes and files are used to reach the critical assets identified in the Assets Identification step. This is established by intercepting system calls at the hypervisor-level. Particularly, all low-level objects are identified that cause data dependencies with the critical assets identified in the previous phase. For example, the reachability graph found that process p1 gets the information from process p2 which reads from file f. All processes and files involved in this cycle (i.e., p1, p2, and f) are added as critical assets. All low-level critical assets will have "integrity" as their security requirement because any unauthorized modification to the low-level critical assets can violate the security requirement of the critical assets identified by the user.

For example if f is modified by unauthorized user, the "integrity" of r is violated.

$$C=\{(p_1,P_{p1}),(p_2,P_{p2}),(f,P_f)\} \tag{4.3}$$

$$P_{p1}=P_{p2}=P_f=\{\text{integrity},\{\ \}\} \tag{4.4}$$

As shown in Equation 4.3, C has three new critical assets namely, p1, p2, and f. Equation 4.4 equates the policies of p1, p2, and f as no process is authorized to modify their respective critical assets. Here, the policy for each critical asset is a set of processes authorized to access the critical asset without violating its security requirement. Policies can be more complicated. For example, a system can use one-time passcode as well as time, date, or frequency of access to the critical asset.

The low-level critical assets identified by the reachability graph will be added to the high-level critical assets identified by the assets owner as shown in Equations 4.5 and 4.6.

$$C=\{(r,P_r),(p_1,P_{p1}),(p_2,P_{p2}),(f,P_f)\} \tag{4.5}$$

$$P_r=\{\text{integrity},\{p_1\}\},P_{pr}=P_{p2}=P_f=\{\text{integrity},\{\ \}\} \tag{4.6}$$

The security requirements need to be mapped to system calls. Knowing the guest operating system type, system calls, as well as the security requirement, the mapper will map system calls that must be prevented to preserve the security requirement. For example, the following system calls, namely NtWriteFile and NtSetInformationFile must be prevented to preserve "integrity". NtDeleteFile and NtSetInformationFile system calls must be prevented to preserve "availability".

Likewise, NtReadFile, NtOpenFile, NtCreateFile, and NtSetInformationFile system calls must be prevented to preserve "confidentiality". To catch the indirect relationships to the critical assets, the data flow direction can be considered. (See, S. A. Zonouz, R. Berthier, H. Khurana, W. H. Sanders, and T. Yardley, "Seclius: An information flow-based, consequence-centric security metric," IEEE Transactions on Parallel and Distributed Systems, vol. 26, no. 2, pp. 562-573, 2015, which is incorporated herein by reference). For confidentiality, the data flows outwards starting from the critical asset. For the integrity on the other hand, data flows towards the critical asset. Finally, availability data flows in and out of the critical asset. The data flow is going from process to file for a write system call. For example, if the relationship between process p1 and file f1 is write, then the corresponding system call will be (NtWriteFile, p1, f1) and the data flow will be from p1 to f1. But if the relationship between p1 and f1 is read, then the corresponding system call will be (NtReadFile, p1, f1) and the data flow will be from f1 to p1. By tracing the data flow one can identify the indirect critical assets all along the reachability path.

All objects included in the scope of control should have integrity as the security requirement. In addition, all objects in the scope of control should inherit the security requirement of the critical asset identified by the asset's owner.

Figure 7:
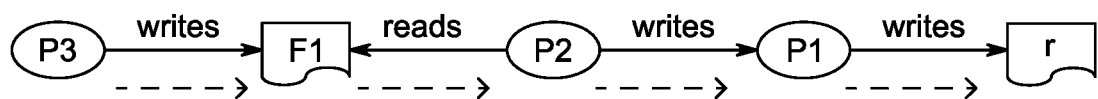
FIG. 7 is a diagram showing indirect assets added to the scope of control in accordance with some implementations.

A scope of control is shown in FIG. 7 and the security requirement for r is integrity. The data flow is indicated by the dashed arrows. Therefore, all objects along these dashed arrows will be included as critical assets. For further illustration and clarification, Table 10 outlines some cases and whether these cases should be included in the scope of control. All objects included in the scope of control should have integrity as the security requirement.

TABLE 10

Integrity: validating the scope of control.

| | Scope of Control | |
|---|---|---|
| Scenario | Will be included | Will not be included |
| if $p_z$ is reading from r | | ✓ |
| if $p_z$ is writing to r | ✓ | |
| if $p_a$ is reading from $p_1$ | | ✓ |
| if $p_a$ is writing to $p_1$ | ✓ | |
| if $p_b$ is reading from $p_2$ | | ✓ |
| if $p_b$ is writing to $p_2$ | ✓ | |
| if $p_n$ is reading from $p_9$ | | ✓ |
| if $p_n$ is writing to $p_9$ | | ✓ |
| if $p_y$ is reading from f | | ✓ |
| if $p_y$ is writing to f | ✓ | |

Figure 8:
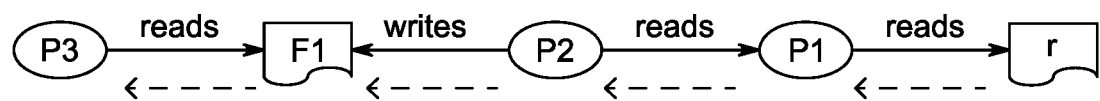
FIG. 8 is a diagram of indirect assets added to the scope of control in accordance with some implementations.

A scope of control is shown in FIG. 8 and the security requirement for r is confidentiality. The data flow is indicated by the dashed arrows. Therefore, all objects along these dashed arrows will be included as critical assets. For further illustration and clarification, Table 11 outlines some cases and whether these cases should be included in the scope of control. All objects included in the scope of control should have integrity as well as confidentiality as the security requirements.

TABLE 11

Confidentiality: validating the scope of control.

| | Scope of Control | |
|---|---|---|
| Scenario | Will be included | Will not be included |
| if $p_z$ is reading from r | ✓ | |
| if $p_z$ is writing to r | | ✓ |
| if $p_a$ is reading from $p_1$ | ✓ | |
| if $p_a$ is writing to $p_1$ | | ✓ |
| if $p_b$ is reading from $p_2$ | ✓ | |
| if $p_b$ is writing to $p_2$ | | ✓ |
| if $p_n$ is reading from $p_9$ | | ✓ |
| if $p_n$ is writing to $p_9$ | | ✓ |
| if $p_y$ is reading from f | ✓ | |
| if $p_y$ is writing to f | | ✓ |

Figure 9:
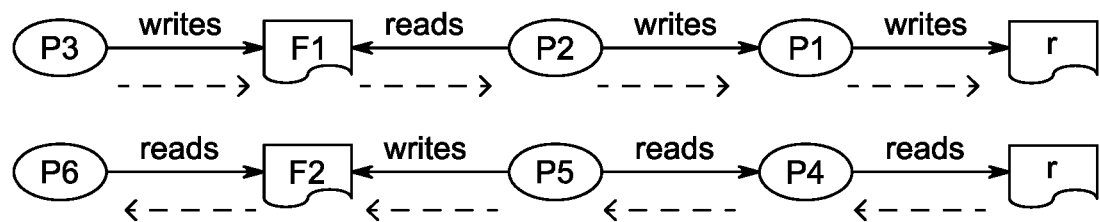
FIG. 9 is a diagram showing indirect assets added to the scope of control in accordance with some implementations.

A scope of control is shown in FIG. 9 and the security requirement for r is availability. The data flow is indicated by the dashed arrows. Therefore, all objects along these dashed arrows will be included as critical assets. The direction of data flow is not considered when the security requirement is availability. So regardless of the direction, if there is a data flow between an object and the critical asset, then this object should be added to the scope of control. For further illustration and clarification, Table 12 outlines some cases and whether these cases should be included in the scope of control. All objects included in the scope of control should have integrity as well as availability as the security requirements.

TABLE 12

Availability: validating the scope of control

| | Scope of Control | |
|---|---|---|
| Scenario | Will be included | Will not be included |
| if $p_z$ is reading from r | ✓ | |
| if $p_z$ is writing to r | ✓ | |
| if $p_a$ is reading from $p_1$ | ✓ | |
| if $p_a$ is writing to $p_1$ | ✓ | |
| if $p_b$ is reading from $p_2$ | ✓ | |
| if $p_b$ is writing to $p_2$ | ✓ | |
| if $p_n$ is reading from $p_9$ | | ✓ |
| if $p_n$ is writing to $p_9$ | | ✓ |
| if $p_y$ is reading from f | ✓ | |
| if $p_y$ is writing to f | ✓ | |

This is the phase responsible for virtual machine introspection by collecting system calls generated by the virtual machine without its knowledge since system calls are intercepted and logged at the hypervisor-level. As shown in Algorithm 1, this phase starts by initializing S, the set of intercepted system calls. This phase can monitor only data flows to the critical assets or monitor all system calls. In the case of "before deployment", there may be a need to monitor and log all system calls to a file to be processed to generate the reachability graph. While in the case of "after deployment", the system needs to know if the captured system call s is trying to access any critical asset c 2 C. Then, the system can decide if s needs further inspection. If s is trying to access c 2 C, then add s to S and pass s to the Decision Phase for further investigation.

FIG. 10 shows a sample of intercepted system calls generated by processes running in the virtual machine. These processes are being monitored by the security system at the hypervisor-level. Suppose that the file abc.txt (which appears in the second system call) is in C, then only the second system call will be added to S.

It should be noted that the system does asset-based monitoring. In the system, system calls are treated independently and no conclusion is inferred regarding the Algorithm 1: Monitoring Phase.

```
1    S = fg; //initializing the set of intercepted system calls
2    if Before Deployment then
3        intercepted system calls = All;
4    else
5        intercepted system calls = Specified;
6    end
7    foreach intercepted system call do
8        Parse s //get c and any other relevant information;
9        S = S + s //for possible post-mortem analysis;
10       if After Deployment then
11           if ( c 2 C ) then
12               Decision Phase(C; s) //call Decision Phase ;
13           end
14       end
15   end
```

FIG. 10 shows a sample of intercepted system calls generated by processes running in the virtual machine. These processes are being monitored by the security system at the hypervisor-level. Suppose that the file abc.txt (which appears in the second system call) is in C, then only the second system call will be added to S.

Some implementations include asset-based monitoring. In some implementations, system calls are treated independently and no conclusion is inferred regarding the behavior of theses system calls. In other approaches, monitoring is done in order to learn behavior or match signatures.

The goal of this phase is to catch any attempts to violate the security requirements of critical assets. This is done by assuring that s obeys the critical asset's policy. Algorithm 2 outlines the steps of this phase. The algorithm starts by accepting the input data passed from the Monitoring Phase namely, C and s. Initialize the "decision" to "allow". Then, test if the asset c specified in s matches any critical assets specified in C. Next, check if the process p and the system call name n specified in s is among the allowed processes in the policy of the critical asset. If p is trying to access c 2 C and this process is not allowed, then the "decision" is set to "prevent".

Algorithm 2: Decision Phase.

```
Data:
The critical asset set C
The intercepted system call s
Result: Either prevent or allow
1        decision "allow"; //initialize decision to allow
2        if (s contains c 2 C) then
3            if (s violates Pc) then
4                decision "prevent";
5                Feedback Phase(C; s) //call Feedback Phase ;
6            end
7        end
8        return "decision";
```

This phase is triggered if certain events are met such as a prevention decision, a controlled modification, or uncontrolled modification. The information taken from the "decision phase" must be fed back to the security system. Prevented decisions coming from the "decision phase" must be inspected. This inspection can be done by the security practitioner. Here, different strategies can be employed to harden accessibility to critical assets. What can be done here is to make the attack surface dynamic using techniques such as bio-inspired MTD, cloud-based MTD, and dynamic network configuration. It should be noted that this dynamicity is done without observing attack behavior. Controlled modification happens when a critical asset, critical process, or security requirement needs to be added or modified. Those changes must be reflected into the security system. Uncontrolled modification happens when an MTD approach is applied to dynamically change some attributes of the critical assets such as a name of a process that is allowed to access one of the critical files.

Figure 11:
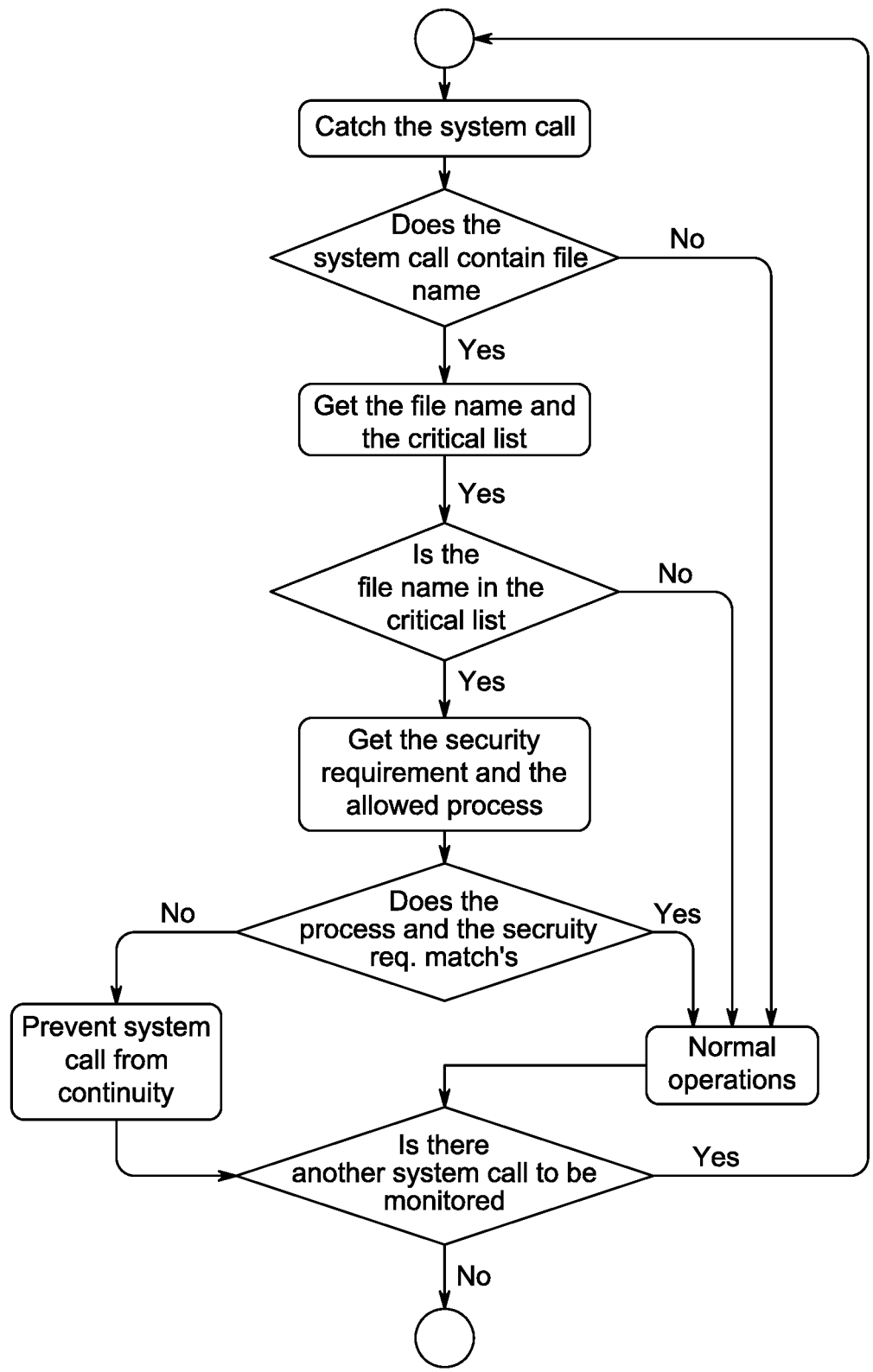
FIG. 11 is a diagram of an example work flow flowchart after deployment in accordance with some implementations.

After the security system is deployed, the flow of the security system is shown in FIG. 11. In the system, the work flow starts with catching every system call. In some operating system such as Windows 7, there is about 700 set of routines. Those 700 routines can be accessed by system call. In user mode applications, system calls must be called to access these set of routines, while in kernel mode they can be called directly. There are two types of these routines namely, NT group and ZW group. (See, Microsoft, "Using nt and zw versions of the native system services routines," 2017. Available at: msdn.microsoft.com, which is incorporated herein by reference). NT group can be called from user space when there is no trust while ZW group can be called from the kernel space when there is trust.

Then, a file name will be extracted (if any) from the in the system call parameters. There are more than 4 categories of these system calls. These categories have different number of parameters spanning from one to four parameters. If a file name is found, the file name will be extracted from the system call and stored in a string for later processing.

The stored file name will be matched with the critical file names. If the file name is found in that list, then more processing is needed. When processing is done, fetch information related to that file name such as the security requirement and the process name. Finally, comparison and decision will be taken to either prevent or allow the system calls. Some implementations can help prevent the system call from continuity by nulling its parameters if the decision is to prevent the system call, the decision is to allow the system calls, then the security system will allow the execution to proceed as normal.

Some implementations decompose the system into subsystems in order to have a layered architecture. In each of these layers, functions are needed to be performed. As such, a systematic approach of defining all system components to satisfy the needs and requirements in order to design a coherent and well-running system is set forth below. Both the functional and the operational architectures of a proposed security system are presented to illustrate the working order of the various system components as well as information flow between these components.

In general, this is a trade-off between the comprehensiveness of the monitoring and the performance. However, the proposed system does not require comprehensive monitoring of the guest OS, in fact, it can include monitoring system calls, which is available in almost all hypervisor-level monitoring solutions.

Figure 12:
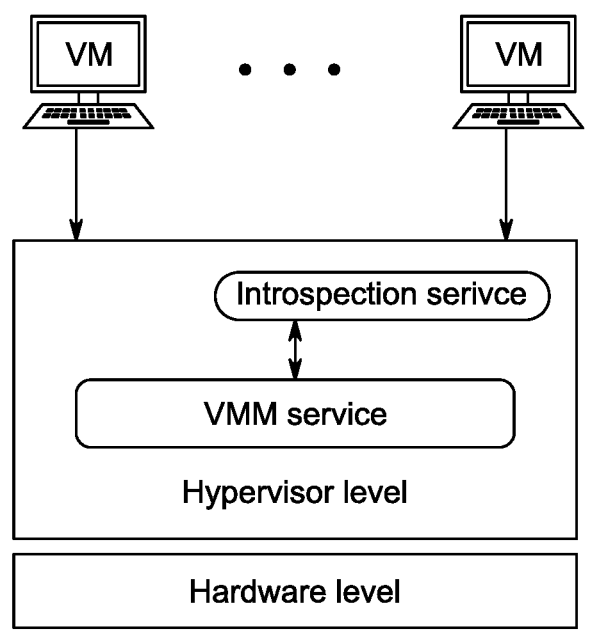
FIG. 12 is a diagram of overview of the system architecture in accordance with some implementations.

FIG. 12 shows the overall asset-based security system architecture. Above the hardware subsystem and as shown in FIG. 12, the hypervisor is composed of two subsystems, namely the Virtual Machine Manager (VMM) and the Virtual Machine Introspection (VMI) subsystems.

VMM is a software program that sets the virtualization environment and this basically will enable Virtual Machines (VMs) bootstrapping and governance. The VMM manages this operation on top of the hardware layer and provides the virtualization functionality. Once it is installed, a VMM facilitates VMs creation with separate operating systems and applications running in each VM. The VMM supports the backend operation of allocated VMs by assigning adequate computing power, main memory, secondary storage, as well as other I/O resources. The VMM also creates a unified interface for managing the entire virtualization environment.

VMI is used to inspect the contents of VM in real-time without the agreement of or the knowledge of the guest operating system. In the disclosed design, VMI was chosen because of this specific property. This contrasts with classic monitoring software on physical systems where the monitoring process runs on the physical system itself. As such, the monitoring system is reachable and indeed other processes running in the guest operating system can know that they are being monitored. What is more, when a virus or malware penetrates a given physical machine, its first task is to deactivate any monitoring process and prevent installation of such processes. This way, the malware can remain on controlling the physical machine.

In some implementations, it is difficult or impossible for processes running on the guest operating system to deactivate or even know of the existence of a monitoring tool. That is why the concept of the VMI can be included.

Figure 13:
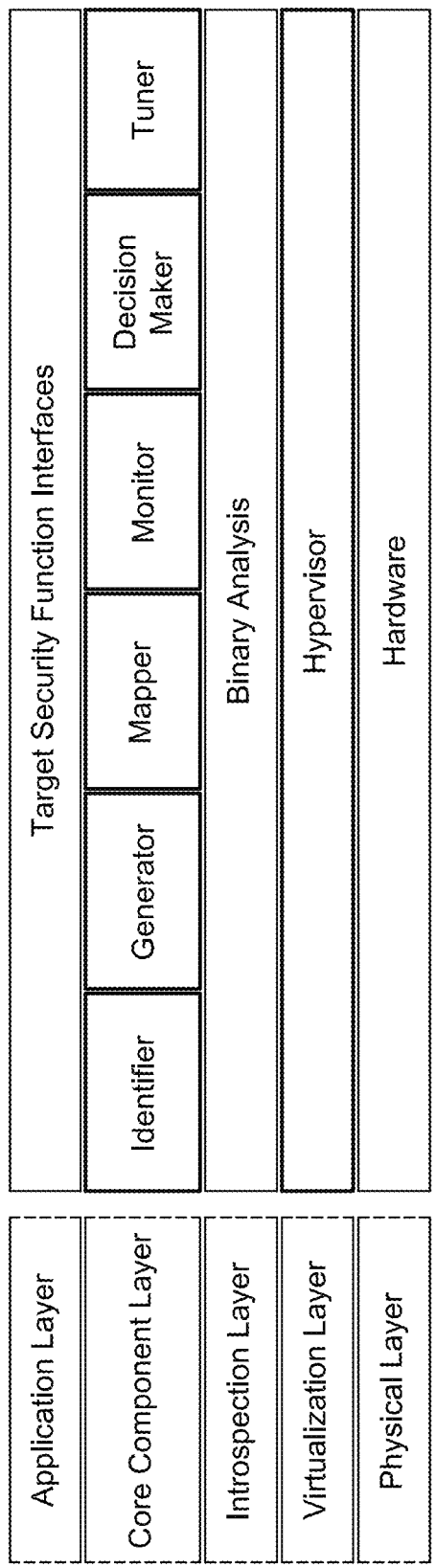
FIG. 13 is a diagram of an example functional architecture design of an example asset-based security system in accordance with some implementations.

As shown in FIG. 13, the functional architecture is presented and the aim is to show the segregation of functionalities across the different layers of the architecture. On top of the hardware layer, the hardware abstraction and the creation and management of multiple computing environment instances are the functions of the virtualization layer. The hypervisor at this layer enables an agentless binary analysis system to be built on top of it. This layer, the introspection layer, sets the stage for tools and utilities to establish the core Asset-based functionalities of the system. As depicted in the Figure, there are 6 core components in the asset-based security system. Critical assets identification along with their security requirements and the low-level interrelationships between the critical assets are done by the Identifier and the Generator components, respectively. The Mapper translates the security requirements to corresponding system calls needed to be processed.

The monitoring functionality is carried out by the Monitor while the Decision Maker component will inspect the system call after it has been captured by the Monitor. Finally, a decision needs to be made by the Decision Maker to either prevent or allow the execution of the system call. The Decision Maker also alerts the security system, through the Tuner, of potential violation attempts targeting the critical assets.

Figure 14:
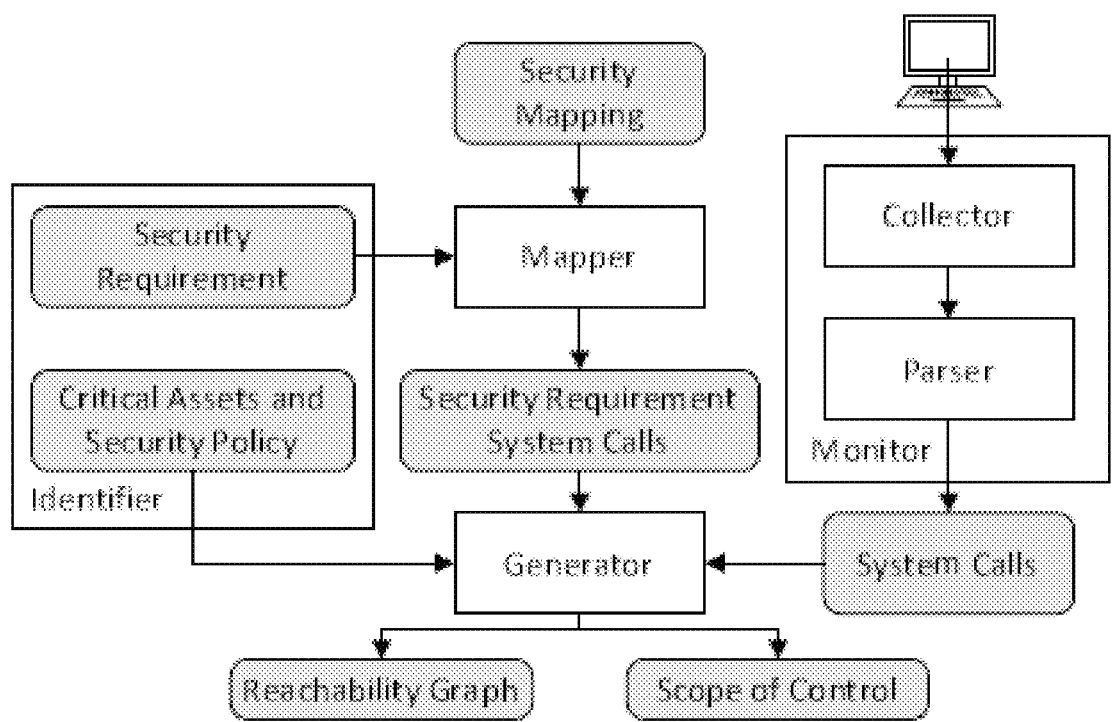
FIG. 14 is a diagram of an example operational architecture before deployment of an implementation in accordance with some implementations.

FIG. 14 shows the operational architecture before deployment where tasks and information are depicted as they flow between the "Information Collection" and the "Monitoring" phases. Assets owners are responsible for providing the name(s) of the asset(s) needed to be protected.

Also, the security requirements for these assets need to be provided by the asset owner. The name(s) of the asset(s) as well as the security requirement(s) are given in high level names.

After consulting the security mapping and the security requirements, the mapper translates the security requirements to corresponding system calls. For example NtReadFile, NtOpenFile, NtCreateFile, and NtSetInformationFile system calls must be prevented to preserve "confidentiality" when using windows 7 as the operating system.

After collecting input from the assets owners as well as system call input from the operating system with corresponding system calls coming from mapper, the generator will be ready for processing. Critical assets (high and low) with their security policy, system calls, security requirements translated to system calls will be fed in and given to the generator. In turn, the generator creates the critical asset scope of control. Now, the critical assets scope of control will be used as a reference in the security system after deployment.

Figure 15:
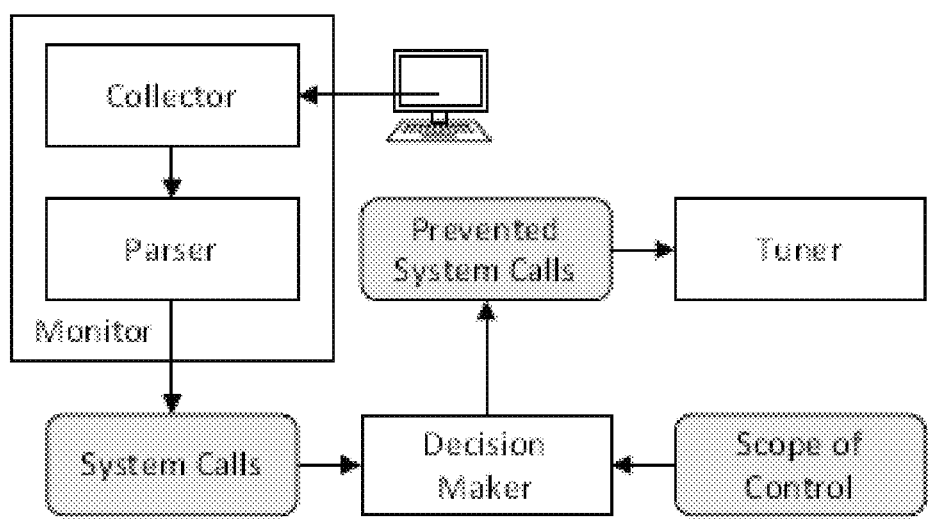
FIG. 15 is a diagram of an example operational architecture after deployment of an implementation in accordance with some implementations.

If the generator is given only the critical assets and the system calls, then the generator will not be able to generate the scope of control but it will generate the after deploying the security system as in FIG. 15, the "Monitoring" and "Decision" phases begin. The monitor starts collecting system calls by the "Collector".

The collection here will be done to system calls, which will lead to catching every critical operation. The parses then processes collected system calls extracting needed information such as process name, system call name, and file name. The decision maker starts checking user processes that initiate system calls and consulting with the reference model (i.e. the critical assets scope of control). The decision maker reports any system call in violation of the reference model. Consequently, the system call execution will be interrupted and stopped from execution.

If a violation is detected, a warning message is send by the decision maker to the tuner in the security system. The tuner can employ different strategies to harden accessibility to critical assets. Some implementations can make the attack surface dynamic using techniques such as bio-inspired MTD, cloud-based MTD, and dynamic network configuration. It should be noted that this dynamicity is done without observing attack behavior.

The evaluation environment is setup as shown in FIG. 12 and follows an overall architecture and hence the layered design presented herein.

Below are listed the system specification including hardware, system software, and application software used to perform the evaluation experiments:
   Host machine
      Type: Alien PC
      Processor: Intel Core 17 Quad Core 4700MQ @ 2.4 GHz
      RAM: 24 GB
      HDD: 1 TB @ 5400RPM
      Host OS: Ubuntu 16.10 64 Bit
   Guest virtual machine
      OS: Windows 7 64 Bit
      CPU: 1 Core
      RAM: 3000 MB
      HDD: 20 GB
   Software
      Hypervisor tool: QEMU, Xen
      Binary analysis tool: DECAF, DRAKVUF
      Benchmarking Application Startup Timer: AppTimer To set up the virtualization environment, a software layer is needed to virtualize all of the resources of a physical machine (host machine). This software layer is known in the literature as hypervisor or VMM. The hypervisor also defines and supports multiple VMs execution. (See, F. Rodriguez-Haro, F. Freitag, L. Navarro, E. Hernánchez-sánchez, N. Farías-Mendoza, J. A. Guerrero-Ibáñez, and A. González-Potes, "A summary of virtualization techniques," Procedia Technology, vol. 3, pp. 267-272, 2012, which is incorporated herein by reference). In the evaluation environment, two hypervisors were used, namely Quick Emulator (QEMU) and Xen.

QEMU is a CPU powerful emulator that can emulate a group of processor types. In 2005, QEMU was presented as a fast machine emulator using an original portable dynamic translator. (See, F. Bellard, "Qemu, a fast and portable dynamic translator." in USENIX Annual Technical Conference, FREENIX Track, vol. 41, 2005, p. 46, which is incorporated herein by reference). It emulates several CPUs on several hosts like (x86, PowerPC, ARM, SPARC) in addition to Alpha and MIPS. QEMU has the ability to support full system emulation in which a complete and unmodified operating system is run in a virtual machine. QEMU is an open source hosted hypervisor that executes hardware virtualization. As such, QEMU can act as a hypervisor and its strength and popularity come from being an emulator. QEMU is considered Type-II hypervisor that runs as other computer applications do, at the top of an OS.

Xen was first released in 2003 with the Para Virtualization (PV) approach. (See, P. Barham, B. Dragovic, K. Fraser, S. Hand, T. Harris, A. Ho, R. Neugebauer, I. Pratt, and A. Warfield, "Xen and the art of virtualization," in ACM SIGOPS operating systems review, vol. 37, no. 5. ACM, 2003, pp. 164-177, which is incorporated herein by reference). The Xen Project is an open source bare-metal hypervisor making it possible to run many instances of a single operating system or different operating systems in parallel on a single physical machine. It is the only available open source as bare metal hypervisor. It is used as the basis for a number of different commercial and open source applications, such as security applications, Infrastructure as a Service (IaaS), desktop or server virtualization, embedded and hardware appliances. (See, C. D. Graziano, "A performance analysis of Xen and KVM hypervisors for hosting the Xen Worlds Project," 2011, which is incorporated herein by reference). (See, WIKI, "Xen Project Software Overview," 24 Jan. 2017. Available at: wiki.xenproject.org, which is incorporated herein by reference). The Xen Project is the leading virtualization platform that powers some of the largest Clouds giants such as Amazon Web Services and Verizon Cloud. It is also integrated into multiple Cloud orchestration projects such as OpenStack and CloudStack. (See, Q. Jia, Z. Shen, W. Song, R. Van Renesse, and H. Weatherspoon, "Supercloud: Opportunities and challenges," ACM SIGOPS Operating Systems Review, vol. 49, no. 1, pp. 137-141, 2015, which is incorporated herein by reference).

In Xen PV, hardware virtualization is not needed so guest kernels are modified to avoid binary translation. This way, the guest os can run on Xen hypervisor and detect hypercalls.] (See, H. Fayyad-Kazan, L. Perneel, and M. Timmerman, "Benchmarking the performance of Microsoft Hyper-V server, VMware ESXi and Xen hypervisors," Journal of Emerging Trends in Computing and Information Sciences, vol. 4, no. 12, pp. 922-933, 2013, which is incorporated herein by reference). On the other hand, Xen supports Fully Virtualization (FV) with the Hardware-assisted Virtualization (HVM) option. This option needs CPU with Virtualization technology such as Intel-VT. Therefore, there is no need to modify guest kernels which will not be able to detect virtualization. Due to this, PV would be faster than FV and FV-HVM. (See, Stackoverflow, "virtualization—What's the differences between Xen, QEMU and KVM?—Stack Overflow," 24 Apr. 2012. Available at: stackoverflow.com, which is incorporated herein by reference). In HVM, when critical instructions are caught, traps are put in place so the hypervisor can emulate it in software.] (See, H. Fayyad-Kazan, L. Perneel, and M. Timmerman, "Benchmarking the performance of Microsoft Hyper-V server, VMware ESXi and Xen hypervisors," Journal of Emerging Trends in Computing and Information Sciences, vol. 4, no. 12, pp. 922-933, 2013, which is incorporated herein by reference).

Xen comes in different modes or virtualization types. It should be noted that all hypervisors (either Type-II/hosted or Type-I/bare-metal) need an underlying OS. As such, bare metal also has an operating system on top of which the hypervisor runs. (See, Stackoverflow, "virtualization—What's the differences between Xen, QEMU and KVM?—Stack Overflow," 24 Apr. 2012. Available at: stackoverflow.com, which is incorporated herein by reference).

After setting the virtualization environment, a binary analysis tool is needed to manipulate the guest OS behavior. Binary analysis can be achieved using various techniques such as the Dynamic Executable Code Analysis Framework (DECAF) and DRAKVUF. (See, A. Bulazel and B. Yener, "A Survey On Automated Dynamic Malware Analysis Evasion and Counter-Evasion: PC, Mobile, and Web," in Proceedings of the 1st Reversing and Offensive-oriented Trends Symposium. ACM, 2017, p. 2, which is incorporated herein by reference). These two possible valid binary analysis tools are used in the model. DECAF is built on the top of QEMU with TEMU as a sub-component.

TEMU, Vine, and Rudder are the three main components for BitBlaze. See, D. Song, D. Brumley, H. Yin, J. Caballero, I. Jager, M. G. Kang, Z. Liang, J. Newsome, P. Poosankam, and P. Saxena, "BitBlaze: A new approach to computer security via binary analysis," in International Conference on Information Systems Security. Springer, 2008, pp. 1-25, which is incorporated herein by reference). (See, BitBlaze Team, "TEMU: The BitBlaze Dynamic Analysis Component," 2008. Available at: bitblaze.cs.berkeley.edu, which is incorporated herein by reference). The common technique used among them is capturing persistent changes to system state which done by emulating all code in software.

Injecting breakpoints rather than just logging system calls, is another technique applied to achieve binary analysis. This technique is used by DRAKVUF. In this technique, context switches or system calls are caught and a breakpoint is injected to control the behavior of the execution thread. (See, A. Bulazel and B. Yener, "A Survey On Automated Dynamic Malware Analysis Evasion and Counter-Evasion: PC, Mobile, and Web," in Proceedings of the 1st Reversing and Offensive-oriented Trends Symposium. ACM, 2017, p. 2, which is incorporated herein by reference).

DECAF is a dynamic binary analysis platform based on QEMU. (See, A. Henderson, A. Prakash, L. K. Yan, X. Hu, X. Wang, R. Zhou, and H. Yin, "Make it work, make it right, make it fast: building a platform neutral whole-system dynamic binary analysis platform," in Proceedings of the 2014 International Symposium on Software Testing and Analysis. ACM, 2014, pp. 248-258, which is incorporated herein by reference). (See, A. Henderson, L. K. Yan, X. Hu, A. Prakash, H. Yin, and S. McCamant, "Decaf: A platform-neutral whole-system dynamic binary analysis platform," IEEE Transactions on Software Engineering, vol. 43, no. 2, pp. 164-184, 2017, which is incorporated herein by reference).

It is virtual machine based, multi-target, whole system dynamic binary analysis framework able to do introspection as Just-In-Time VM. Authors in provided DECAF plugins such as Instruction Tracer, Keylogger Detector, and API Tracer.

Those plugins can be modified or updated as needed. DECAF was implemented using C and C++ with approximately 20 thousands lines in code, and evaluated using CPU2006 SPEC benchmarks showing average overhead of 12% for VMI. To show the flexibility and scalability of DECAF, DroidScope, a dynamic Android malware analysis platform, was developed as an extension to DECAF, for Android mobile devices. (See, L.-K. Yan and H. Yin, "Droidscope: Seamlessly reconstructing the os and dalvik semantic views for dynamic android malware analysis." in USENIX security symposium, 2012, pp. 569-584, which is incorporated herein by reference).

DRAKVUF is a virtualization-based black-box binary analysis system. It does not require any special software within the virtual machine used for analysis. (See, T. K. Lengyel, S. Maresca, B. D. Payne, G. D. Webster, S. Vogl, and A. Kiayias, "Scalability, fidelity and stealth in the DRAKVUF dynamic malware analysis system," in Proceedings of the 30th Annual Computer Security Applications Conference. ACM, 2014, pp. 386-395, which is incorporated herein by reference). DRAKVUF provides in-depth execution tracing on guest OS using a set of plugins to trace system calls usage within the guest OS. This is achieved by injecting break points at the beginning of each system call. Whenever that break point is executed, a callback function is invoked which prints all the details of that system call. These details are the arguments for the invoked system call, including a process name, process id, or a file name. DRAKVUF provides in-depth execution tracing of certain events in the context of the guest OS. Some of these plugins are syscalls, poolmon, objmon, exmon, filetracer, filedelete, ssdtmon, and socketmon.

These plugins can be utilized as they are publicly available. The reason behind designing DRAKVUF is to achieve scalability, fidelity, stealth, and isolation. Fidelity and isolation are provided by other binary analysis tools such as DECAF. Stealth and scalability are the contributions of DRAKVUF. Stealth means that the existence of DRAKVUF must be kept invisible to the monitored environment. On the other hand, scalability means the capability of analyzing large corpus of data with minimum overhead, are the most focused requirements in DRAKVUF.

Figure 16:
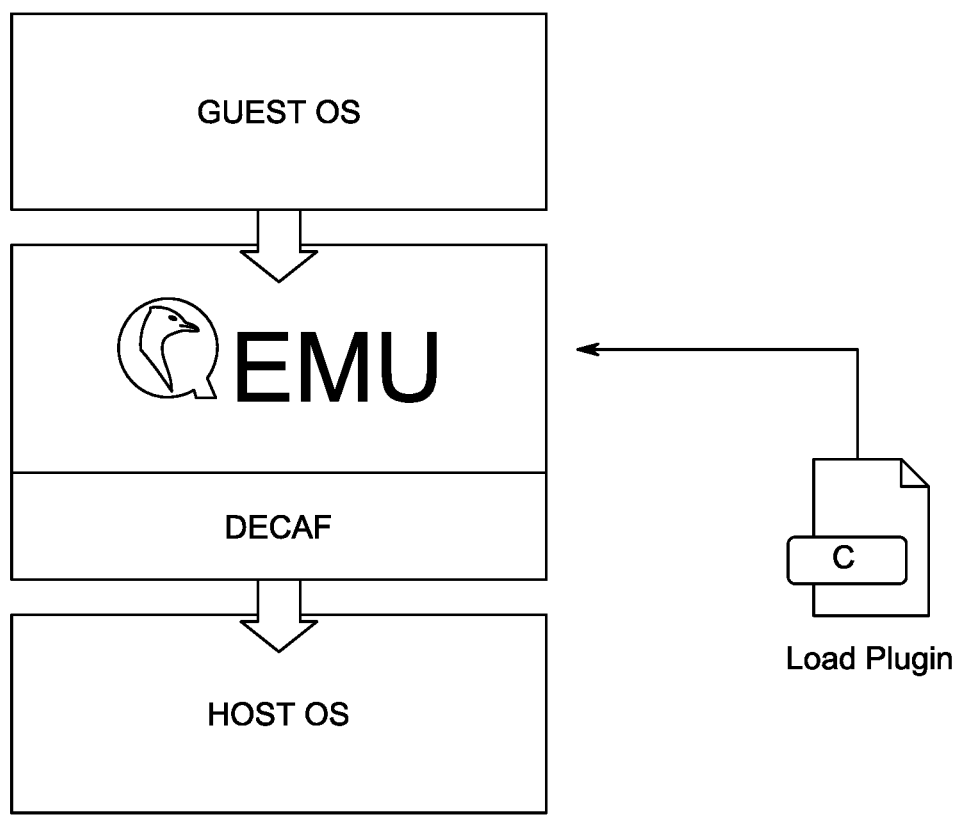
FIG. 16 is a diagram of an example QEMU and DECAF evaluation environment in accordance with some implementations.

In the environment as shown in FIG. 16, assume having DECAF which is integrated with QEMU. The approach works by first loading a plugin to QEMU at runtime. This plugin works by applying a system hook for a specified system call for each newly created process in the system. A callback function is triggered whenever the system call is fired in the CPU. This is done by first checking the value of the EIP register and comparing it with the target system call address. If it is true a callback function is triggered that retrieves the return address and parameters in a struct. One can use that struct to retrieve useful information about the generated system call.

The disclosed approach takes advantage of using DECAF which provides a JIT VMI; allowing for run time adjustments for guest operating system. The system can load the plugin at any time and get the required results. Some implementations provide malware analyzers with good information about the specified system call by enquiring the system call parameters for further analysis. Additionally, the technique can permit system wide API hooking by tracking all newly created processes. More importantly, some implementations are transparent to the guest operating systems making it difficult for running processes to detect if they are being monitored.

The Xen hypervisor can be used to host the virtual machines and DRAKVUF to provide agentless VMI. (See, T. K. Lengyel, S. Maresca, B. D. Payne, G. D. Webster, S. Vogl, and A. Kiayias, "Scalability, fidelity and stealth in the DRAKVUF dynamic malware analysis system," in Proceedings of the 30th Annual Computer Security Applications Conference. ACM, 2014, pp. 386-395, which is incorporated herein by reference). With privileges gained from Xen. DRAKVUF can create full VM clones by Copy-on-Write (CoW) memory interface and Copyon-Write disk capability from Linux LVM. LibVMI library enables DRAKVUF to make use of DMA. LibVMI is "a C library with Python bindings that makes it easy to monitor the low-level details of a running virtual machine by viewing its memory, trapping on hardware events, and accessing the vCPU registers. This is called virtual machine introspection." (See, LibVMI Project, "LibVMI Project," 2015. Available at: libvmi.com, which is incorporated herein by reference).

At selected code locations, breakpoints are written into the VMs memory. When these breakpoints are reached, DRAKVUF triggers transfer of control to XEN. To achieve stealth, DRAKVUF hijacks an arbitrary process within the VM by using active VMI through breakpoint injection. Rekall is a memory analysis framework. (See, Rekall Team, "Rekall Forensic," 2016. Available at: rekall-forensic.com, which is incorporated herein by reference). Rekall comes in place to parse the debug data to establish a map of internal kernel functions instead of using the brute force methods (e.g., signature based scans) in order for DRAKVUF to automatically locate the kernel in memory. Creating and then reverting analysis container is faster than imaging then reverting physical machines. (See, T. K. Lengyel, S. Maresca, B. D. Payne, G. D. Webster, S. Vogl, and A. Kiayias, "Scalability, fidelity and stealth in the DRAKVUF dynamic malware analysis system," in Proceedings of the 30th Annual Computer Security Applications Conference. ACM, 2014, pp. 386-395, which is incorporated herein by reference). DRAKVUF is the doing the former while DECAF is doing the latter. That is why DRAKVUF has better performance than DECAF.

Figure 17:
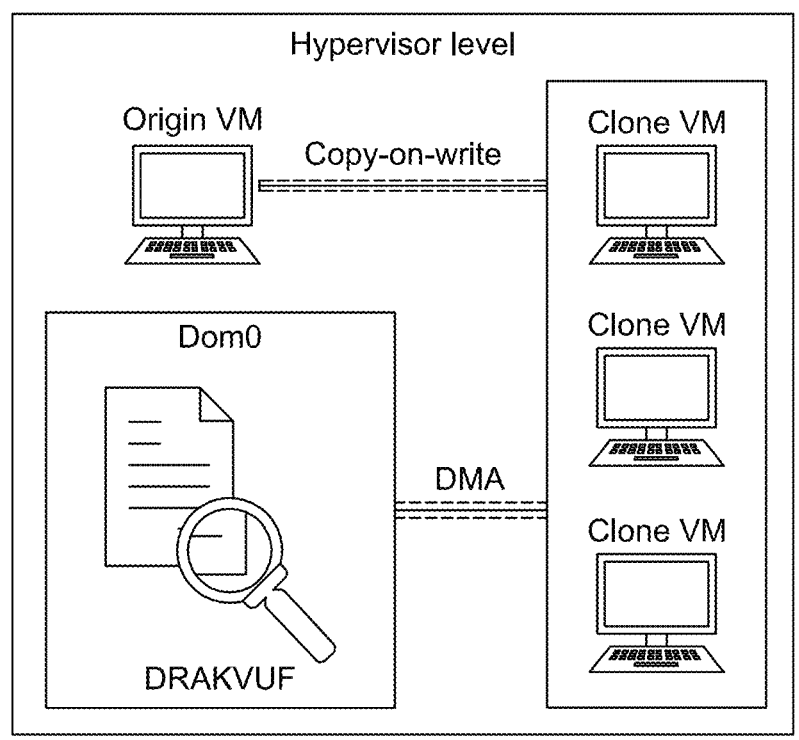
FIG. 17 is a diagram of an example Xen and binary analysis system., DRAKVUF, evaluation environment in accordance with some implementations.

The evaluation environment using Xen and DRAKVUF is shown in FIG. 17. As shown in the Figure DRAKVUF reside on Domain zero (Dom0). With some privileges DRAKVUF can make clones from the VM to be accessed later, using LibVMI with DMA to monitor context switching and system calls. With Rekall and its predefined kernel profile for specific OS, DRAKVUF can easily trapped specific system calls.

The evaluation environment was set up using the latest version of Ubuntu 16.04 LTS, Xen 4.9, and DRAKVUF 0.9. Ubuntu 16.04 was installed as the host OS and then installed Xen. Few technical steps are done to merge Xen with Ubuntu before preparing the environment for DRAKVUF installation. LibVMI and Rekall are installed and then DRAKVUF to complete the VMI process. Now, the virtualization environment is ready and a guest OS can be installed in a VM.

Windows 7 was used as the guest OS and now the guest OS can be monitored from the hypervisor level using DRAKVUF through VNC software. For completeness and clarity purposes, these detailed and sequenced steps are summarized as follows:

1. Install the latest version of Ubuntu 16:04 LTS as the host OS.
2. Prepare the environment for virtualization by installing some needed packages
   such as gcc, python-dev, libc6-dev-i386, libvncserver-dev, and libjsonc-dev.
3. Install a version of Xen that includes a built-in XSM policy required for DRAKVUF.

4. Dedicate some resources specifically for Demo0. In a test setup, 24 GB of RAM was designated along with 4 CPU cores for Demo0.
5. Reboot the and select the following option: "Ubuntu GNU/Linux, with Xen hypervisor". This option guarantees that Demo® is working with Xen support.
6. Setup LVM Volume Group to hold your VMs disks. Then, create a volume.
Such as a 20 GB volume for the guest OS.
7. Install Windows 7 from ISO. Enter the LibVMI folder in the DRAKVUF folder and build it.
8. Build and install LibVMI and ReKall. (See, M. Cohen, "Forensic analysis of windows user space applications through heap allocations," in Computers and Communication (ISCC), 2015 IEEE Symposium on. IEEE, 2015, pp. 237-244, which is incorporated herein by reference). (See, A. Socala and M. Cohen, "Automatic profile generation for live linux memory analysis," Digital Investigation, vol. 16, pp. S11-S24, 2016, which is incorporated herein by reference).
9. Create the Rekall profile for the Windows domain.
10. Test if LibVMI is working by running vmi-process-list.
11. Install DRAKVUF. Trace the execution of the system by picking which DRAKVUF plugins to run. Doing this step will prevent all mentioned plugins from running.
12. DRAKVUF now can run with the selected plugins that point to the virtual machine with the following characteristics: domain name "windows7-sp1", Rekall profile name "windows7-sp1.rekall.json". It should be mentioned that these names contain necessary information about the VM kernel, and all of the guest OS behavior can be monitored by DRAKVUF.

The Application Startup Timer (AppTimer) is a benchmark utility that will measure how long an application has been running. AppTimer is capable of running an application multiple times and calculating how long it takes for the application to reach a state where user input is being accepted before exiting the application.

After each run of the application, AppTimer will attempt to close the application in an automated fashion while logging the startup time measurements to a log file. A main use is in benchmarking an application's startup time. This can be useful when comparing the performance of different applications on different platforms.

Several experiments were conducted to test the effectiveness, the agility, and the performance of the disclosed security model. The performance evaluation process started in QEMU and DECAF environment and then switched to Xen and DRAKVUF environment. System call mapping experiments are conducted and the security system was verified and validated including a series of evaluation studies to examine the overhead of the security system. The performance measures used in these studies are:

Response Time. This metric computes the time from when the user submits the request to the time the system completes the response and is calculated as follows:

$$R = T_{res} - T_{req} \quad (7.1)$$

where Treq is the time the user finishes the request and Tres is time the system completes the response.

Generated System Call. This metric measures the number of times a certain user application asks the kernel to execute a privileged I/O instruction.

Performance Ratio. This metric is calculated as the quotient of the divided Ron by Roff and is calculated as follows:

$$\text{Performance ratio} = \frac{R_{on}}{R_{off}} \quad (7.2)$$

where Ron is the response time when the security system is activated and Roff is the response time when the security system is not activated. This performance metric measures the security system overhead or slowdown in terms of response time.

Figure 18:
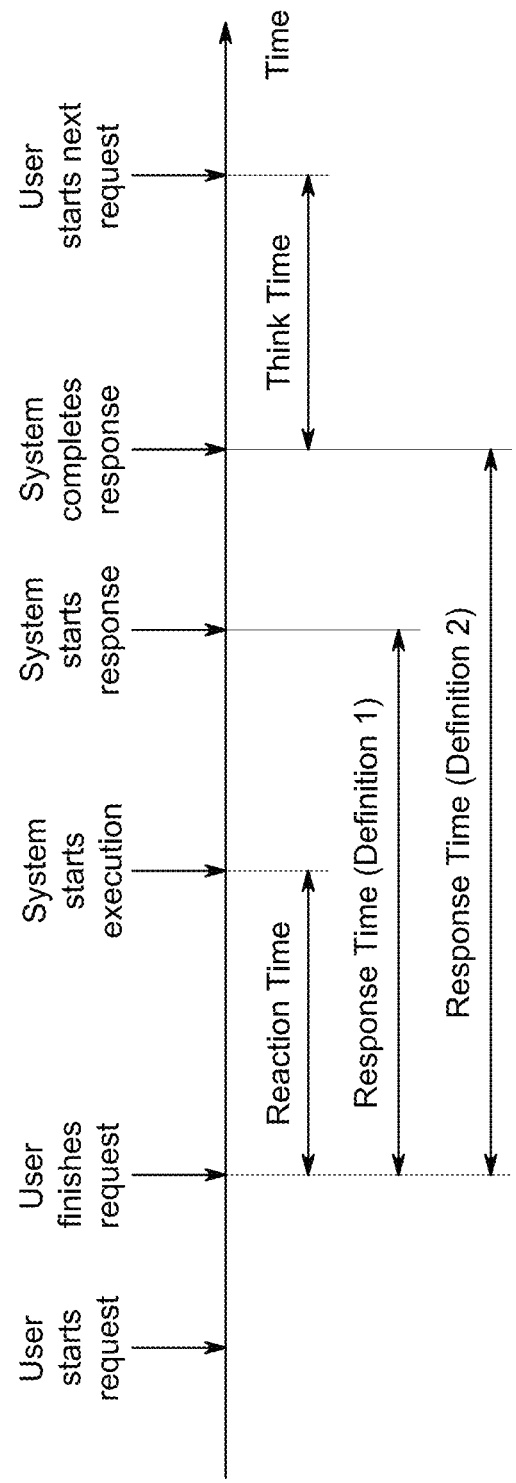
FIG. 18 is an illustration of an example response time definition in accordance with some implementations.

FIG. 18 shows two possible implication of "Response Time". It is either the time between the user finishing a request and the time when the system starts or completes the response. In evaluation experiments, the second definition as outlined above was adopted to measure the delay incurred by the security system until the system call is completely executed.

The number of system calls generated by applications was analyzed for two reasons: to calculate the number of system calls captured by the monitoring phase and then calculate the number of system calls needed for the analysis phase.

The experiments were done using windows XP as the guest OS, Linux Ubuntu 12:04 as host OS, QEMU version 2:3, and DECAF. NtCreateFile system call can be used as an example for the system call. To test the results, process was created that only calls the NtCreateFile system call.

FIG. 19 shows installing the hook upon knowing the address space of the NtCreateFile system call. This enables us to create a virtual memory to store the hook structs and call stack of the function call.

The code was tested against notepad.exe with the following results. FIG. 20 shows the process id, the process name and the filename. The process name can be retrieved by examining the CR3 register to check the page table range then find the corresponding process address space. The filename retrieval is system dependent and highly relies on the file system in the guest operating system. In the example, the following signature of the NtCreateFile system call from MSDN.

Some plugins in DECAF were modified, namely API_TRACER and HOOKAPITESTS, with some modification through the code to generate a list of all system calls called by certain process using the first plugins API_TRACER, using the second plugins to catch all the process used to call a certain system call, from both plugins are generated the reachability graph, which could be used in later.

The call stack contains the addresses of all of these parameters. The third attribute (OBJECT_ATTRIBUTES) is a structure that contains an ObjectName struct, as shown in FIG. 21. The ObjectName struct can be used to retrieve the full path of the file.

Instead of developing the security system from scratch, DRAKVUF was utilized and developed the security system around it. As explained earlier, DRAKVUF provides a suitable environment for malware analysis. This is established by capturing system calls. Therefore, the idea behind developing DRAKVUF was behavior-analysis and the captured system calls ignored anything to do with assets.

In order to utilize DRAKVUF in the security system, asset information was needed when capturing system calls. DRAKVUF was modified to include filename as a parameter in the system calls. Searching for the file name in the parameter of the system calls requires a lot of sting comparisons as the name of the file stored randomly regarding the system call, so it could be the second parameter or the last one, one the other hand it requires tracing efforts, as it could be a pointer rather than a String.

In the 30th of June 2017, a new version of DRAKVUF was released (DRAKVUF 0:5), that includes the filename as a parameter in the system call. Furthermore, the new release of AVG Internet Security—Unlimited and Bitdefender 2017, contains an option to protect some folders from ransom attacks, by preventing the untrusted application to access these folders, and for sure the user himself can customize the trusted application list and the protected folders. (See, AVG Support Team, "Ransomware Protection—FAQs," 2016. Available at: support.avg.com, which is incorporated herein by reference). (See, Bitdefender Support Team, "How ransomware protection works in Bitdefender 2017," 2017. Available at: bitdefender.com, which is incorporated herein by reference).

For the security system, the following changes to DRAKVUF are used:
1. Asset Identification Plugin: this plugin added to have the Critical Assets Identification capability.
2. Reachability Graph Plugin: done by utilizing some existing DRAKVUF Python plugins to generate the reachability graph.
3. Monitoring Plugin: utilizes DRAKVUF breakpoints to selectively modify call functions in the SYSCALLS plugin.
4. Decision Plugin: added this plugin to DRAKVUF to enable the prevention as well as the feedback capabilities of the security system.

The SYSCALLS plugin was modified within the DRAKVUF system and injected breakpoints only to selected system calls that could breach files security requirements instead of injecting breakpoints to all NT system calls. The reason of this modification is enhancing DRAKVUF performance. Furthermore, the callback functions within the SYSCALLS plugin were modified and corrupted the system call arguments. This measure was taken if the system call is in violation of an asset's security requirement. Arguments in four registers were modified, namely RCX, RDX, R8, and R9. This ensures that the system call will never access the asset.

The security system can analyze all or a subset of the captured system calls. To improve performance, monitored system calls were minimized to 29. (See, e.g., M. Kührer, J. Hoffmann, and T. Holz, "CloudSylla: Detecting Suspicious System Calls in the Cloud," in Symposium on Self-Stabilizing Systems, Springer, 2014, pp. 63-77, which is incorporated herein by reference) Some authors monitored system calls related to malware behavior. They started monitoring NtOpenFile and NtCreateFile. These two system calls affect file renaming and copying. Later, they added other network related system calls for a total of 29 system calls.

In experiments, a desire was to determine the system calls associated with "integrity", "availability", and "confidentiality". As such, "writing, appending" statements are associated with "integrity". Similarly, "reading, opening" and "deleting, renaming" are associated with "confidentiality" and availability, respectively.

Figure 23:
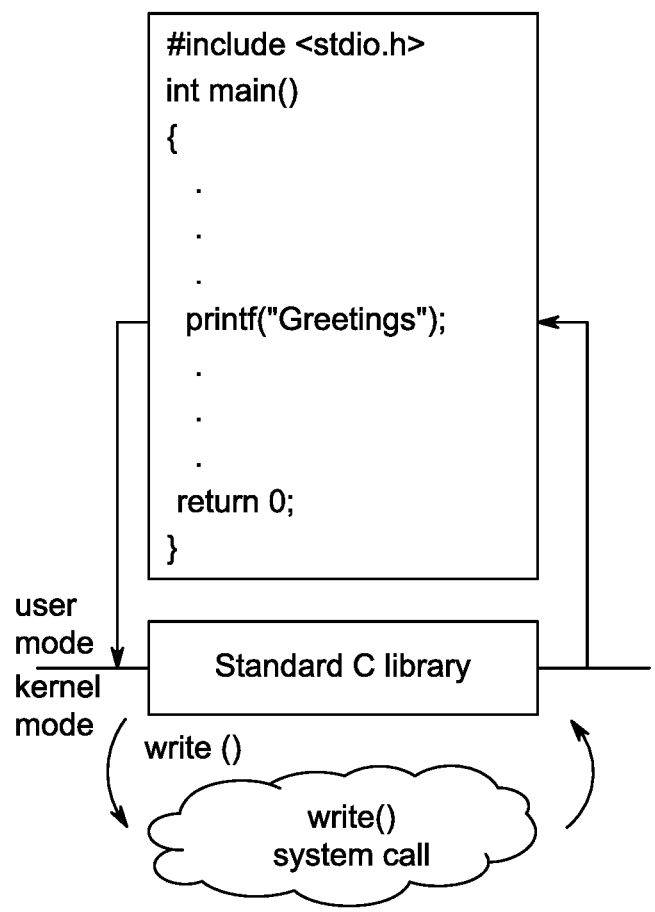
FIG. 23 shows an example standard library in accordance with some implementations.

In FIG. 23, the C user code invokes printf( ) statement. This statement is intercepted by the C library, which interacts with the kernel on behalf of the user program. Eventually, the printf( ) statement is mapped as write( ) system call in kernel mode. Once the kernel executes the write( ) system call, the returned value is passed to the user program.

In the evaluation, the user program invokes a statement that needs to be executed by the kernel on behalf of the user program. Such statements are referred to as privileged statements. At user space these statements call an interface library. The interface library does mode switching and give the command to the kernel which executes the system call. In order for the security system to capture the system calls, first to know which system calls correspond to the privileged statements (i.e. I/O privileged statements) invoked at user space.

As such, I/O privileged statements were mapped at the user space to the system call at the kernel space. Several experiments were conducted and examined I/O privileged statements, namely open, view, delete, rename, write, read, and append. In all of these experiments, the security system is running. The following subsections outline the findings.

To get the system calls invoked when a file is opened, the following experiment was conducted: While hovering over a file, right-click and open the file with "Notepad". Examining the system call log file, the following occurs: (1) The name of the file appeared in the log 11 times, (2) The system calls are invoked by two processes namely, "explorer.exe" and "notepad.exe". (3) The system calls are NtQueryAttributesFile, NtQueryDirectoryFile, NtCreateFile, NtQueryVolumeInformationFile, NtQueryInformationFile, NtCreateSection. The results of this experiment are summarized in Table 13.

TABLE 13

Mapping open statement to system calls: without double click.

| System Call | Repetition | Process Name |
|---|---|---|
| NtQueryAttributesFile | 2 | explorer.exe |
| NtQueryDirectoryFile | 3 | |
| NtQueryDirectoryFile | 2 | notepad.exe |
| NtCreateFile | 1 | |
| NtQueryVolumeInformationFile | 1 | |
| NtQueryInformationFile | 1 | |
| NtCreateSection | 1 | |

TABLE 14

Mapping open statement to system calls: with double click.

| System Call | Repetition | Process Name |
|---|---|---|
| NtQueryAttributesFile | 2 | explorer.exe |
| NtQueryDirectoryFile | 3 | |
| NtCreateFile | 1 | |
| NtQueryVolumeInformationFile | 2 | |
| NtQueryInformationFile | 1 | |
| NtFsControlFile | 1 | |
| NtQueryDirectoryFile | 2 | notepad.exe |
| NtCreateFile | 1 | |
| NtQueryVolumeInformationFile | 1 | |
| NtQueryInformationFile | 1 | |
| NtCreateSection | 1 | |

In MS Windows, one can view the content of a file without opening it. This is doable by opening the folder containing the file in Windows Explorer then selecting the file. The file content will appear in the preview pane. Doing this, the following occurs: (1) The name of the file appeared in the log 34 times. (2) The system calls invoked are NtOpenFile, NtQueryAttributesFile, NtCreateFile, NtFsControlFile, NtReadFile, and NtSetInformationFile. (3) All of them are generated by "explorer.exe". The results of this experiment are summarized in Table 15.

TABLE 15

Mapping view statement to system calls.

| System Call | Repetition | Process Name |
|---|---|---|
| NtOpenFile | 12 | explorer.exe |
| NtQueryAttributesFile | 14 | |
| NtCreateFile | 4 | |
| NtFsControlFile | 1 | |
| NtReadFile | 2 | |
| NtSetInformationFile | 1 | |

Here, the system calls generated when file is indirectly deleted (i.e., sent to the recycle bin) or directly deleted were captured (i.e., press the shift key with the delete key). Pressing the delete key on the keyboard will send the file to the recycle bin. On the other hand, pressing the shift key with the delete key will delete the file immediately without sending it to the recycle bin. Doing this experiment, the following occurs: (1) The name of the file appeared in the log 11 times, (2) There are 5 system calls appeared to interact with the file. These system calls are NtCreateFile, NtQueryDirectoryFile, NtQueryInformationFile, NtSetInformationFile, and NtOpenFile. (3) All of the system calls are generated by "explorer.exe". The results of this experiment are summarized in Table 16.

TABLE 16

Mapping delete statement to system calls.

| System Call | Repetition | Process Name |
|---|---|---|
| NtCreateFile | 2 | explorer.exe |
| NtQueryDirectoryFile | 2 | |
| NtQueryInformationFile | 2 | |
| NtSetInformationFile | 3 | |
| NtOpenFile | 2 | |

Renaming a file is done by hovering over the file, right-click, and then choosing rename from the pop-up menu. Doing this experiment, the following occurs for the original file: (1) The name of the original file appeared in the log 8 times. (2) These system calls are NtQueryDirectoryFile, NtOpenFile, NtQueryInformationFile, NtSetInformationFile, and NtCreateFile. (3) All of the system calls generated by "explorer.exe".

For the new file, the following is noticed: (1) The name of the file appeared in the log 28 times. (2) The name of the file repeated 8 times were called by "exploror. exe" and 20 times by "SearchProtocol". (3) The system calls generated by "explorer.exe" were NtQueryDirectoryFile, NtOpenFile, and NtQuery-AttributesFile. (4) The system calls generated by "SearchProtocol" are NtCreate-File, NtFsControlFile, NtQueryInformationFile, NtOpenFile, NtSetInformation-File, and NtReadFile.

The results of this experiment are summarized in Table 17. The Table shows both of the results, namely results concerning the original file and results concerning the new file.

TABLE 17

Mapping rename statement to system calls.

| File Type | System Call | Repetition | Process Name |
|---|---|---|---|
| Original | NtQueryDirectoryFile | 3 | explorer.exe |
| | NtOpenFile | 1 | |
| | NtQueryInformationFile | 1 | |
| | NtSetInformationFile | 1 | |
| | NtCreateFile | 2 | |
| New | NtQueryDirectoryFile | 3 | explorer.exe |
| | NtOpenFile | 3 | |
| | NtQueryAttributesFile | 2 | |
| | NtCreateFile | 4 | SearchProtocol |
| | NtFsControlFile | 4 | |
| | NtQueryInformationFile | 6 | |
| | NtOpenFile | 2 | |
| | NtSetInformationFile | 2 | |
| | NtReadFile | 2 | |

This experiment is done in three steps:

Step #1: Opening a file and modifying its content then check the log.

Step #2: Opening a file, modifying its content, and then clicking the save button. Then, check the log.

Step #3: Opening a file, modifying its content, the click the exit button. A dialogue box pop will ask the user to save the file, press the save option and check the log.

For step #1: (1) The name of the file appeared in the log 26 times. (2) The system calls are generated by "explorer.exe", "notepad.exe", and "SearchProtocol".

For step #2: the same behavior as in step #1. In addition, the following occurs: (1) The name of the file appeared 38 times in the log in total and 12 of them as new entry. (2) The system calls are generated by "explorer.exe", "notepad.exe", and "SearchProtocol".

As of step #3, the behavior was exactly as the one discussed in step #2. This can be explained by the fact that the actions taken by the user process towards the asset (i.e., the file) are the same. In step #3, delay only the saving of the file by closing it abnormally, which affect the sequence of the system calls.

The results of this experiment are summarized in Table 18. The Table shows the three results, namely results concerning step #1, step #2, and step #3. Since step #2 and step #3 have the same results, they are combined in the same row of Table 18.

The objective of this experiment is to explore the different between appending rather than writing to a file. In this experiment, a C program is developed "appendtotext. c" to append to an existing file and to a non-existing file. When the file was not there, the system creates the file then append to it. For the case where the file exits, the system directly append to the file.

TABLE 18

Mapping write and save statements to system calls.

| File Type | System Call | Repetition | Process Name |
|---|---|---|---|
| Step #1 | NtQueryAttributesFile | 2 | explorer.exe |
| | NtQueryDirectoryFile | 3 | |
| | NtCreateFile | 1 | |

TABLE 18-continued

Mapping write and save statements to system calls.

| File Type | System Call | Repetition | Process Name |
|---|---|---|---|
| | NtQueryVolumeInformationFile | 2 | |
| | NtQueryInformationFile | 1 | |
| | NtFsControlFile | 1 | |
| | NtQueryDirectoryFile | 2 | notepad.exe |
| | NtCreateFile | 1 | |
| | NtQueryVolumeInformationFile | 1 | |
| | NtQueryInformationFile | 1 | |
| | NtCreateSection | 1 | |
| | NtCreateFile | 2 | SearchProtocol |
| | NtFsControlFile | 2 | |
| | NtQueryInformationFile | 3 | |
| | NtOpenFile | 1 | |
| | NtSetInformationFile | 1 | |
| | NtReadFile | 1 | |
| Step #2 and Step #3 | NtQueryAttributesFile | 4 | explorer.exe |
| | NtQueryDirectoryFile | 4 | |
| | NtCreateFile | 1 | |
| | NtQueryVolumeInformationFile | 2 | |
| | NtQueryInformationFile | 1 | |
| | NtFsControlFile | 1 | |
| | NtOpenFile | 3 | |
| | NtQueryDirectoryFile | 3 | notepad.exe |
| | NetCreateFile | 2 | |
| | NtQueryVolumeInformationFile | 1 | |
| | NtQueryInformationFile | 2 | |
| | NtCreateSection | 1 | |
| | NtWriteFile | 1 | |
| | NtSetInformationFile | 2 | |
| | NtCreateFile | 2 | SearchProtocol |
| | NtFsControlFile | 2 | |
| | NtQueryInformationFile | 3 | |
| | NtOpenFile | 1 | |
| | NtSetInformationFile | 1 | |
| | NtReadFile | 1 | |

In the case of the existing file, the following occurs: (1) The name of the file appeared in the log 21 times. (2) These system calls are NtCreateFile, NtQueryVolumeInformationFile, NtQueryInformationFile, NtSetInformationFile, NtWriteFile, NtFsControlFile, NtOpenFile, NtReadFile, NtQueryDirectoryFile, and NtQueryAttributesFile. (3) The processes "appendtotxt.exe", "SearchProtocol", and "explorer.exe" are responsible for generating the system calls. The results of this experiment are summarized in Table 19. The Table shows the two results, namely results concerning existing files and results concerning non-existing files.

TABLE 19

Mapping append statement to system calls.

| File Status | System Call | Repetition | Process Name |
|---|---|---|---|
| Existing | NtCreateFile | 1 | appendtotext.exe |
| | NtQueryVolumeInformationFile | 1 | |
| | NtQueryInformationFile | 1 | |
| | NtSetInformationFile | 1 | |
| | NtWriteFile | 1 | |
| | NtCreateFile | 2 | SearchProtocol |
| | NtFsControlFile | 2 | |
| | NtQueryInformationFile | 3 | |
| | NtOpenFile | 1 | |
| | NtSetInformationFile | 1 | |
| | NtReadFile | 1 | |
| | NtQueryDirectoryFile | 1 | explorer.exe |
| | NtOpenFile | 3 | |
| | NtQueryAttributesFile | 2 | |
| Non-Existing | NtCreateFile | 1 | appendtotext.exe |
| | NtQueryDirectoryFile | 1 | |
| | NtQueryVolumeInformationFile | 1 | |
| | NtQueryInformationFile | 1 | |
| | NtSetInformationFile | 1 | |
| | NtWriteFile | 1 | |
| | NtCreateFile | 2 | SearchProtocol |
| | NtFsControlFile | 2 | |
| | NtQueryInformationFile | 3 | |

TABLE 19-continued

Mapping append statement to system calls.

| File Status | System Call | Repetition | Process Name |
|---|---|---|---|
| | NtOpenFile | 1 | |
| | NtSetInformationFile | 1 | |
| | NtReadFile | 1 | |
| | NtQueryDirectoryFile | 2 | explorer.exe |
| | NtOpenFile | 3 | |
| | NtQueryAttributesFile | 2 | |

The security requirements need to be mapped to system calls. This mapping is done by the security practitioner. Knowing the guest operating system type, system calls, as well as the security requirement, the security practitioner will identify system calls that must be prevented to preserve the security requirement. For example, the following system calls, namely NtWriteFile and NtSetInformationFile must be prevented to preserve "integrity". NtDeleteFile and NtSetInformationFile system calls must be prevented to preserve "availability". Likewise, NtReadFile, NtOpenFile, NtCreateFile, and NtSetInformationFile system calls must be prevented to preserve "confidentiality". The meaning of these system calls are shown in Table 20.

An experiment was conducted to verify and validate the prototype by running the Task Manager within the virtual machine to provide the list of the running processes. The "Monitor" system calls plugin should provide the same list of running processes assuming that all these processes are generating system calls.

Figure 24:
FIG. 24 shows example virtual machine process lists in accordance with some implementations.

Indeed and as illustrated in FIG. 24, the running processes captured by the task manager within the virtual machine are also captured by the security system. In a next experiment, the prototype was exposed to an academic cryptoransomware identical to the famous jigsaw crypto-ransomware of which new variants just appeared in January 2018. (See, Mauri de Souza Nunes, "A POC Windows crypto-ransomware (Academic)," 5 Sep. 2016. Available at: github.com, which is incorporated herein by reference). A crypto-ransomware traverses interesting directories and encrypts all files that match certain file extensions. The ransomware contains 3 files, namely Server.exe, ransomware.exe, and Unlocker.exe. The Server.exe file emulates a connection between the victim machine and money seeker. The server is used to store the victim's information and the unique encryption key. The ransomware.exe file encrypts the files inside the victim's machine using AES-256-CTR and generates a list of the encrypted files and instruction for decrypting them. After following the instructions and the payment is confirmed, the encryption key and the Unlocker.exe can be used by the victim to decrypt the files. According the above and an analysis done by others (See, Q. Chen and R. A. Bridges, "*Automated Behavioral Analysis of Malware A Case Study of WannaCry Ransomware*," arXiv preprint arXiv:1709.08753, 2017, which is incorporated herein by reference). (See, A. Akkas, C. N. Chachamis, and L. Fetahu, "Malware Analysis of WanaCry Ransomware," 2017, which is incorporated herein by reference). (See, N. Scaife, H. Carter, P. Traynor, and K. R. Butler, "Cryptolock (and drop it): stopping ransomware attacks on user data," in Distributed Computing Systems (ICDCS), 2016 IEEE 36th International Conference on. IEEE, 2016, pp. 303-312, which is incorporated herein by reference).

The ransomware process works in stages as follows:
1. Query the original file to be encrypted.
2. Create/Open temporary output file.
3. Read the content from the original file, encrypt it, and send the encrypted content to the temporary file.
4. Close the original and the temporary files.
5. Move the contents of the temporary file to the original file.
6. Close both files and wait for all other original files to be. Encrypted
7. Rename the original file.
   (a) Create a file with base64 equivalent filename.
   (b) Move the encrypted content from the original file to the file with the base64 equivalent filename.
   (c) Delete the original file.

To further verify and validate the security system in capturing system calls, the Ransomware process was monitored and any system call generated by the process name "ransomware.exe" for file "issa.txt" was captured. Once the security system captures the system calls, the analysis of these system calls should follow the stages outlined above. To relate the captured system calls to the number of stages, a reference was consulted for the meaning of the system calls and findings are shown in Table 20. (See, Microsoft, "Microsoft API and reference catalog," 2018. Available at: msdn.microsoft.com, which is incorporated herein by reference).

TABLE 20

Meaning of the system calls and findings

| System Call | Meaning |
|---|---|
| NtCreateFile | Creates a new file or directory, or opens an existing file, device, directory, or volume. |
| NtCreateSection | The ZwCreateSection routine creates a section object. |
| NtDeleteFile | The ZwDeleteFile routine deletes the specified file. |
| NtFsControlFile | The ZwFsControlFile routine sends a control code directly to a specified file system or file system filter driver, causing the corresponding driver to perform the specified action. |

TABLE 20-continued

Meaning of the system calls and findings

| System Call | Meaning |
| --- | --- |
| NtOpenFile | Opens an existing file, device, directory, or volume, and returns a handle for the file object. |
| NtQueryAttributesFile | Retrieves basic attributes for the specified file object. |
| NtQueryDirectoryFile | The ZwQueryDirectoryFile routine returns various kinds of information about files in the directory specified by a given file handle. |
| NtQueryFullAttributesFile | The ZwQueryFullAttributesFile routine supplies network open information for the specified file. |
| NtQueryInformationFile | The ZwQueryInformationFile routine returns various kinds of information about a file object. |
| NtQueryVolumeInformationFile | The ZwQueryVolumeInformationFile routine retrieves information about the volume associated with a given file, directory, storage device, or volume. |
| NtReadFile | The ZwReadFile routine reads data from an open file. |
| NtSetInformationFile | The ZwSetInformationFile routine changes various kinds of information about a file object. |
| NtWriteFile | The ZwWriteFile routine writes data to an open file. |

Table 21 shows the captured system calls, the file path accessed by ransomware. exe is accessing, and the corresponding stage number according to the analysis. As shown in Table 21, the file to be encrypted "issa.txt" is queried so that "ransomware.exe" can collect relevant information and then a temporary file is created and opened. Stage 3 then starts by opening and reading from "isaa.txt" and writing to the temporary file. Stage 4 then closes the original and the temporary files. During the final stage (i.e. stage 7), "ransomware.exe" creates a file with base64 equivalent filename and move the encrypted content from the original file to the file with the base64 equivalent filename and finally deletes "issa.txt". This shows that the security system captured all system calls generated by ransomware.exe and in the correct sequence.

TABLE 21

System calls initiated by ransomware.exe for issa.txt.

| Captured System Call | File Path | Stage # |
| --- | --- | --- |
| NtQueryFullAttributes File | \Users\hs\Desktop\issa.txt | 1 |
| NtCreateFile | \Users\hs\AppData\Local\Temp\issa.txt | 2 |
| NtCreateFile | \Users\hs\Desktop\issa.txt | 3 |
| NtWriteFile | \Users\hs\AppData\Local\Temp\issa.txt | 3 |
| NtReadFile | \Users\hs\Desktop\issa.txt | 3 |
| NtWriteFile | \Users\hs\AppData\Local\Temp\issa.txt | 3 |
| NtReadFile | \Users\hs\Desktop\issa.txt | 3 |
| NtClose | \Users\hs\AppData\Local\Temp\issa.txt | 4 |
| NtClose | \Users\hs\Desktop\issa.txt | 4 |
| NtCreateFile | \Users\hs\Desktop\issa.txt | 5 |
| NtSetInformationFile | \Users\hs\Desktop\issa.txt | 5 |
| NtCreateFile | \Users\hs\AppData\Local\Temp\issa.txt | 5 |
| NtReadFile | \Users\hs\AppData\Local\Temp\issa.txt | 5 |
| NtWriteFile | \Users\hs\Desktop\issa.txt | 5 |
| NtReadFile | \Users\hs\AppData\Local\Temp\issa.txt | 5 |
| NtClose | \Users\hs\Desktop\issa.txt | 6 |
| NtClose | \Users\hs\AppData\Local\Temp\issa.txt | 6 |
| NtCreateFile | \Users\hs\Desktop\issa.txt | 7 |
| NtCreateFile | \Users\hs\Desktop\aXNzYS50eHQ=.encrypted | 7 |
| NtReadFile | \Users\hs\Desktop\issa.txt | 7 |
| NtWriteFile | \Users\hs\Desktop\aXNzYS50eHQ=.encrypted | 7 |
| NtReadFile | \Users\hs\Desktop\issa.txt | 7 |
| NtClose | \Users\hs\Desktop\aXNzYS50eHQ=.encrypted | 7 |
| NtOpenFile | \Users\hs\Desktop\issa.txt | 7 |
| NtQueryInformationFile | \Users\hs\Desktop\issa.txt | 7 |
| NtSetInformationFile | \Users\hs\Desktop\issa.txt | 7 |

Finally, an experiment was conducted to verify that "ransomware.exe" is working properly in the environment. Therefore, no critical files on the virtual machine were identified and ran "ransomware.exe" on the virtual machine while the security system is running on the hypervisor-level. The ransomware process was able to encrypt all files. This is expected since there are no critical files and therefore the security system has nothing to defend and the ransomware was allowed to encrypt all files.

To validate the security system architecture and design in the various security spaces focus and build the design in the information security space not in the physical nor in the e-ICT security space, regarding asset-defense, proactive, and passive objectives of the system, are achieved as follows: the asset-defense objective is achieved because the asset itself was targeted not the attack vector when the security requirement was set or when prevention or allowing access as shown in FIG. 15 was handled, the proactive objective is achieved when the security requirement is set before the system goes online it can be noticed that from the before system deployment stage as in FIG. 14, the passive objective means that the attacker will not notice the existence of the system and this is what is inherited when the system is operated at the hypervisor level as depicted in FIGS. 12, 16, and 17.

Figure 26:
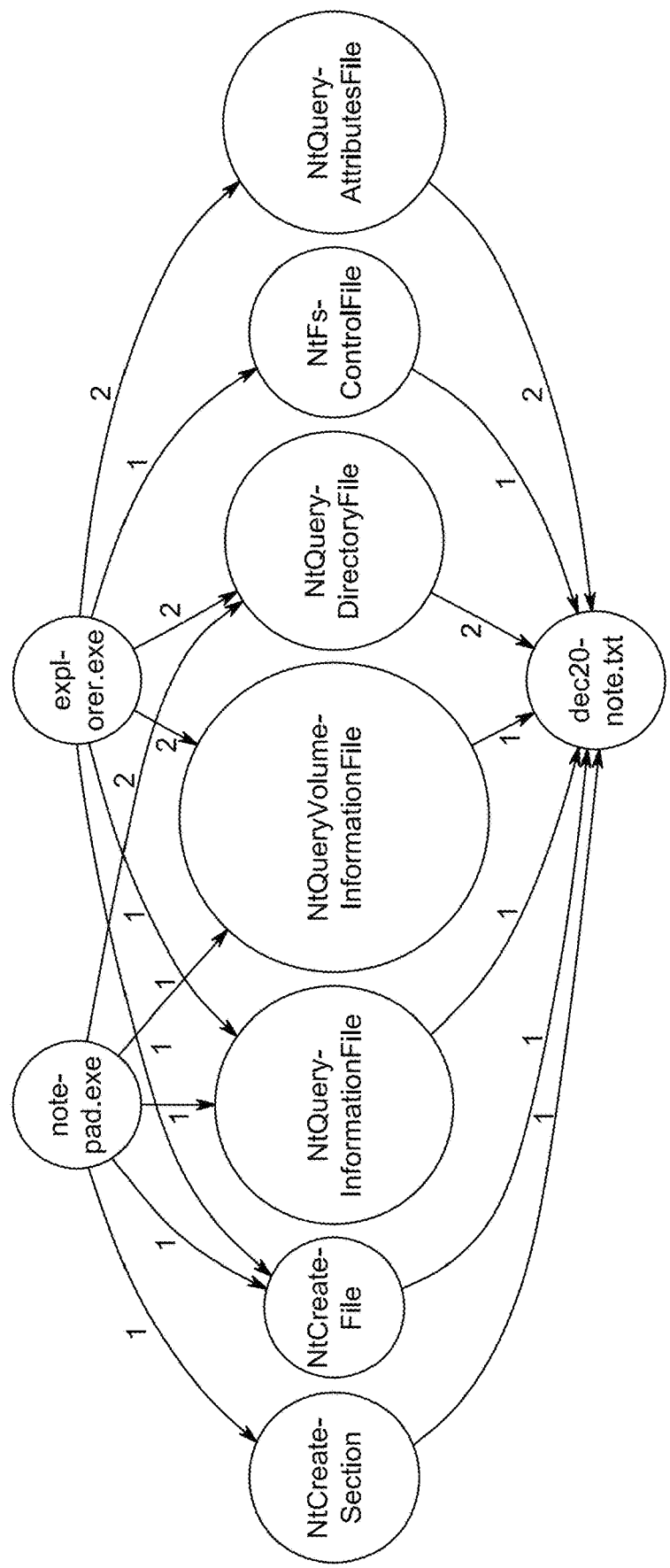
FIG. 26 is an example direct reachability graph for reading a text file in Notepad in accordance with some implementations.
Figure 28:
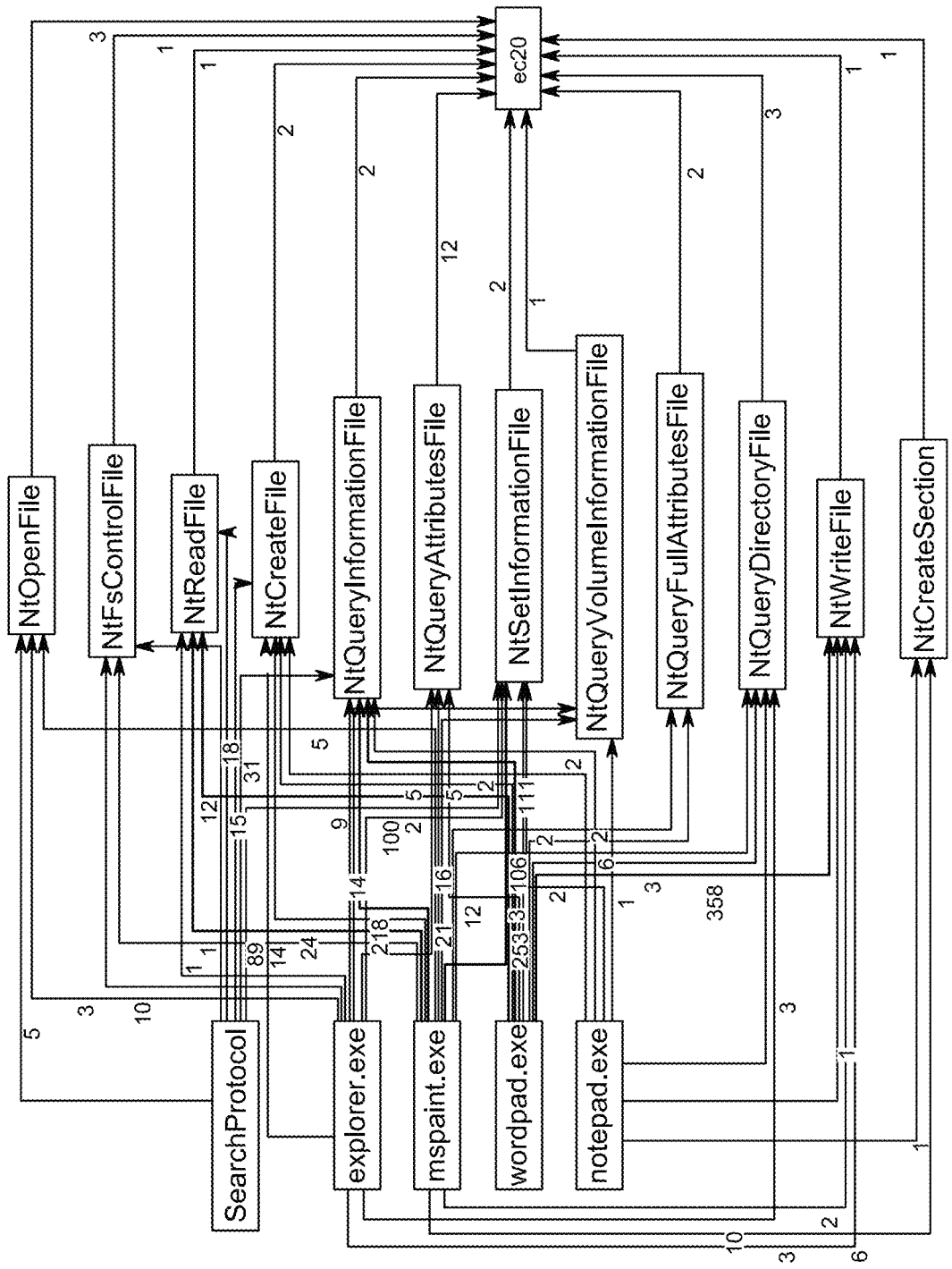
FIG. 28 is an example direct reachability graph for accessing a file in accordance with some implementations.

The system is run in a secure environment. This environment is considered to be safe and with no ongoing attacks. The reachability graph will capture low level critical assets and does not require deep-knowledge expertise about the IT infrastructure. The goal here is to free the system administrator from providing low-level details about the organization because this is done automatically by the reachability graph. The generating of the reachability graph is as follows:

Start the system that contains the critical assets.
Start the security system.
The monitored system calls are written to a log file.
Parse the log file and organizes the monitored system calls as shown in FIG. 25.
The reachability graph will be generated as shown in FIG. 26.

As shown in 7.9, the critical file is accessed by two processes "notepad.exe" and "explorer.exe". If one of these processes is modified by an unauthorized user, the security requirements of the critical file can be violated. Therefore, there is a need to include the indirect reachability to the critical assets.

Some authors have constructed what is known as "dependency graph" to simulate the interactions between system objects to estimate the probability that a critical assets is compromised if an attacked penetrated through some safe data paths. (See, S. A. Zonouz, R. Berthier, H. Khurana, W. H. Sanders, and T. Yardley, "Seclius: An information flow-based, consequence-centric security metric," IEEE Transactions on Parallel and Distributed Systems, vol. 26, no. 2, pp. 562-573, 2015, which is incorporated herein by reference). In the disclosed approach, a need exists to catch the indirect reachability to critical assets.

The analysis phase get more complex in order to include the indirect low-level critical assets to the reachability graph. The log file is parsed starting the critical asset identified by the asset owner. The direct reachability graph already captured all the processes having direct access to the critical file. Further exploration and find out the dependency of other system objects (processes or files) that have interactions with these processes. Any found object will be added as a critical asset to the reachability graph.

Furthermore, yet another experiment is run to defend a critical asset identified as abc.txt. This experiment starts by setting the security requirements for abc.txt according to Equations 1 to 3 explained above as follows:

$C=\{(abc.txt, P_{abc})\}$ $P_{abc}=\{(\text{confidentiality},\{\ \}),(\text{integrity},\{\ \}),(\text{availablity},[\ ])\}$ This means that confidentiality, integrity, and availability for abc.txt is defended against any process in the system. While the security system was running, attempts were made to access abc.txt within the virtual machine using various processes as shown in FIG. 29 and indeed the security system enforced the security requirements for file abc.txt by not allowing any process to access abc.txt.

In another experiment three critical assets were identified as abc.txt, abd.txt, and abe.txt. The security requirements were also identified for each file. The security requirement for abc.txt is confidentiality, integrity, and availability. Similarly, the security requirements for abd.txt are integrity and availability whereas only availability is required for abe.txt. Therefore and according to Equations 1 to 3 explained in Section 4.5.1.2:

$$C=\{(abc.txt,P_{abc}),(abd.txt,P_{abd}),(abc.txt,P_{abe})\} \quad (7.3)$$

$$P_{abc}=\{(\text{confidentiality},\{\text{Notepad}\}),(\text{availablity},\{\text{Notepad}\})\} \quad (7.4)$$

$$P_{abd}=\{(\text{integrity},\{\text{Notepad}\}),(\text{availabilty},\{\text{Notepad}\})\} \quad (7.5)$$

$$P_{abe}=\{(\text{availability},\{\text{Notepad}\})\} \quad (7.6)$$

While the security system was running, an attempt to access abc.txt was made within the virtual machine using various processes as shown in FIG. 30 and indeed the security system enforced the security requirement for file abc.txt by not allowing any process to access abc.txt. It was successful in reading abc.txt using Notepad but could not modify the file using Notepad as depicted in FIG. 29(a).

Other processes could not modify, rename, copy, or delete abc.txt. If the process is not Notepad, the security system blocks all system calls containing abc.txt as a file parameter. The security system was applied to defend abd.txt and abe.txt and similar results were obtained as the results shown in FIGS. 30 and 29.

Figure 31:
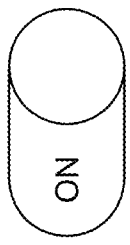
FIG. 31 shows example ransomware protection modes in AVG in accordance with some implementations.
Figure 34:
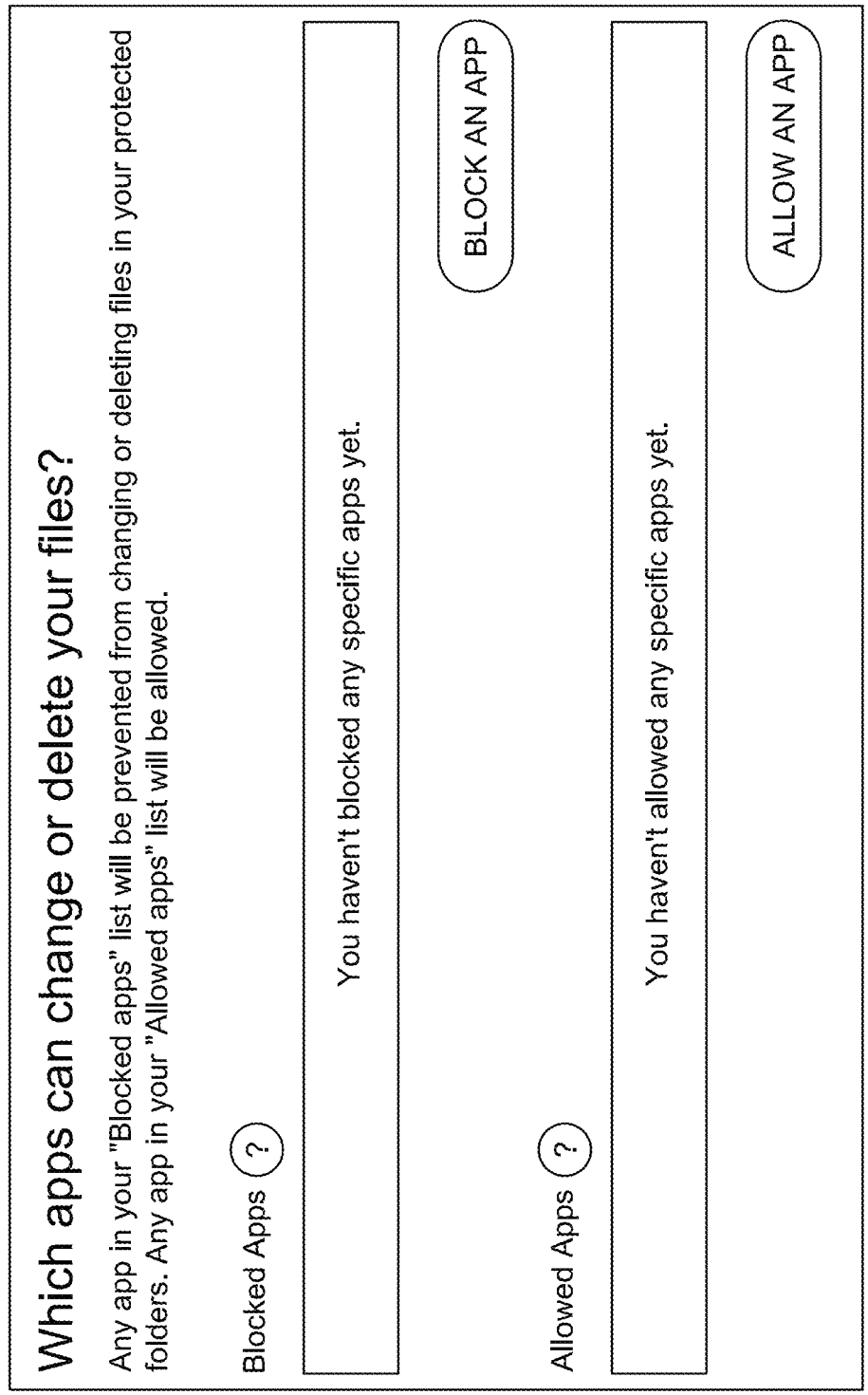
FIG. 34 shows blocked applications and allowed applications in AVG in accordance with some implementations.

Activating ransomware protection option which is part of Anti Virus Guard (AVG) to test the effect of real-world Ransomware, after activation of ransomware protection three main menus appeared to set the needed parameters for ransomware protection as in FIGS. 31, 32, and 34. In FIG. 31 a user can choose between smart mode and strict mode, in smart mode any untrusted application will require the user's permission to change or to delete any file inside protected folders, while in strict mode all of the applications will ask for the user's permission.

In FIG. 32, a user can specify the folders to be protected. By default AVG will set theses folders appeared in FIG. 32, also it is easy to add more or adjust the type of files to be secured inside the protected folder as shown in FIG. 33.

In FIG. 34, a user can specify the blocked application or the allowed one, so the allowed application will not wait for permission any more to access the files inside the selected folders and the blocked application will be blocked directly without notification.

Figure 35:
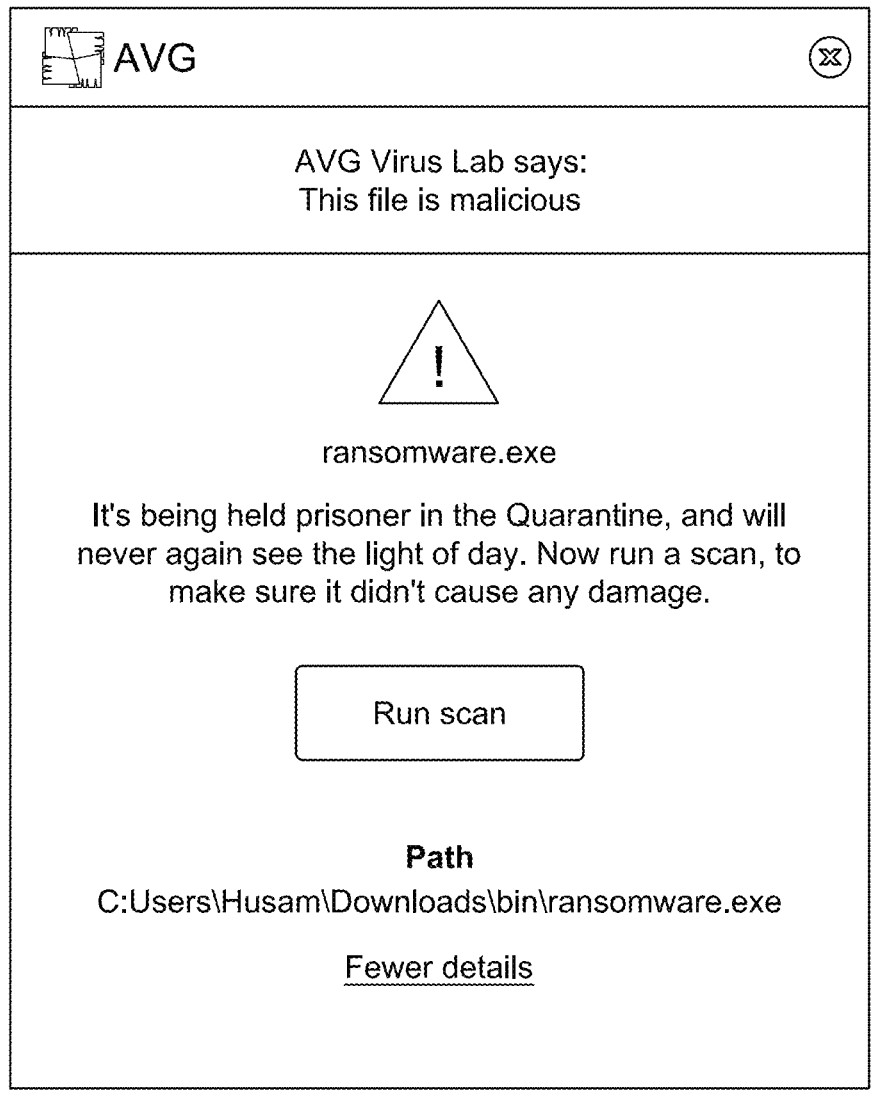
FIG. 35 shows ransomware.exe caught by AVG anti-virus in accordance with some implementations.
Figure 36:
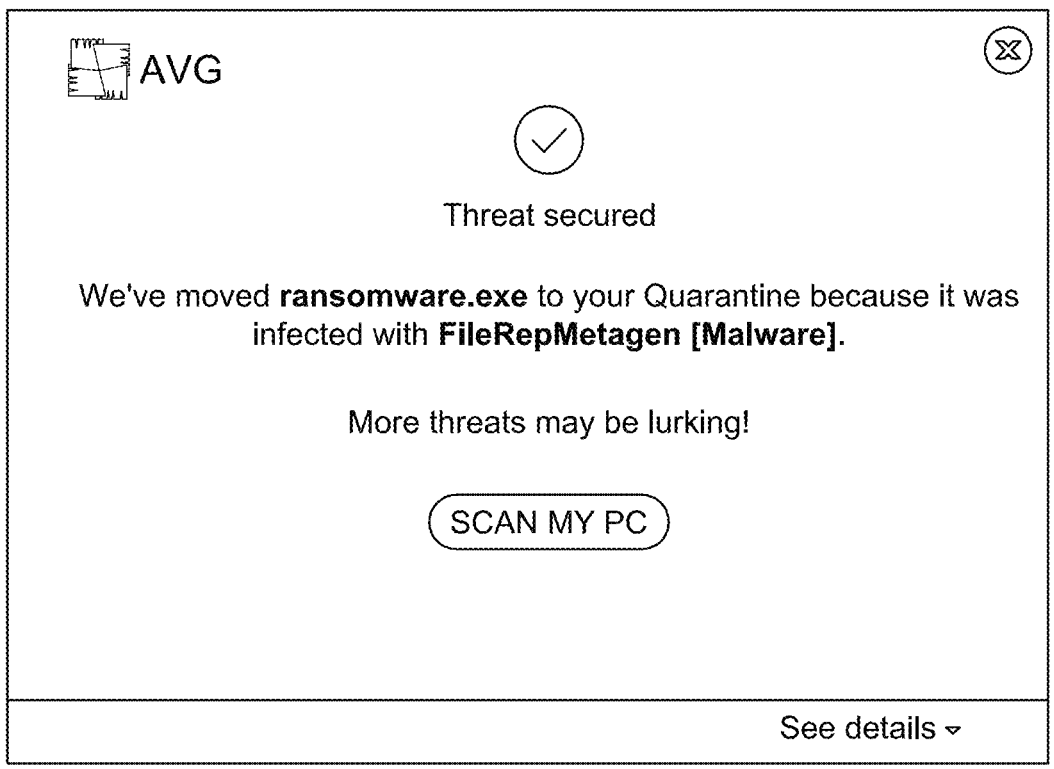
FIG. 36 shows AVG handling a ransomeware.exe file in accordance with some implementations.
Figure 37:
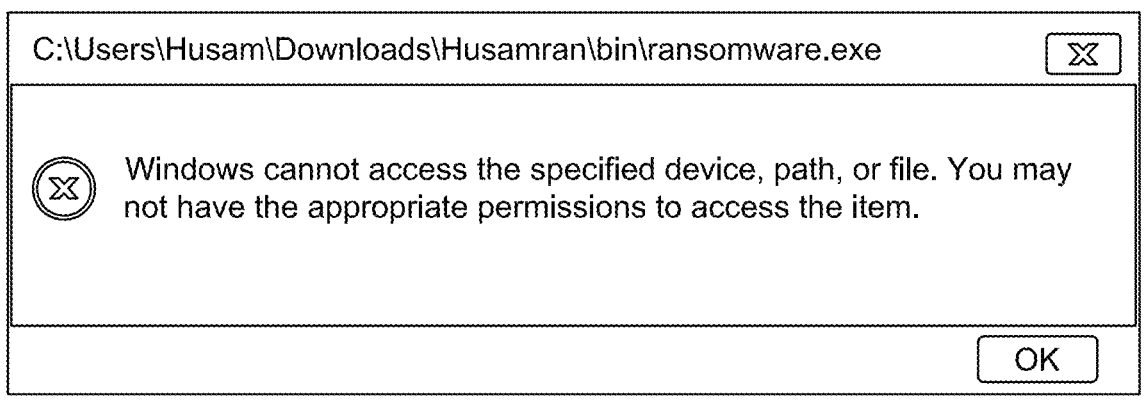
FIG. 37 shows no more permission being granted to ransomeware.exe in accordance with some implementations.

The same crypto-ransomware was used to test AVG ransomware protection section, when the ransomware.exe program was run a pop-up menu asking permission for the program, if it is allowed and trusted then all the files in every protected folder or unprotected folder will be encrypted, if permission is denied the or leaves AVG to investigate the file then FIGS. 35, 36, and 37 will be shown as consequence.

In FIGS. 35 and 36, AVG antivirus generates message dealing with the possible malicious action of encryption generated by ransomware.exe, and specifies the particular part of malicious action, which result in putting the file in the quarantine.

In FIG. 37 a message shown by Windows assuring that ransomware has been blocked and having no permission any more.

Figure 38:
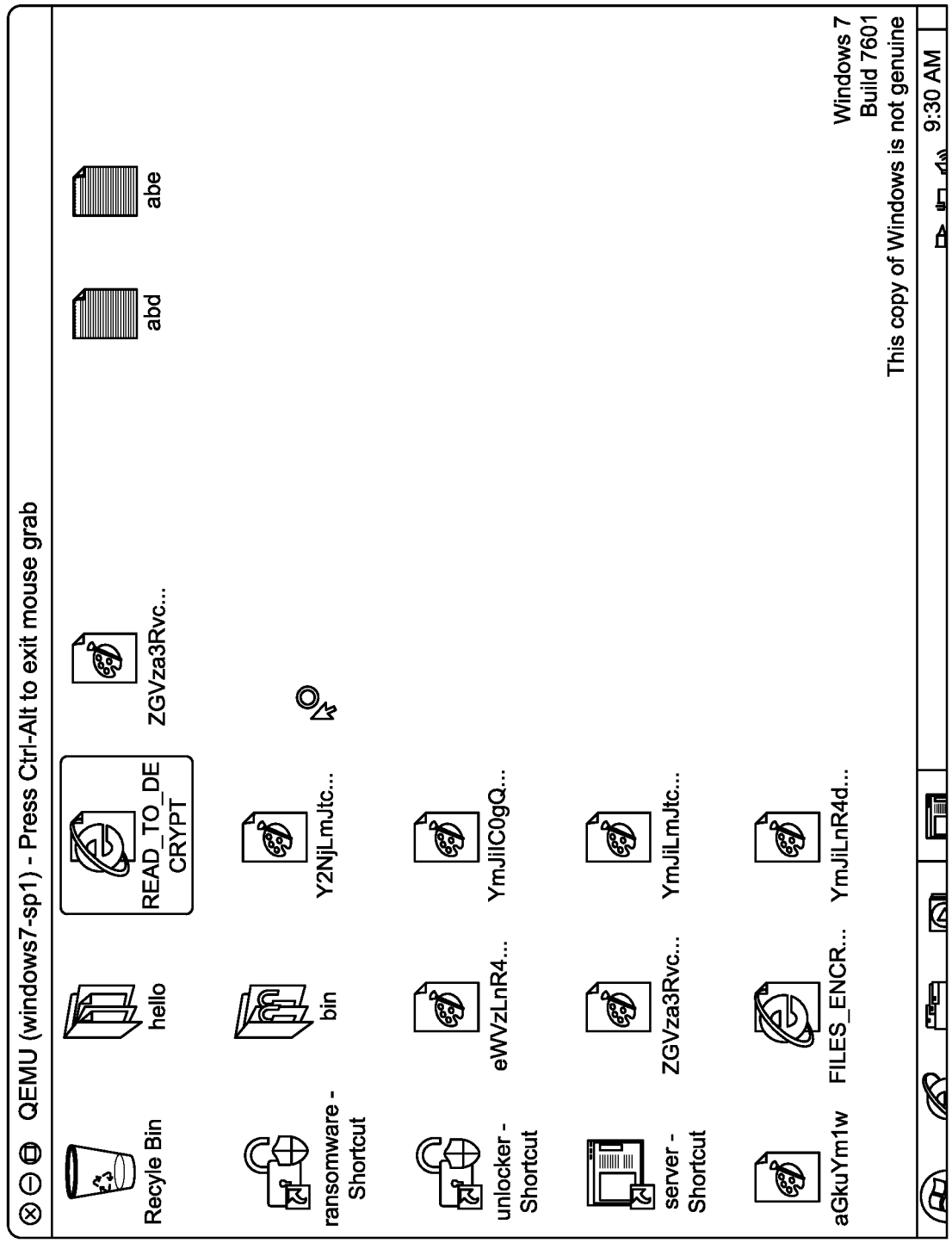
FIG. 38 shows crypto-ransomware encrypting all but two critical files in accordance with some implementations.

The prototype was exposed to crypto-ransomware to test the agility of the security system in defending assets against a real-world ransomware attack. Two critical files "abd.txt" and "abe.txt" were created with their security requirements as explained in Equations 4, 6, and 7. The crypto-ransomware was able to encrypt all files, as shown in FIG. 38, except the two identified critical files namely, "abd.txt" and "abe.txt". The system calls that were blocked from accessing "abd.txt" and it was observed that the security system blocked NtWrite-File, NtSetInformationFile, and NtDeleteFile. These are exactly the system calls mapped to integrity and availability as explained in Section 4.5.1.2. Similarly, the systems calls blocked from accessing "abe.txt" are exactly the ones corresponding to NtReadFile and NtSetInformationFile. These are the system calls mapped to availability. This shows that the security system defends identified critical assets by insuring that their security requirements are not violated. The security system does not require the signature nor the behavior of the ransomware and it does not depend on information provided by the ransomware. As such, the security system is purely asset-based.

The performance penalty that comes with any new security approach is a crucial measure of the viability of that approach. If the security approach hinders performance to a degree where the system becomes unusable, then it's non-viable.

Sets of experiments were conducted to measure how many system calls will be captured by the monitoring phase. Subsequently, these system calls will be passed to the analysis phase for further processing. Four applications were monitored, namely Notepad, WordPad, WinWord, and MS Paint. The system calls generated by these four applications using two different scenarios were counted.

In the first scenario, AppTimer is configured to open the application and close the application. Then, a count of the system calls generated by the application will be provided to us by the monitoring phase as shown in FIG. 39. Table 22 shows the number of system calls generated from this scenario under the "No Asset" column. This column is found under two categories: "Application Only" and "System Related". "Application Only" means the system calls generated from the application itself (i.e., the system call contains the application name). "System Related" means the system calls generated from the application itself as well as other system calls generated because of other system applications. For example, in FIG. 39 there are two system calls generated by "explorer.exe" as a result of executing "Notepad.exe" or system applications. In the second scenario, AppTimer is configured to open the application, open a file within the application, and then close the application.

TABLE 22

Number of NT system calls: monitoring phase.

| | System Calls | | | |
|---|---|---|---|---|
| | Application Only | | System Related | |
| Application | No Asset | With Asset | No Asset | With Asset |
| Notepad | 1419 | 2069 | 3349 | 4855 |
| WordPad | 10226 | 13470 | 12306 | 17104 |
| WinWord | 24096 | 31929 | 31094 | 51276 |
| MS Paint | 11043 | 14993 | 18152 | 19420 |

The count of system calls generated by the application in this scenario will be provided by the monitoring phase similar to the ones provided in FIG. 39. The numbers shown in Table 22 were calculated by eliminating all system calls before the first system call generated by the application and also eliminating all system calls appeared after the last system call generated by the application. The system calls were then counted in between. It should be also noted that each number shown in Table 22 is the average of 5 runs.

Figure 40:
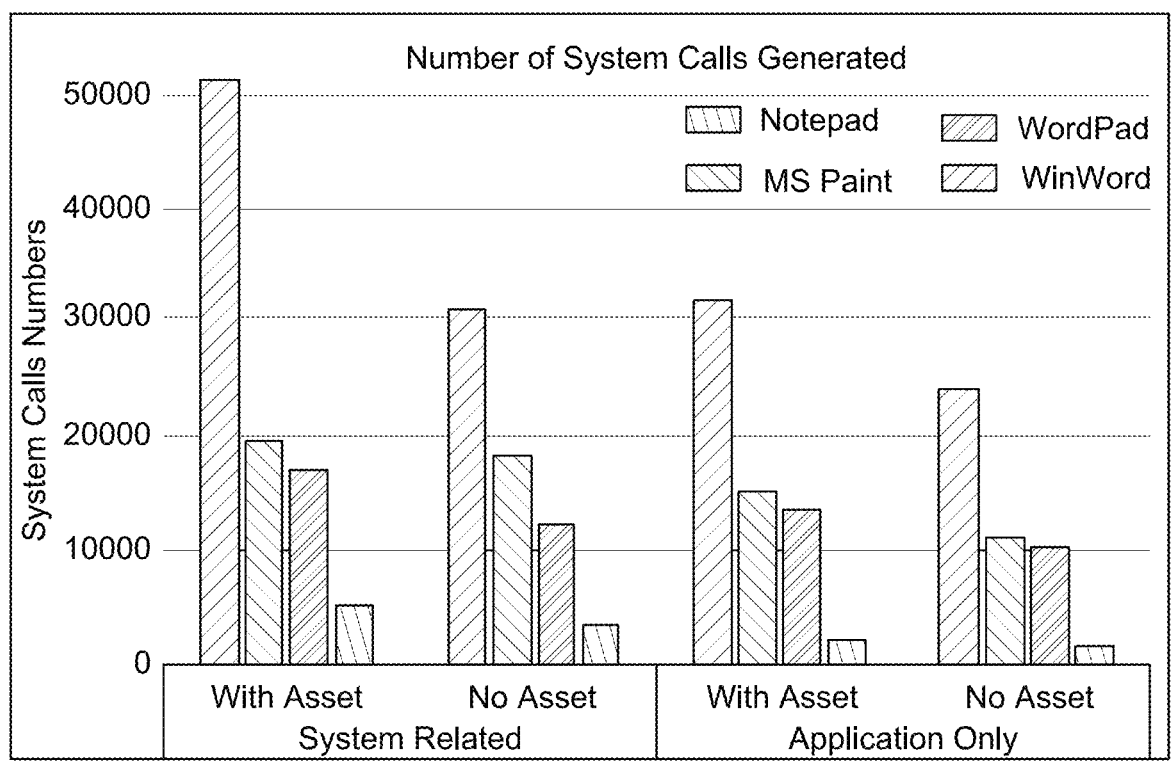
FIG. 40 shows system calls generated by an application in different scenarios in accordance with some implementations.

Examining FIG. 40, the following was observed:

The number of system calls vary according to the application. For example, "Notepad" generated the least number of system calls since it is a basic text editor meant for basic plain text entry, which verifies findings in Table 22. The reference states that WordPad is more advanced than Notepad and is meant for formatting and printing documents like WinWord, but not quite as advanced as WinWord.

The number of system calls needed to only open the application is less than the system calls generated when the application used to open a file. This increase is due to extra privileged file-related I/O operations.

The monitoring phase is not only affected by the system calls generated by the monitored application but also by the system calls generated by other application during the monitoring period.

This section deals with filtering and passing only the needed systems calls to the analysis phase to insure the protection of assets. In Table 23, the number of system calls generated by specific application for specific NT system call are counted.

As shown in the table's first row, 11 NtCreateFile, 25 NtOpenFile, 2 NtReadFile, and 54 NtSetInformationFile system calls were generated by Notepad for a total of 92 system calls. These specific NT system calls are the ones that the analysis phase will process. That is, for the case of "Notepad", the analysis phase will process only 92 system calls out of 4855 systems calls generated by "Notepad". Similarly, the same explanation can be applied to the rest of the applications.

TABLE 23

Number of specific NT system calls: monitoring phase.

| Application | System Calls | | | |
|---|---|---|---|---|
| | NtCreateFile | NtOpenFile | NtReadFile | NtSetInformationFile |
| Notepad | 11 | 25 | 2 | 54 |
| WordPad | 67 | 138 | 34 | 116 |
| WinWord | 208 | 244 | 156 | 306 |
| MS Paint | 49 | 100 | 37 | 151 |

Figure 41:
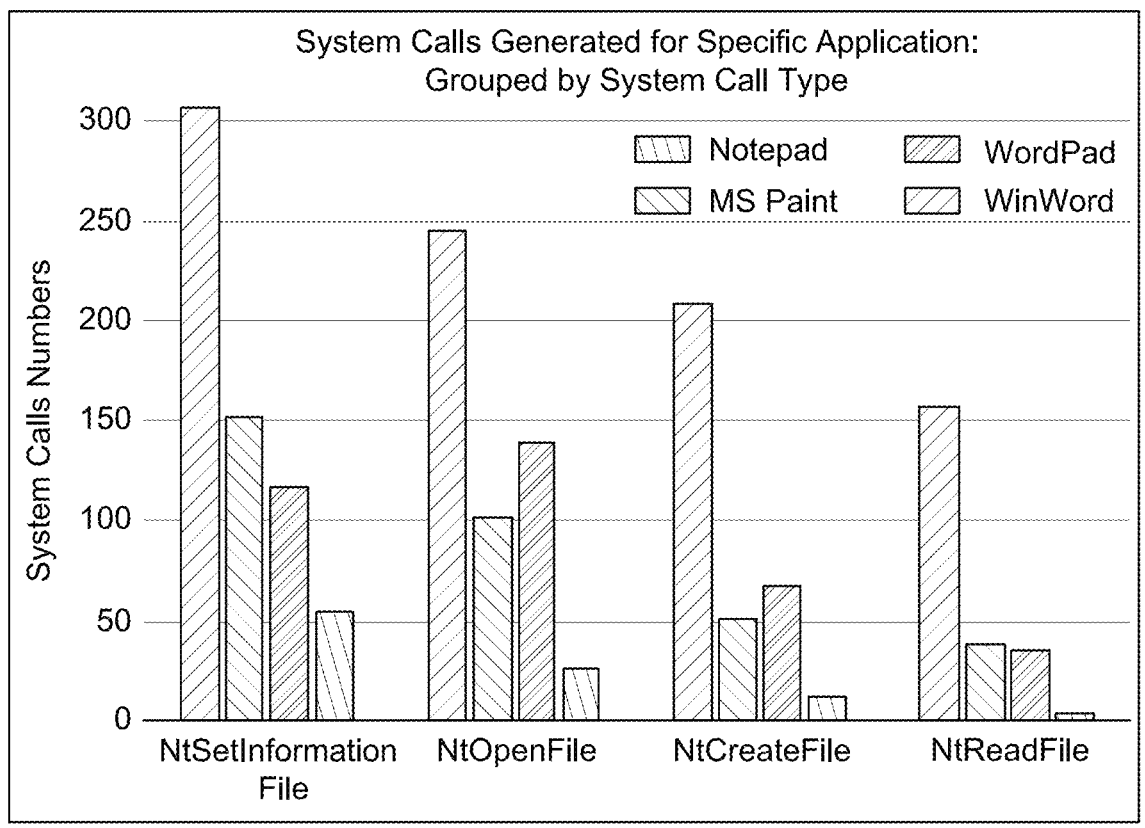
FIG. 41 shows selected system calls grouped by system call in accordance with some implementations.

In FIG. 41, the number of selected system calls for certain applications are captured. These captured system are filtered more and more to dig for certain system calls. It is shown that the number of these system calls related to the application itself, this result is expected as is, but a noticeable issue regarding the number of system calls in WordPad and MS Paint where they look like already the same in number when NtReadFile called but different when NtSetInformationFile generated. It is seen from FIG. 41 that MS Paint has more number of calls of type NtSetInformationFile rather than WordPad, while NtOpenFile and NtCreateFile generated more in WordPad compared to MS Paint.

Figure 42:
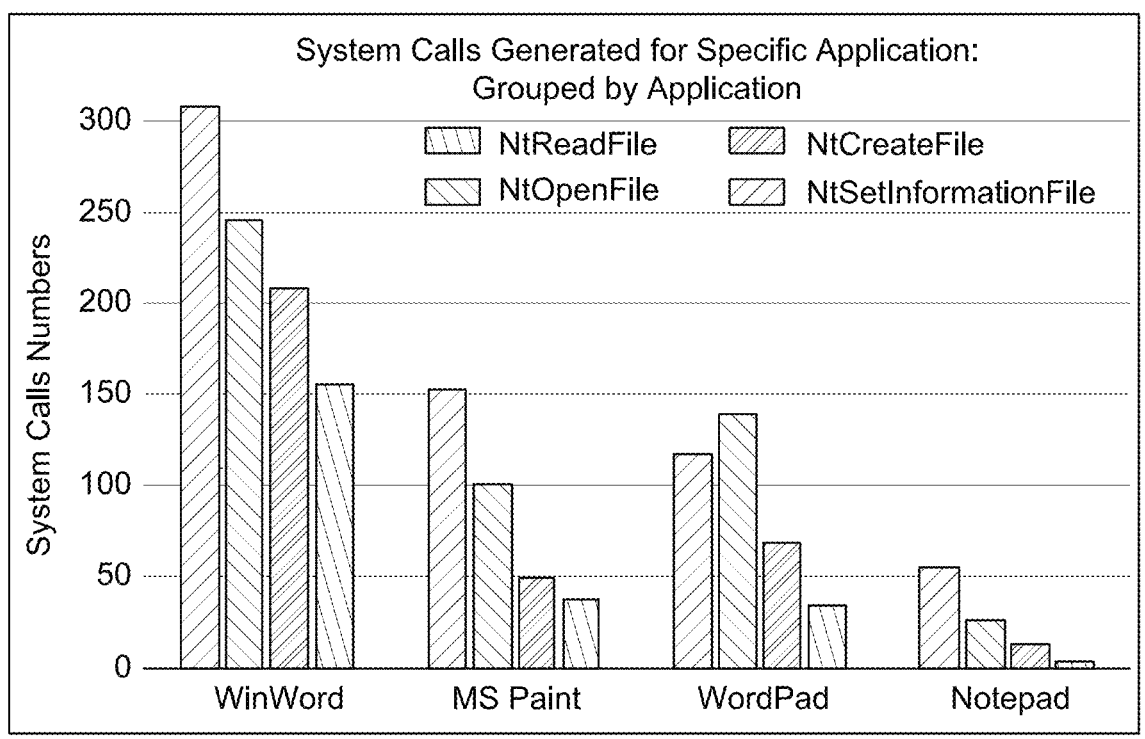
FIG. 42 shows selected system calls grouped by application in accordance with some implementations.

In FIG. 42, the number of system calls are grouped by the application and not as in FIG. 41 which grouped by system call. FIG. 42 shows that application WordPad looks differently than other applications when the number of NtSetInformationFile is not the most called system call.

In these set of experiments, configure AppTimer to open and close an application. AppTimer will then generate a log file containing the response time as shown in FIG. 43.

The response times are shown in Table 24. The response time is the average of 20 runs and is measured in seconds. The table also shows the time measured when there is no asset accessed at all whether critical or noncritical.

Table 24 contains the response time measured by "AppTimer" when specific application is opened. There are 5 columns, where all of them show the response time using the corresponding application without opening a file.

Reference to FIG. 11, the response time measured in Table 24 branches to "Normal Operation" after step #2. The experiments shown in Table 24 are conducted as follows:

Start AppTimer.

Instruct AppTimer to open the application and record the start time.

Once the application window opens, instruct AppTimer to record the end time.

The difference between these two recorded times is the response time.

The first column shows the response time when there is no VMI (i.e., the monitoring phase is off). The second column contains the response time when the monitoring phase is active and the monitoring is done to the 6 specific system calls namely, NtWriteFile, NtReadFile, NtDeleteFile, NtSetInformationFile, NtOpenFile, and NtCreateFile. The third column measures the response time when all the NT system calls are monitored, while the fourth column shows the response time when the monitoring and analysis phases are active and done to the 6 specific system calls. The fifth column is taken when all the NT system calls are monitored and analyzed.

TABLE 24

Response time without file access.

| | No Asset | | | | |
|---|---|---|---|---|---|
| | | VMI | | VMI With Analysis | |
| Application | No VMI | Specific System Calls | NT System Calls | Specific System Calls | NT System Calls |
| Notepad | 0.0447 | 0.0611 | 0.1380 | 0.0620 | 0.1624 |
| WordPad | 0.0461 | 0.0770 | 0.1851 | 0.0616 | 0.2326 |
| WinWord | 0.0622 | 0.1233 | 0.6527 | 0.1232 | 0.6527 |
| MS Paint | 0.0696 | 0.1236 | 0.5437 | 0.1244 | 0.6769 |

The response time is measured as shown in Table 25. The response time is the average of 20 runs and it is measured in seconds. The table also shows the response time measured when there is non-critical asset accessed. Table 25 contains the response time measured by "AppTimer" when specific application used to open non-critical asset. There are 5 columns, where all of them show the response time using the corresponding application opening a file. Reference to FIG. 11, the response time measured in Table 25 branches to "Normal Operation" after step #4. The experiments shown in Table 25 are conducted as follows:

Start AppTimer.

Instruct AppTimer to open the non-critical file using the application and record the start time.

Once the non-critical file is opened, instruct AppTimer to record the end time.

The difference between these two recorded times is the response time. The first column shows the response time when there is no VMI (i.e., the monitoring phase is off). The second column contains the response time when the monitoring phase is active and the monitoring is done to the 6 specific system calls namely, NtWriteFile, NtReadFile, NtDeleteFile, NtSetInformationFile, NtOpenFile, and NtCreateFile. The third column measures the response time when all the NT system calls are monitored, while the fourth column shows the response time when the monitoring and analysis phases are active and done to the 6 specific system calls. The fifth column is taken when all the NT system calls are monitored and analyzed.

TABLE 25

Response time with non-critical file access.

| | | Non-Critical Asset | | | |
|---|---|---|---|---|---|
| | | VMI | | VMI With Analysis | |
| Application | No VMI | Specific System Calls | NT System Calls | Specific System Calls | NT System Calls |
| Notepad | 0.0462 | 0.0595 | 0.1378 | 0.0626 | 0.1930 |
| WordPad | 0.0462 | 0.0770 | 0.2013 | 0.0777 | 0.2483 |
| WinWord | 0.0622 | 0.1234 | 0.6682 | 0.1216 | 0.6298 |
| MS Paint | 0.0774 | 0.01238 | 0.5516 | 0.1244 | 0.7162 |

The response time was measured as shown in Table 26. The response time is the average of 20 runs and it is measured in seconds. The table also shows the response time measured when there is critical asset. Table 26 contains the response time measured by "AppTimer" when specific application wants to open the critical asset. There are 4 columns, where all of them show the response time using the corresponding application trying to open the critical file. Reference to FIG. 11, the response time measured in Table 26 either branches to "Normal Operation" or "Prevent system calls from continuity" after step #6. Branch to "Normal Operation" when the access to the critical file is not prevented as shown in Table 26 column 3 and 4. If the access to the critical file is prevented, then the response time is shown in columns 1 and 2. The experiments shown in Table 26 are conducted as follows:

Start AppTimer.

Instruct AppTimer to open the critical file using the application and record the start time.

The application may or may not open the file if the application is allowed to open the critical file, then Once the critical file is opened, instruct App-Timer to record the end time.

if the application is not allowed to open the critical file, then Once the dialogue box, as shown FIG. 30(c) appears, instruct AppTimer to record the end time.

The difference between these two recorded times is the response time.

In Table 26, the security system (including the monitoring phase, analysis phase, and the decision phase) is active. The first column shows the response time when the monitoring is done to the 6 specific system calls namely, NtWriteFile, NtReadFile, NtDeleteFile, NtSetInformationFile, NtOpenFile, and NtCreateFile. The second column measures the response time when all the NT system calls are monitored. It should be noted that the response time shown in columns 1 and 2 is taken when access to the file is prevented.

The third column shows the response time when the monitoring is done to the 6 specific system calls while the fourth column is taken when all the NT system calls are monitored. It should be noted that the response time shown in columns 3 and 4 is taken when access to the file is allowed.

TABLE 26

Response time with critical file access.

| | Critical Asset | | | |
|---|---|---|---|---|
| | Prevented | | Not Prevented | |
| Application | Specific System Calls | NT System Calls | Specific System Calls | NT System Calls |
| Notepad | 0.0613 | 0.1303 | 0.0612 | 0.1370 |
| WordPad | 0.0768 | 0.1854 | 0.0770 | 0.2011 |
| WinWord | 0.1211 | 0.6215 | 0.1230 | 0.6287 |
| MS Paint | 0.1237 | 0.4972 | 0.1240 | 0.5285 |

Table 27 shows the performance ratio for the 6 specific system calls. It should be noted that the performance ratio in:

The first column is the result of dividing the corresponding entries from the fourth column in Table 24 by the first column in the same Table.

The second column is the result of dividing the corresponding entries from the fourth column in Table 25 by the first column in the same Table.

The third column is the result of dividing the corresponding entries from the first column in Table 26 by the first column in Table 25.

The fourth column is the result of dividing the corresponding entries from the third column in Table 26 by the first column in Table 25.

Table 28 shows the performance ratio for NT system calls. It should be noted that the performance ratio in:

The first column is the result of dividing the corresponding entries from the fifth column in Table 24 by the first column in the same Table.

The second column is the result of dividing the corresponding entries from the fifth column in Table 25 by the first column in the same Table.

The third column is the result of dividing the corresponding entries from the second column in Table 26 by the first column in Table 25.

The fourth column is the result of dividing the corresponding entries from the fourth column in Table 26 by the first column in Table 25.

TABLE 27

Performance ratio for the 6 specific system calls.

| | No Asset | Non-Critical Asset | Prevented | Not Prevented |
|---|---|---|---|---|
| Notepad | 1.385 | 1.354 | 1.326 | 1.323 |
| WordPad | 1.336 | 1.681 | 1.662 | 1.665 |
| WinWord | 1.980 | 1.954 | 1.946 | 1.977 |
| MS Paint | 1.786 | 1.608 | 1.598 | 1.603 |

TABLE 28

Performance ratio for the NT system calls.

| | No Asset | Non-Critical Asset | Prevented | Not Prevented |
|---|---|---|---|---|
| Notepad | 3.631 | 4.177 | 2.820 | 2.965 |
| WordPad | 5.044 | 5.373 | 4.012 | 4.351 |
| WinWord | 10.493 | 10.126 | 9.991 | 10.106 |
| MS Paint | 9.725 | 9.259 | 6.427 | 6.831 |

Figure 44:
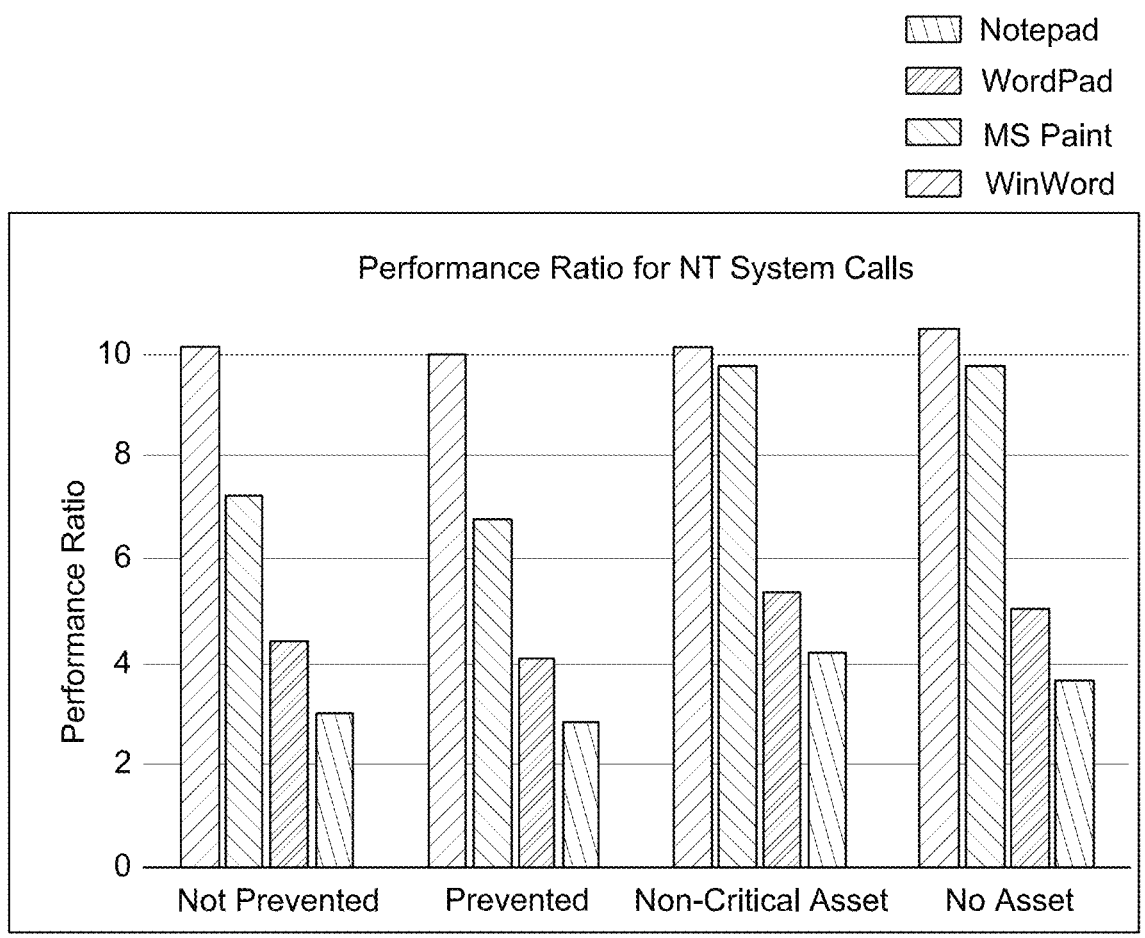
FIG. 44 shows example performance ratios for NT system calls in accordance with some implementations.
Figure 45:
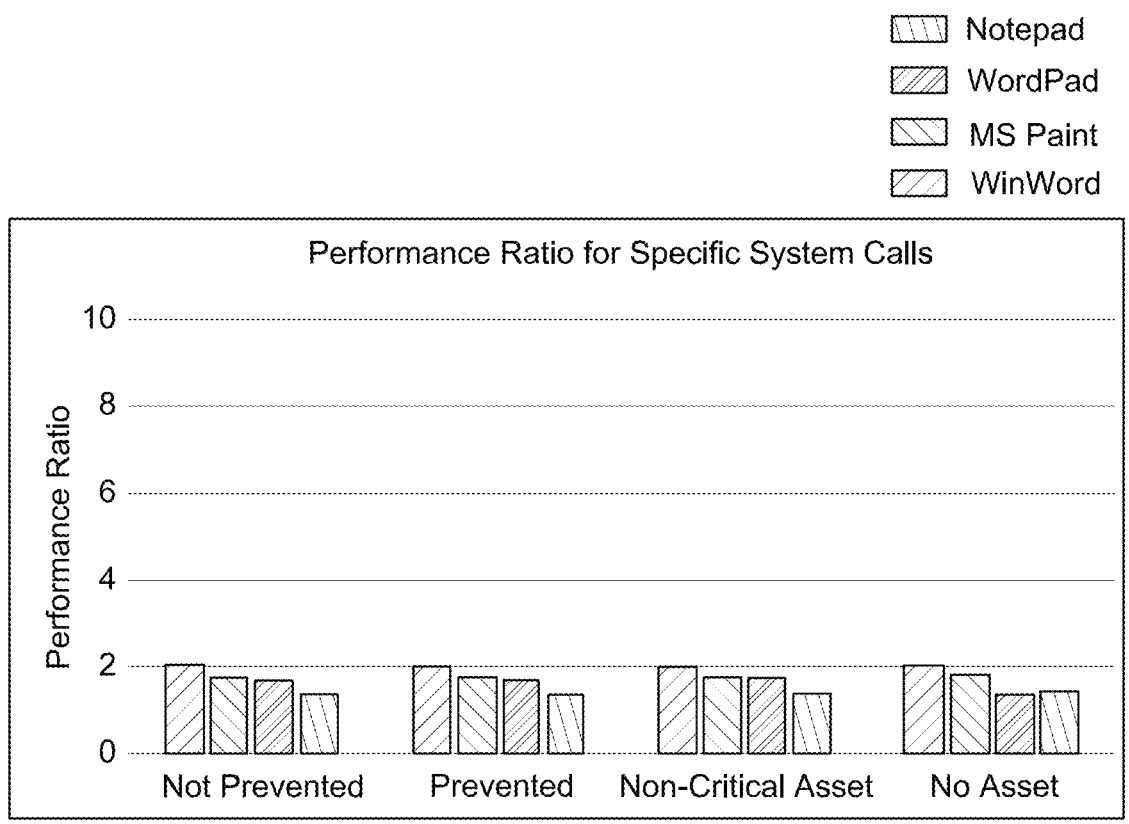
FIG. 45 shows performance ratios for the 6 specific system calls in accordance with some implementations.

From FIG. 44 the latency is not more than 10× in worst case and around 2× in best case. From FIG. 45 analyzing only specific system calls generates latency not more than 2× in worst case and around 1.3× in best case, which is an improvement over the results shown in FIG. 44.

The security system overhead using DRAKVUF 0:4 is approximately 38× in best case and up to 62× in worst case. A new release of DRAKVUF includes core modifications to the in-depth execution tracing of arbitrary binaries as well as modifications to DRAKVUF system call plugin. These modifications enable DRAKVUF to print detailed arguments for Windows guest. As such, the security system is improved significantly and this is shown by examining the results obtained using DRAKVUF 0:4 and comparing them to the results obtained using DRAKVUF 0:5.

There is no doubt that there is a vicious battle between attackers and defenders. Researchers as well as security practitioners have developed defense systems. These defense systems are built to defend against certain attack(s). To design such defense systems, attack vectors need to be examined. For example, to design a signature-based defense system, then previous attack vectors have to be collected and signatures developed for these attacks. Similarly, behavior-based security systems need to study the behavior of attack vectors to try and predict future attacks.

As such, a vital input parameter to these defense systems is the attack vector. The problem here is that the attack vector is designed by the attacker. If the attacker changes the attack vector, then the defense system becomes obsolete. Some implementations include a defense system that has no input parameters from attackers.

This led the present inventors to think differently by proposing an asset-based security system which is not inheriting the weaknesses in previous defense systems. The security system depends only on the defender which leaves attackers in a learning phase regarding the security system. The security system reacts prior to an attack.

A trend of constantly chasing changing attack vectors is contributing to the continuity of attackers-led security vicious cycle. Attackers are leading and defenders are learning. This paradigm needs to be shifted in a way that defenders are leading and attackers are learning.

The present inventors studied the need for security in by collecting information about the destructive effects of attacks through cyber space in addition to the financial losses due to these attacks. Then, existing security solutions were surveyed the for such attacks. The present inventors also explored the reasons behind the success of these destructive attacks and the fail of the defense lines.

Some implementations include an asset-based security system where security practitioners build their security systems based on information they own. The idea is to completely self rely in building security systems and require nothing from attackers. This way, attackers chase defenders which will not just level the security playing field but will give advantage to defenders. The security system consists of 4 phases namely, information collection, monitoring, decision, and feedback. Information collection phase prepares and collects the information needed for the security system to start its functionality by taking information from the asset owner about the critical assets and by building the reachability graph to reach those assets. The monitoring phase includes collecting system calls and parsing them to be processed in the decision phase which compares pre-collected information from the information collection phase with ongoing collected information from the monitoring phase to put the final decision for the captured system calls to be either terminated or passed. Finally, the feedback phase is important in applying and accommodating changes in the pre-collected information.

Also disclosed is a proactive asset based defense scheme using policies in a virtualized environment that can prevent illegal access to assets. Furthermore, the proposed system can be implemented using Xen as a hypervisor and DRAKVUF as hypervisor level monitoring agent to monitor and prevent illegal access to assets within a guest operating system running windows.

As a proof of concept, the security model was evaluated using ransomware real world attacks. The obtained results show that the system achieved promising results with acceptable degradation in performance. Finally, the performance of the solution were evaluated and found to be promising with some issues. As such, the response time overhead of the security system and the design of the security system can be accomplished as operating-system-independent.

The architecture of the proposed asset-based security system is outlined herein along with a prototype of the system. Extensive evaluation experiments were conducted to evaluate the feasibility and performance of the prototype. Obtained results are encouraging and show the agility of the prototype to ransomware attacks.

The security system prototype evaluation began with a verification and validation step. In this step, the Task Manager was run within the virtual machine to provide the list of the running processes. Indeed, the security system prototype provided the same list of running processes. The prototype was exposed to a real-world ransomware virus. Again, the prototype was successful in protecting critical assets from the ransomware effect and encryption.

To measure the prototype overhead, a set of experiments was conducted to count the number of system calls to estimate the efforts done by the prototype. The time needed to open an application in different scenarios was measured. The overhead of the security system prototype was acceptable. A comparison conclusion is shown in Table 29. The Table compares the security system to a non-asset-based security system. The security system's strength comes from its asset-awareness property which enables proactive prevention security measures.

General attacks hit as many as possible targets and these attacks will not be effective when the proposed security system is deployed.

TABLE 29

Comparing Asset-Based and Non-Asset-Based Security Systems.

| Phase | Security System | |
|---|---|---|
| | Non-Asset-Based | Asset-Based |
| Collector | Collects all | Collects all |
| Parser  System calls | Sequence of System calls | Subset |
| Content | Content-unaware | Content-aware |
| Decision Maker | After the fact | Before the fact |
| Generator | Attack-Based | Defender-Based |
| Tuner | MTD-impossible | MTD-possible |

This is because of customization to every standalone system will make the same attack vector useless against the system. For example, if the attack process is named "notepad.exe" and that process name is used as an allowed process to access the critical asset files in one system. The other systems can customize the name of the allowed process to be for example "mynotepad56.exe". Therefore, "notepad.exe" malicious code process will not harm the critical assets. Moreover, if the attacker reconnaissance phase is done on the security system to know the process name used as an allowed process, then the attacker will need to change his process name to the discovered one and must do that for every standalone defense system to hit as many targets as possible.

Also this mechanism can work in the same system. If there are 2 files using the same program or used by 2 users, the system can provide different name for every user so the system can make 2 processes such as renaming "notepad.exe" as "hisnotepad.exe" and "yournotepad.exe". Then, each one of these processes is assigned to different critical asset file. In this case, if the attacker succeeds in penetrating one of the asset files, the attacker has to initiate a new attack vector with new tuning to get the other file. this has to be done even if the 2 critical files are at the same system using the same program.

A prototype of the security system assumes the following:

Asset scope: As shown in Table 6, assets can be physical, t-ICT, e-ICT, or e-information. Since the proposed asset-based security system is asset-based, the scope of assets that the proposed system is based on needs to be clearly defined. Assets span over a wide range of entities. Files, processes, sockets, physical entities can be considered as assets. The present disclosure focuses on protecting information which is one of the main five assets mentioned in Table 6. Specifically, concern with protecting files. Files can be protected by controlling the physical files themselves and protecting reaching those files through processes. As such, The present disclosure considers asset as file, and monitors the system calls to reach those files through processes. So, the scope of the asset mainly starts from a file, then other processes and files could be added as assets through the reachability graph.

Information Collection Phase Immunity: The information collection phase as discussed herein is assumed to be done when the system is offline. That is, the information collection phase needs to be done before system deployment. Once the information is collected, this information will be used to determine the critical assets (including files and processes) that the user needs to protect. Since, later security decisions will depend on the information collected, immunity to this phase is necessary for validity of the system. Therefore, each time information phase needs to be executed, it must be done offline.

Virtualization Environment: The security system monitors system calls utilizing VMI, which enables the security system to be agentless and does in-depth execution tracing of arbitrary binaries. Therefore, a virtualization environment is assumed. As such, the system will be able to catch and analyze every system call generated by the guest OS by interacting with the hypervisor.

Availability scope: Availability can have three attributes, namely, response time, expiration, and resource allocation. As long as the asset (a physical file in the system) exists, a resource is allocated. If the physical file exists but cannot be accessed because the service (process) used to reach the file is unavailable, then the response time is affected. In this case, only the reachability to the file is affected.

Therefore, in the security system, the availability is limited to only physical files. The security system is not concerned with the availability of processes (services) because the focus is to protect physical files and insure that these physical files are not available and not deleted by unauthorized users.

Guest Operating System Compromise: If the attacker can compromise the guest OS, the system calls table can also can compromised. Therefore, an attacker can manipulate the system call table and then the system will not be able to catch critical system calls related to critical assets. The system depends mainly on monitoring system calls, so a compromise to the guest OS will harm the proposed security system.

Hypervisor Compromise: Although seldom and complicated, attacks can reach hypervisors. These attacks need sophisticated tools and skills but attacks knows as hyperjacking could be done by (a) adding a rogue hypervisor on the top or beneath the original hypervisor and (b) directly controlling the original hypervisor. As such, if an attacker can reach the hypervisor by hyperjacking, then the system can be disabled making critical asset vulnerable to threats.

Some implementations can include fine grained access control policies with MTD, and can support Linux, Android or any other OS.

A fundamental paradigm shift is MTD systems where attack surfaces are always dynamically moving. MTD systems are only leveling the game between defenders are attackers and still require information on the attack scenarios in order to design proper adaptive and dynamic security systems. A key challenge to MTD systems is how to control such a dynamic environment so that defenders are not confused. As such, MTD systems need to impose this dynamic change from the perspective of attackers and not defenders.

To enhance the performance ratio in the security system, the concept of read only file which used in Windows can be applied here to reduce the response time overhead. That is, using access mask bits supported by the Operating System can relief the defender. Also if the monitor system is customized it can improve the performance significantly as it consumes most of the time.

Some implementations can support Linux, Android or any other OS. For example, in the case of Linux any Linux version may be installed as guest OS, then the system calls were generated from it are monitored, analyze them with their parameters. Also a definition for every system call is needed to be familiar with them. Finally the operational architecture can be applied to Linux.

Figure 46:
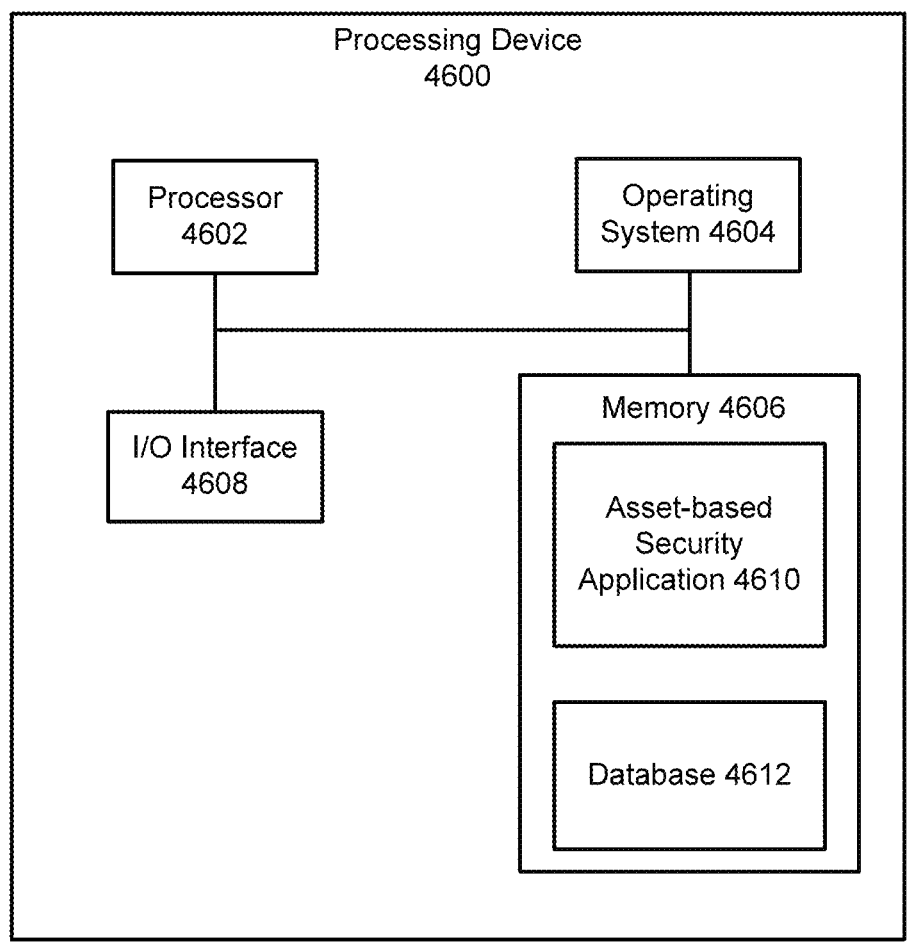
FIG. 46 is a diagram of an example processing device for asset-based security in accordance with some implementations.

FIG. 46 is a block diagram of an example processing device 4600 which may be used to implement one or more features described herein. In one example, device 4600 may be used to implement a computer device including an asset-based security system as described herein, and perform appropriate method implementations described herein. Device 4600 can be any suitable computer system, server, or other electronic or hardware device. For example, the device 4600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 4600 includes a processor 4602, an operating system 4604, a memory 4606, and input/output (I/O) interface 4608.

Processor 4602 can be one or more processors and/or processing circuits to execute program code and control basic operations of the device 4600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 4606 is typically provided in device 4600 for access by the processor 4602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 4602 and/or integrated therewith. Memory 4606 can store software operating on the device 4600 by the processor 4602, including an operating system 4604, one or more applications 4610, and a database 4612. In some implementations, applications 4610 can include instructions that enable processor 4602 to perform the functions described herein.

For example, application 4610 can include an asset-based security system or method as described herein. Any of software in memory 4604 can alternatively be stored on any other suitable storage location or computer-readable medium. In addition, memory 4604 (and/or other connected storage device(s)) can store language translation information, and other instructions and data used in the features described herein. Memory 4604 and any other type of storage (magnetic disk, optical disk, magnetic tape, or other tangible media) can be considered "storage" or "storage devices."

I/O interface 4608 can provide functions to enable interfacing the processing device 4600 with other systems and devices. For example, network communication devices, storage devices (e.g., memory and/or database), and input/output devices can communicate via interface 4608. In some implementations, the I/O interface 4608 can connect to interface devices including input devices (keyboard, pointing device, touchscreen, microphone, camera, scanner, etc.) and/or output devices (display device, speaker devices, printer, motor, etc.).

For ease of illustration, FIG. 46 shows one block for each of processor 4602, memory 4606, I/O interface 4608, and software block 4610. These blocks may represent one or more processors or processing circuitries, operating systems, memories, I/O interfaces, applications, and/or software modules. In other implementations, device 4600 may not have all of the components shown and/or may have other elements including other types of elements instead of, or in addition to, those shown herein.

In general, a computer that performs the processes described herein can include one or more processors and a memory (e.g., a non-transitory computer readable medium). The process data and instructions may be stored in the memory. These processes and instructions may also be stored on a storage medium such as a hard drive (HDD) or portable storage medium or may be stored remotely. Note that each of the functions of the described embodiments may be implemented by one or more processors or processing circuits. A processing circuit can include a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device.

The processor may contain one or more processors and even may be implemented using one or more heterogeneous processor systems. According to certain implementations, the instruction set architecture of the processor can use a reduced instruction set architecture, a complex instruction set architecture, a vector processor architecture, a very large instruction word architecture. Furthermore, the processor can be based on the Von Neumann model or the Harvard model. The processor can be a digital signal processor, an FPGA, an ASIC, a PLA, a PLD, or a CPLD. Further, the processor can be an x86 processor by Intel or by AMD; an ARM processor, a Power architecture processor by, e.g., IBM; a SPARC architecture processor by Sun Microsystems or by Oracle; or other known CPU architecture.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Experimental Results

Here the experiment result was added from the previous version of DRAKVUF version 0:4 which is related to system security response time, unfortunately this result are no more valid also could not complete some of the table as DRAKVUF version 0:4 is not working anymore.

Table 30 shows time in seconds consumed in Guest OS when application opened alone, shows time is seconds needed to run a specific program in different situations and scenarios each one was run about 100 time, then the average was taken, three columns, all of them shows the time for all application solo i.e. without opening a file using that application, the steps will be done according to the approach figure are step one and step two, using a program called APPTIMER to record the time, it works like the following procedure: Start Apptimer. Instruct Apptimer to open the application and record the START time.

Once the application window opens, instruct Apptimer to record the END time. The difference between these columns is that the time recorded in the first column is when there is no monitoring at all i.e. the plugins are off, the second column contains the time when the monitoring done to specific system calls namely they are NtWriteFile, NtReadFile, NtDeleteFile, NtSetInformationFile, NtOpenFile, and NtCreateFile. The third column time is taken when all the NT system calls are monitored.

TABLE 30

Response time Without File Access.

| | Without File Access | | |
|---|---|---|---|
| Application | Code off | Specific System Call | NT System Calls |
| Notepad | 0.042 | 1.591 | 1.767 |
| WordPad | 0.045 | 2.134 | 2.306 |
| MS Paint | 0.070 | 3.220 | 3.884 |

In Table 31 time is shown in seconds consumed in Guest OS when noncritical file accessed by an application, there are three columns which record the time needed to access a noncritical file by an application, the step done in this table starts from step one to up to step four, following the next procedure: Start Apptimer. Instruct Apptimer to open the application and record the start time. Once the application window opens the noncritical file, instruct Apptimer to record the END time.

TABLE 31

Response time when noncritical file accessed.

| | Without File Access | | |
|---|---|---|---|
| Application | Code off | Specific System Call | NT System Calls |
| Notepad | 0.040 | 1.669 | 1.693 |
| WordPad | 0.050 | 2.627 | 2.821 |
| MS Paint | 0.067 | 3.315 | 3.951 |

In Table 32 time is shown in seconds consumed in Guest OS when critical file accessed the time shown for critical files when prevented from access and when allowed, for prevented case there is no access to the file at all, to ensure this criterion the seven steps are needed from the first one to the last one with the following procedure: Start Apptimer. Instruct Apptimer to open the application and record the start time. Once the application window opens, the application tries to access the critical file (i.e., open the critical file). Once a message is displayed to indicate access denial, Apptimer records the END time, for level three cases where the process has given full access to the file, six steps is enough to ensure the criteria with the following procedure: Start Apptimer. Instruct Apptimer to open the application and record the start time. Once the application window (if allowed) opens the critical file, instruct Apptimer to record the END time.

TABLE 32

Response time when critical file accessed.

| | Prevent | | No Prevent | |
|---|---|---|---|---|
| App. | Specific System Calls | NT System Calls | Specific System Calls | NT System Calls |
| Notepad | 1.707 | 1.783 | 1.659 | 1.801 |
| WordPad | 2.751 | 4.054 | 2.595 | 2.888 |
| MS Paint | 3.389 | 4.192 | | |

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

What is claimed is:

1. A system for asset-based monitoring to detect attacks and for monitoring one or more critical assets for a violation of one or more security requirements, the system, comprising a processor device, configured to:
 perform an information collection phase including:
  capturing information about the critical assets corresponding to the one or more security requirements,
  generating a reachability graph representing one or more interrelationships between one or more of the critical assets and one or more other objects in the system, and
  generating a scope of control that maps security requirements for the critical assets to system calls that must be prevented in order to preserve the security requirements;
 monitor activity in the system to gather information about one or more running processes or applications, and use the gathered information about the one or more running processes or applications to detect any asset security requirements violation; and
 raise an alarm when a violation of one or more of the security requirements corresponding to any asset security requirements violation associated with one or more of the critical assets is detected,
 wherein the critical assets comprise direct critical assets and indirect critical assets as based on dependencies between system assets, and wherein the indirect critical assets are identified by tracing a data flow along a path based on the reachability graph.

2. The system of claim 1, wherein the information about one or more running processes includes execution tracing of events within an operating system.

3. The system of claim 1, wherein monitoring the activity includes monitoring at an asset-level of the system.

4. The system of claim 1, wherein monitoring the activity is performed at a hypervisor level.

5. The system of claim 1, wherein monitoring the activity is passive so as to be difficult for running processes to detect the monitoring.

6. The system of claim 1, wherein the system is configured to monitor activity independent of a set of attacks and attack vectors or attack behaviors, and wherein attacks are discovered based on information gathered from a defending system during the information collection phase.

7. A non-transitory computer readable medium having instructions stored therein that, when executed by one or more processors, cause the one or more processors to perform a method to monitor critical assets for a violation of one or more security requirements, the method comprising:

performing an information collection phase including:
capturing information about the critical assets corresponding to the one or more security requirements,
generating a reachability graph representing one or more interrelationships between one or more of the critical assets and one or more other objects in a system,
monitoring activity in the system including:
  gathering information about one or more running processes or applications, and
  using the gathered information about the one or more running processes or applications to detect any asset security requirements violation;
generating a scope of control that maps security requirements for the critical assets to system calls that must be prevented in order to preserve the security requirements; and
raising an alarm when a violation of one or more of the security requirements corresponding to asset security requirements violation associated with one or more of the critical assets is detected,
wherein the critical assets comprise direct critical assets and indirect critical assets as based on dependencies between system assets, and wherein the indirect critical assets are identified by tracing a data flow along a path based on the reachability graph.

8. The non-transitory computer readable medium of claim 7, wherein gathering information about one or more running processes includes execution tracing of events within an operating system.

9. The non-transitory computer readable medium of claim 7, wherein monitoring the activity includes monitoring at an asset-level of the system.

10. The non-transitory computer readable medium of claim 7, wherein monitoring the activity is performed at a hypervisor level.

11. The non-transitory computer readable medium of claim 7, wherein monitoring the activity is passive so as to be difficult for running processes to detect the monitoring.

12. The non-transitory computer readable medium of claim 7, wherein monitoring the activity is not tailored to a set of attacks and is not based on attack vectors or attack behaviors, and wherein attacks are discovered based on information gathered from a defending system during the information collection phase.

13. A method to monitor critical assets for a violation of one or more security requirements, the method comprising:
performing an information collection phase including:
capturing information about the critical assets corresponding to the one or more security requirements,
generating a reachability graph representing one or more interrelationships between one or more of the critical assets and one or more other objects in a system comprising a processor device,
monitoring activity in the system to:
  gather information about one or more running processes or applications, and
  use the gathered information about the one or more running processes or applications to detect any asset security requirements violation;
generating a scope of control that maps security requirements for the critical assets to system calls that must be prevented in order to preserve the security requirements; and
raising an alarm when a violation of one or more of the security requirements corresponding to asset security requirements violation associated with one or more of the critical assets is detected,
wherein data flows towards the critical assets, and wherein the critical assets comprise direct critical assets and indirect critical assets as based on dependencies between system assets.

14. The method of claim 13, wherein monitoring the activity includes execution tracing of events within an operating system.

15. The method of claim 13, wherein monitoring the activity includes monitoring at an asset-level of the system.

16. The method of claim 13, wherein monitoring the activity is performed at a hypervisor level.

17. The method of claim 13, wherein monitoring the activity is passive so as to be difficult for running processes to detect the monitoring.

18. The method of claim 13, wherein monitoring the activity is not tailored to a set of attacks and is not based on attack vectors or attack behaviors.

19. The method of claim 13, wherein attacks are discovered based on information gathered from a defending system during the information collection phase.

20. The method of claim 13, wherein the system includes an operating system independent scope of control component that can be adapted to a given operating system.

* * * * *